(12) United States Patent
Peterson et al.

(10) Patent No.: US 12,296,246 B2
(45) Date of Patent: May 13, 2025

(54) INTERACTIVE ARTIFICIAL INTELLIGENCE GOLF ASSISTANT SYSTEM

(71) Applicants: Jack Peterson, Elk Ridge, UT (US); Craig Ellins, Las Vegas, NV (US); Edmond DeFrank, Porter Ranch, CA (US)

(72) Inventors: Jack Peterson, Elk Ridge, UT (US); Craig Ellins, Las Vegas, NV (US); Edmond DeFrank, Porter Ranch, CA (US)

( * ) Notice: Subject to any disclaimer, the term of this patent is extended or adjusted under 35 U.S.C. 154(b) by 0 days.

(21) Appl. No.: 18/737,987

(22) Filed: Jun. 8, 2024

(65) Prior Publication Data

US 2024/0325847 A1    Oct. 3, 2024

Related U.S. Application Data

(63) Continuation-in-part of application No. 18/224,483, filed on Jul. 20, 2023, now Pat. No. 12,011,653.

(60) Provisional application No. 63/393,193, filed on Jul. 28, 2022.

(51) Int. Cl.
    *A63B 69/36* (2006.01)
    *A63B 24/00* (2006.01)
    *A63B 71/06* (2006.01)

(52) U.S. Cl.
    CPC ...... *A63B 69/3635* (2013.01); *A63B 24/0006* (2013.01); *A63B 24/0062* (2013.01); *A63B 71/0622* (2013.01); *A63B 2024/0009* (2013.01); *A63B 2071/0655* (2013.01); *A63B 2220/12* (2013.01); *A63B 2220/40* (2013.01); *A63B 2220/56* (2013.01); *A63B 2220/808* (2013.01); *A63B 2220/833* (2013.01); *A63B 2220/89* (2013.01); *A63B 2225/20* (2013.01); *A63B 2225/50* (2013.01)

(58) Field of Classification Search
    CPC ........... A63B 69/3635; A63B 24/0006; A63B 24/0062; A63B 71/0622; A63B 2024/0009; A63B 2071/0655; A63B 2220/12; A63B 2220/40; A63B 2220/56; A63B 2220/808; A63B 2220/833; A63B 2220/89; A63B 2225/20; A63B 2225/50
    See application file for complete search history.

(56) References Cited

U.S. PATENT DOCUMENTS

| | | | |
|---|---|---|---|
| 2018/0173223 A1* | 6/2018 | Doane | G05D 1/241 |
| 2019/0134506 A1* | 5/2019 | Gupta | G09B 19/0038 |
| 2020/0188732 A1* | 6/2020 | Kruger | G06F 3/0346 |

\* cited by examiner

*Primary Examiner* — Jeffrey S Vanderveen

(57) ABSTRACT

The embodiments disclose a system for interactively providing golf swing guidance to a user on a golf course including a database coupled to a remote server to collect, store and maintain updated topography of golf courses based on LIDAR, a club sensor configured to removably attach to one or more portions of the golf club and further configured to collect the club sensor golf club swing data as the user operates the golf club in a practice swing, a remote server configured to interactively identify a location of a user on the LIDAR topography when positioned at a golf course using a real-time kinematics device, a user audio device wirelessly coupled to the remote server configured to interactively communicate feedback guidance to and from the user of golf club selection and golf club swing adjustments.

18 Claims, 35 Drawing Sheets

INTERACTIVE ARTIFICIAL INTELLIGENCE GOLF ASSISTANT SYSTEM

CROSS-REFERENCE TO RELATED APPLICATIONS

This Patent Application is a Continuation-in-part and claims priority to the United States Patent Application entitled "SYSTEM FOR PROVIDING PUTTING SPEED AND DIRECTION", U.S. Ser. No. 18/224,483 filed on Jul. 20, 2023, by Jack W. Peterson," which claims priority to U.S. Provisional Patent Application No. 63/393,193, filed Jul. 28, 2022, and entitled "Digital Compass", all being incorporated herein by reference.

BACKGROUND

Golf courses vary from one to another. A golfer faces challenges to score an acceptable completion of play on each course. The golfer is tasked with judging numerous distances, avoiding physical hazards and obstacles, and avoiding errant shots that can cost penalty strokes. Each hole on a course has a distinct set of characteristics that confront the golfer, some of which can be seen and others that are out of view. Even professional golfers can get frustrated when their golf shots are not going well. What is required is some assistance in conducting the myriad of tasks required to make good golf shots on the variances of golf courses and holes.

GENERAL OVERVIEW

It should be noted that the descriptions that follow, for example, in terms of an artificial intelligence golf assistant system are described for illustrative purposes and the underlying system can apply to any number and multiple types of golf courses. In one embodiment of the present invention, the artificial intelligence golf assistant system can be configured using an AI module application. The artificial intelligence golf assistant system can be configured to include an artificial intelligence and machine learning processor and can be configured to include an input using the present invention.

The present invention is an interactive artificial intelligence (AI) golf assistant that allows a user to interact with an AI golf assistant module with voice commands, hand gestures, eye movements, or selections on a touch screen of a mobile device to request advice from the AI golf assistant module. The AI golf assistant module can interact with the user to advise the user during a golf round as the user prepares to play a golf course and when the user prepares to hit a golf shot. The AI golf assistant module has information stored in a database that includes information about the user's golf swing and the user's golf tendencies for different shots, with different golf clubs, during course play and at the practice driving range. The AI golf assistant module also has information stored in a database about other similar amateur golfers' tendencies when playing the same shot as well as how professional golfers play the same shot to increase success for each shot for the user.

The terms "AI caddy," "AI caddie," "AI assistant," and "AI virtual assistant" are used interchangeably herein and have the same meaning of a human interactive artificial intelligence (AI) module and AI system. The AI golf module, AI golf assistant, and/or AI module or system can include several ways for a human user to interact with the AI module and system, including as one example, audible user voice commands and audible feedback from the system. The audible feedback can include interactive announcement recommendations and suggestions to a user and responses to a user's questions generated from the AI golf assistant module of the AI golf application.

Figure 1:
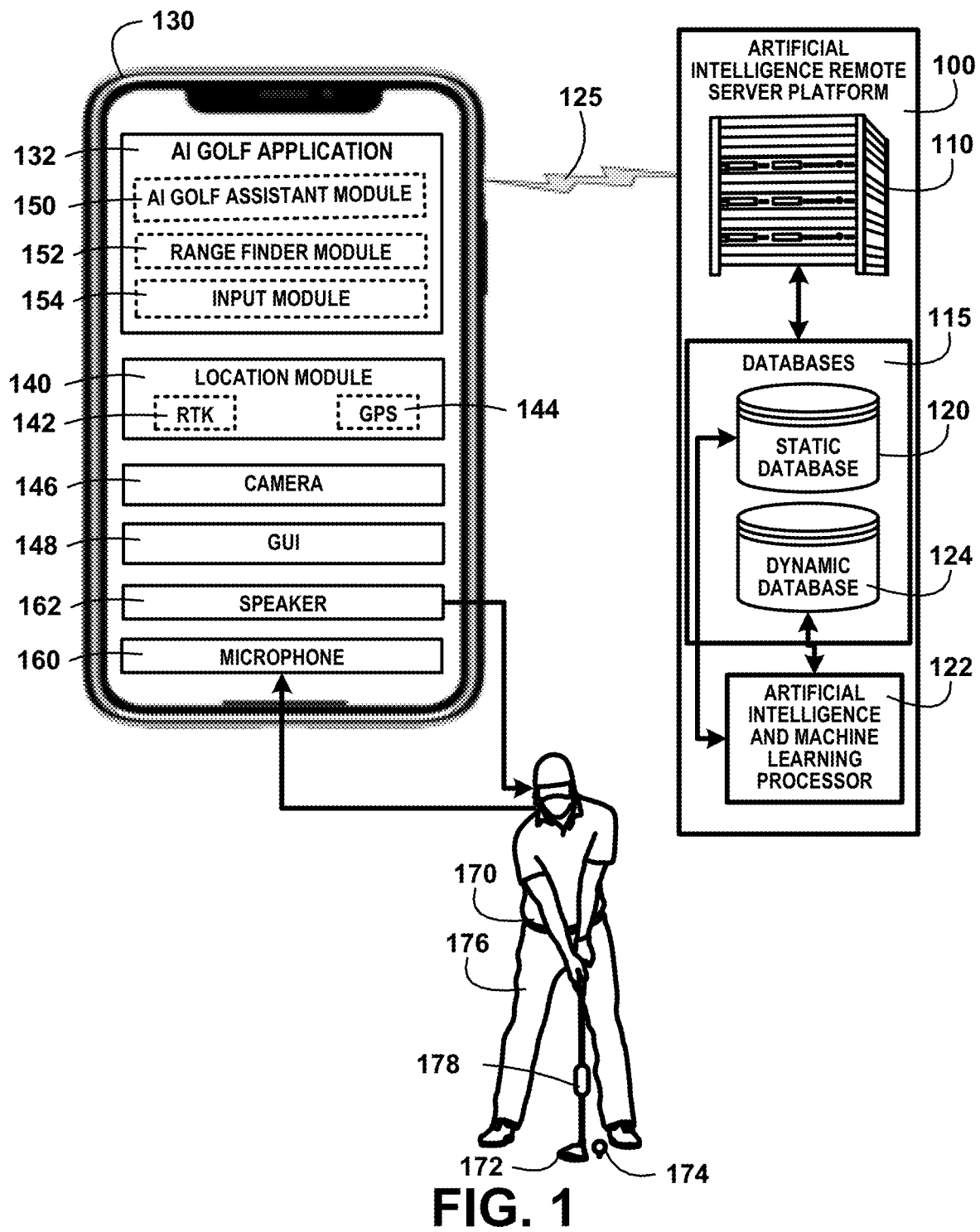
FIG. 1 shows for illustrative purposes only an example of an AI module application of one embodiment.

FIG. 1 shows for illustrative purposes only an example of an AI module application of one embodiment. FIG. 1 shows an artificial intelligence remote server platform 100. The artificial intelligence remote server platform 100 includes an artificial intelligence server 110, databases 115, at least one static database 120, an artificial intelligence and machine learning processor 122, at least one dynamic database 124, and at least one wireless communication device 125.

A user's mobile device 130 has an AI golf application 132 installed. The AI golf application 132 includes a location module 140 having a Real-Time Kinematic (RTK) 142 module and a Global Positioning System (GPS) 144 module. The user's mobile device 130 includes a camera 146, a graphical user interface (GUI) 148, and an AI golf assistant module 150. The AI golf assistant module 150 includes a range finder module 152, and an input module 154. The AI golf application 132 utilizes the user's mobile device 130 GPS coordinates to identify the golf course the user has arrived at and will be playing on at that time. The AI golf application 132 can be used to replay a prior round of play to refresh the user's memory of especially difficult holes. The replay could be statistical or even the prior shots overlaid on a course RTK map, club use, or suggestive corrections that the user should consider for this next round of play.

Upon arriving at a specific golf course and launching the AI golf application 132, the user's location triggers detection at that precise golf course. Subsequently, the AI golf application 132 retrieves pertinent data from the server 110 through linked databases 115 dedicated to the specific golf course. This data encompasses the RTK topographic map, historical records of amateur and professional play, and the user's personal play history for each hole on the course. By acquiring this data, the AI golf application 132 can review the user's previous rounds, with a focused analysis on golf shots that needlessly inflated the score.

If the user is unfamiliar with a particular course, the AI assistant will begin to familiarize the user with the course based on the RTK topography map and the previous amateur and professional play history. The hole-by-hole information the AI assistant provides will alert the user to areas on a hole that frequently negatively impact the score of those who have previously played the hole. The AI caddie will provide suggestions to avoid the pitfalls of others who have previously played the hole and how to avoid the same results.

Moreover, the AI golf assistant module 150 is capable of replaying those shots and offering suggestions on how to avoid repeating previous poor shots. These suggestions may include recommendations for club selection and target shot locations to avoid hazards.

The AI golf assistant module 150 tracks its recommendations and how often the user has used it after a round to learn and predict how well the AI golf assistant module 150 performed and if the user would have done better with its recommendations. This information is stored in a database and compared with how other users use the AI golf assistant module 150. The golf rounds are analyzed at the end of each golf round to teach the AI how to get better with custom recommendations for the user and other similar users based on how the user played with the recommendations and added or reduced strokes on the course through the round. This also allows the AI golf assistant module 150 to be taught and to learn how and what recommendations are the most useful for future recommendations for the current users and other uses.

The golf ball tracking statistics provide insights into the shot's distance, flight profile, and landing location. The club utilized in a prior shot may have influenced a slice or hook, prompting the AI assistant module, in certain instances, to propose an alternative club that sacrifices some distance for improved control. Users can selectively replay the details for each hole, and as they approach a particular hole, the AI golf assistant module 150 can recap the specifics pertinent to that specific hole. The replay feature includes wearable camera images and videos displaying the user's stance and club face orientation as they addressed the golf ball in previous shots.

The AI golf assistant module 150 can be coupled, such as wirelessly, to the user's mobile device, such as a mobile phone, mobile special purpose electronic device, mobile launch monitor, or a mobile electronic tablet. The user's mobile device 130 can include various motion, audible and visual sensors, a camera, a speaker 162, and a microphone 160. FIG. 1 also shows a user 170 holding a golf club 172 having a club sensor 178 coupled to the golf club 172. The user 170 is addressing a golf ball 174 in preparation for making a practice swing.

In one embodiment, the user 170 can wear a wearable golf environment detector 176. In one embodiment, the wearable is a pair of glasses or a body camera with a video camera that picks features from the hole to further identify the location and provide related suggestions. The wearable camera includes zoom module selections the user picks to get a closer look at the area. In one embodiment, the zoom module selections can be an automatic zoom that is coupled to a wearable rangefinder to provide the user a closer view based on the distance to a particular hazard and to a golf ball landing location to assist the user in finding the golf ball as they get closer to the golf ball landing site. The user uses the automatic zoom module when approaching a green to begin to determine the topography of the green and RTK recorded slopes. This feature allows more time to assess a potential putting circumstance and potential landing target areas on the green for a chip shot. In all the embodiments of the present invention, an audible system with voice commands coupled to the AI golf assistant module 150 can be used to control, adjust, access, monitor, learn and track all features of the present invention.

For example, the area of rough is different and narrows the fairway from the user's previous round. The camera could be in a hat belt or another type of clothing. The finite green topography may have changes and the suggestions can be adjusted accordingly on approach shots, chip shots, and sand shots including where the ideal landing spot should be targeted, not necessarily the pin. A new pin location may be located by another user earlier. Regarding the green conditions a green grass grow algorithm stores recent weather conditions that may affect the growth of the green grasses and how fast various green grasses grow. This may affect the green topography and the topography data can be updated using RTK and photogrammetry.

In another embodiment, the user can wear augmented reality (AR) glasses that include light detection and ranging (LIDAR) features to read the contours, slopes, green speed, and other green characteristics that will affect a putt on a projected screen in front of their eyes. The projected images can be displayed on a clear prism in front of the user's eyes with an optical waveguide that projects the desired images on the prism in front of their eyes. Alternatively, the projected images can be an optical system that projects light and the images on the retina of their eyes. Other suitable projection methods can be used to project and superimpose the images on the user's vision to create an augmented reality experience with eyewear, such as glasses or contact lenses.

In one embodiment, the user can wear the AR glasses and walk up from the cup location on the golf hole to the position of the user's golf ball on the green or just off the green for a chip shot. The LIDAR system, integrated into the AR glasses, detects the contours and other data, and processes the data to display the contours and other green data superimposing the contours onto the real-time images of the green.

The AR glasses process the data and additionally display the path the ball will follow to the cup and the aiming direction the user will use to strike the golf ball for the putt to follow the contoured path of the golf ball to the cup. The AR glasses LIDAR is contained within memory devices, display programming, camera, sensors, and processors for receiving the visual and sensor data of the green and processing the data to overlay the contours and calculated putt path and aiming direction to assist the user in making the putt to drop into the cup. The AR glasses also include rechargeable batteries to power the LIDAR and other devices and systems. The AR glasses can have automatic or manual electrochromic dimming levels to assist the user to see the projected images and the real-world view at the same time during varying ambient and outdoor lighting conditions.

In one embodiment, the ball marker includes a stimpmeter integrated into the bottom of the ball marker. A stimp rating is a numerical value that represents the speed or how fast the golf ball rolls on the putting surface.

Should a golfer not be able to physically join at least one other player on a golf course, one or more of the other player users could share camera views of the hole to allow other absent players to virtually join the group on the golf course. Golfers on the course could use augmented reality to superimpose the camera views with the RTK topography allowing comments on hazards and shots made by the other golfers. Where the particular golf course topography is accessible, the absent player may be able to play along using a golf simulator app or game. Each of the players could create an Avatar to include in a replay of the round being played in the Metaverse. Where legal the players could make wagers, for example, on whether a player sinks a putt or successfully chips out of a sand trap. In one embodiment, the RTK and photogrammetry golf course data could be supplied to a golf simulator game partner. This would allow users to practice on golf courses near to them with the simulator to improve their play.

In one embodiment, "smart" golf balls are used for user practice. The smart golf balls can have sensors on the surface of the golf ball or embedded within the golf ball. The AI golf application 132 can track and record the "smart" golf ball practice shots to allow analysis of the user's practice to improve suggestions to assist the user in perfecting the play on the course.

When practicing putting, use a home tracking device to record swing or stroke speed, tempo, and the open/close movement of the putter. This helps in tracking putting practice sessions away from the golf course, enhancing the AI caddy's suggestions for putting techniques. The additional data can be put to use on a practice green at a given golf course. Identifying the areas of improvement resulting from increased putting practice, these suggested enhancements will allow the user to focus on those specific areas while practicing on the greens at a designated golf course. The AI assistant can explain the types of putts to work on.

The cups/pins in practice greens change even daily, and the user may use the ball marker to locate the current cup locations before the user begins putting practice. The AI assistant can then give guidance on what putts to practice, pictorially where the user should place the ball marker and which cup to putt to. Part of practicing putting on an enabled green is to ask the user the line, read it without being aided with the ball marker, and then give the putt parameters to follow (line, aim point, speed, etc.). Gathering additional putting practice will be recorded along with fairway swing data, ¾ swing data, etc.

During a practice golf swing, the artificial intelligence and machine learning processor 122 will predict how far your golf ball 174 will carry, finish, and where it will most likely end up. The AI golf assistant module 150 can interact with the user 170 to keep analyzing practice swings until a desired probabilistic outcome is achieved. The AI golf assistant module 150 can keep making suggestions until the user 170 is comfortable with the shot.

The AI golf assistant module 150 can interact with the user 170 as the user 170 is lining up for the shot and help point out an optimal direction or line of where the user 170 should be aiming at the golf shot. For example, when the user 170 addresses the golf ball 174, the AI golf assistant module 150 can detect where the user 170 is aiming or lined up for the shot and interact with the user 170 using audible messages to correct or confirm the correct line.

Wearable sensors 176, camera sensors 146, and sensors on the equipment 178 can also be used to make the optimal determinations in trying to achieve the perfect swing. Also, instructional multimedia videos can be used during the golf round to help the user 170 with his golf shot. These instructional videos can be from professional golfers, previous users, amateurs, or coaches.

The AI golf assistant module 150 allows the user 170 to interact with the AI golf assistant module 150 with voice commands, hand gestures, eye movements, or selections on a touch screen of a mobile device 130 to request advice from the AI golf assistant module 150. Also, the user 170 may use voice commands to control features of the assistant module 150 before, during or after a round of golf. For example, voice commands can be used during a round of golf to enter, add or edit data into the AI golf assistant module 150 relating to a golf shot. In another example, voice commands can be used after a round of golf to enter, add or edit data into the AI golf assistant module 150 relating to previous golf shots.

In another example, voice commands can be used before a round of golf to access data, simulate a future round or create notes about the future round into the AI golf assistant module 150 relating to proposed golf shots, reminders or tips on certain golf holes or golf shots before the round to allow this data to be available during the round. Also, voice commands can be used to control and review all aspects of the AI golf assistant module 150 before, during or after a round of golf. The AI golf assistant module 150 can also accept and use self-reported information and assessment data about the user to further teach the AI golf assistant module 150 about the user. After an actual round, the AI golf assistant module 150 can compare the before the round data to the actual round to determine the effectiveness of the before the round analysis and make adjustments based on what worked and what did not for modifications to future rounds and future recommendations as part of the artificial intelligence learning process.

In one example embodiment, the AI golf assistant module 150 can advise the user 170 during a golf round as the user 170 prepares to hit a tee shot. The AI golf assistant module 150 has information stored in a database 115 that includes information about the user's 170 golf swing and the user's 170 golf tendencies for different shots with different golf clubs 172 during course play and at the practice driving range. The AI golf assistant module 150 has information stored in a database 115 about other amateur golfers' tendencies when playing the same shot. The other amateur's information includes tendencies for different shots with different golf clubs 172 during course play on the same course being played by the current user 170. Additional stored information includes how professional golfers play the same shot, on the same hole, on the same course that the current user 170 is playing currently.

The golf tendencies include technical data and information for each golf club and the golf ball before, at, and after impact with each golf club. This data can be captured by radar, doppler, photo, video sensors, and can include data such as target alignment, backswing takeaway, path, downswing path, location of impact of the golf ball on the golf club, golf ball carry distance, golf ball total distance, golf ball back and side spin rates, golf ball launch angle, golf club swing speed, golf ball speed, golf club angle of attack, golf club face angle, golf club swing path before, at and after impact and other relevant swing characteristics and analytics.

The AI golf assistant module 150 uses at least one artificial intelligence and machine learning processor 122 to analyze the other amateurs of the same skill level and professional golfers with the same tee shot on the same hole. The analysis calculates the success percentage of those shots leading to better scoring against par on the hole. The analyzed information determined the shot placement, golf club 172 selected, and at least the result of the tee shot in setting up the next shot that follows.

The AI golf assistant module 150 factors into the analysis weather conditions, humidity, wind speed, and direction, type of shot from a straight shot, a fade, and a draw, avoidance of hazards, out-of-bounds, tree contacts, and whether the results of the tee shot avoided the obstacles and the final tee shot resting place in relation to the hole mapped high-resolution LIDAR Real-Time Kinematic (RTK) topography of the course and particular hole.

The AI golf assistant module 150, based on the shots analysis and the current user's 170 tendencies, provides the location of where the user 170 should hit the tee shot with the highest chance of success with the next shot. Which golf club 172 the user 170 should use based on the known distances of the user 170 for each golf club 172; known data about the golf course; the current weather conditions; the elevation, topography, and terrain of the current hole; and the type of shot the user 170 usually has the most success with.

For example, the golf hole in play has a dogleg right, that prevents the user 170 from seeing the target golf hole and what obstacles are present in the fairway of the dogleg. The AI golf assistant module 150 considers the dogleg when analyzing the best tee shot placement for the user 170. When the user 170 verbally questions the AI golf assistant module 150, "Where should I aim this tee shot?"; based on the user's 170 tendencies and the highest-ranking successful shots on this golf hole by other amateurs and professional golfers; the AI golf assistant module 150 may suggest a long iron versus using the driver due to the distance to the dogleg turning point fairway and predictable resulting fairway position viewable for the second shot.

Additionally, the AI golf assistant module 150 has determined, based on the tendencies of the user 170, that the user 170 has consistently hit better-controlled long iron shots than wood shots. The targeted shot position would be 20 yards left of the dogleg right turning point. The user 170 better controlled long iron shot would have a better opportunity to avoid the turning point trees on the right and have a clear second shot.

In one embodiment, the user 170 can use hand gestures to indicate a corner of the dogleg where there are tall trees, indicating the direction to aim to clear the trees and have the ball land around the corner of the dogleg. The AI golf assistant module 150 may also respond verbally with an alert to the user 170 to avoid trying to cut across the turning point of the dogleg because of 50-foot-high trees that would be encountered on the downward portion of the ball flight and be nearly impossible to avoid hitting a tree or the shot falling short and be blocked from a clear second shot by the trees.

Also, the user 170 can verbally interact with the AI golf assistant module 150 and verbally ask, "Which long iron should I use?". The AI golf assistant module 150 will use the tendencies of the user and make a suggestion. In this example scenario, the AI golf assistant module 150 has stored in its system the average distances and shapes of each club of the user 170 to suggest an ideal targeted shot placement position, including the calculated roll after the golf ball is carried.

This ideal location takes into consideration the likelihood of making it to that location and setting up the user 170 for success with the next shot based on the tendencies of the user 170 with golf shots closer to the hole. The likelihood of success of the ideal ball position for the current shot and subsequent shots is based on other similar golfers, coaches, professionals, and course suggestions. The AI golf assistant module 150 also evaluates the current weather conditions, course conditions, and time of day to calculate and predict the carry and roll of each golf shot. This would provide the user 170 with an advantageous position for the next shot on the hole and be consistent with the highest-ranking successful scoring shots of others.

The AI golf assistant module 150 can be powered by Bayesian networks for its probabilistic reasoning. Other artificial intelligence systems include deep learning neural networks that use convolutional neural networks (CNNs) for image recognition and recurrent neural networks (RNNs) for sequence data. Decision trees and random forests can be used with a set of conditions for classification. Random forests can be used with an ensemble of decision trees to improve accuracy.

Support vector machines (SVM) can be used for classification and regression tasks. The SVM can be used with the high-dimensional spaces of the AI golf assistant module 150 when tasks with clear boundaries between classes are needed. Generic Algorithms can be used when algorithms with optimization that evolve solutions to complex problems over multiple generations are needed. Reinforcement learning AI can be used, including Q-learning and deep reinforcement learning methods for training models to make sequential decisions.

In one embodiment, the AI golf assistant module 150 has numerous data points about the user's 170 golf swing stored in the learning database 115. The AI golf assistant module 150 utilizes the user's 170 golf tendencies, including the user's 170 patterns and behaviors that have been observed in the user's 170 previous rounds, to determine the user's 170 strengths and weaknesses, and understand the familiar challenges the user 170 faces during a particular tee shot. This analysis enables the AI golf assistant module 150 to recommend adjustments that align with the user's 170 playing style, maximizing the user's 170 chances of success.

In addition, the AI golf assistant module 150 uses insights from a vast database 115 of amateur golfers, to suggest common strategies and pitfalls associated with tee shots at the user's 170 similar skill levels. By analyzing trends among other amateur players, the AI golf assistant module 150 can provide context-specific advice, helping the user 170 navigate challenges that are commonly encountered by golfers with similar capabilities.

In parallel, the AI golf assistant module 150 can delve into the techniques employed by professional golfers during a particular tee shot. The database 115 of strategies of elite players allows the AI golf assistant module 150 to offer expert insight to the user 170 about club selection, shot trajectory, and ball placement. This understanding of how the best golfers in the world approach similar situations allows the user 170 to gain valuable knowledge to elevate the user's 170 performance based on the advice from the AI golf assistant module 150.

Also, the AI golf assistant module 150 leverages data about the golf course and recommends a target location for the tee shot with the highest chance of success for other shots for the golf hole being played. Global Positioning System (GPS), Real-Time Kinematic (RTK), and course mapping technology are used to provide advice about how to reach optimal landing zones while avoiding potential hazards. This is used in combination with the AI golf assistant module's 150 knowledge of the user's 170 historical data to recommend the most suitable golf club 172 for the shot. The AI golf assistant module 150 takes into consideration the user's 170 known distances for each golf club 172, ensuring that the user 170 makes informed choices aligned with the user's capabilities.

In addition, external factors are used, such as real-time weather data to provide additional guidance. Whether it is wind speed, direction, or temperature, the AI golf assistant module 150 offers suggestions to account for these variables, enhancing the accuracy of your tee shot. The AI golf assistant module 150 also analyzes the terrain of the current hole, elevation changes, bunkers, and other features that may impact the user's 170 shot. This comprehensive understanding of the golf course's topography allows the AI golf assistant module 150 to tailor its advice to the specific challenges posed by the terrain.

Lastly, recognizing the user's 170 most successful and preferred shot types, the AI golf assistant module 150 uses this information when recommending strategies that align with the user's 170 past successes. Whether it is a draw, fade, or straight shot, the AI golf assistant module 150 leverages the user's 170 historical performance data to guide the user 170 with the shot selection, optimizing the user's 170 chances of achieving the desired outcome.

In essence, the AI golf assistant module 150 serves as a multifaceted interactive AI assistant, integrating information from various sources to deliver precise, personalized advice at every step of the user's tee shot, enhancing the user's overall golfing experience, performance, and success.

DETAILED DESCRIPTION

Figure 2A:
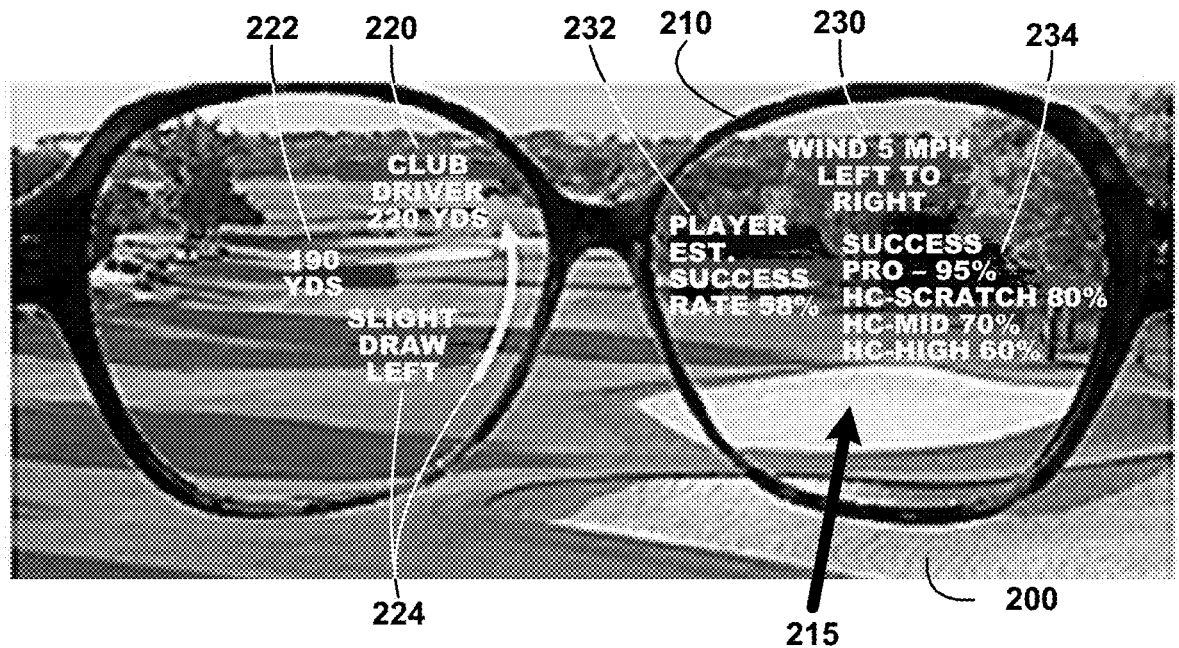
FIG. 2A shows for illustrative purposes only an example of a glasses display of one embodiment.

FIG. 2A shows for illustrative purposes only an example of a glasses display of one embodiment. FIG. 2A shows the AI golf assistant module 150 of FIG. 1 projecting information to the user on the lenses of a pair of AI golf assistant glasses 210 superimposed on a view of a golf course hole 200. The AI golf assistant glasses 210 AI caddy projected messages include data in response to the user's questions about how to play the hole. The glasses use AI caddy projected messages 215.

In one embodiment, the AI golf assistant glasses 210 includes a laser device to measure the distance to an object the user is looking at through the AI golf assistant glasses 210. The laser device can also have a triangulation feature that allows the laser to track different objects and use a triangulation processor to determine the distance between each object. In one embodiment, the triangulation can be used to determine the width of a fairway or the distance between distant objects on the golf course, such as hazards, landmarks, and flagsticks, etc.

The AI golf assistant glasses 210 has an Augmented Reality (AR) device feature that projects crosshair a crosshair onto each lens and an AR-depicted laser beam positioned relative to the crosshairs to assist the user in aiming the laser at the object or point of interest to the user. The user's bifocal vision combines the crosshairs, and the user gives the AI golf assistant glasses 210, for example, an audible voice command "distance" that triggers the laser to measure the distance to the object or point in the crosshairs. The AI golf assistant glasses 210 answers the user's "distance" command with an audible of the number of yards to the object or point.

In another embodiment, a combination laser GPS rangefinder is coupled to the AI golf assistant glasses 210 having an Augmented Reality (AR) device feature. The Augmented Reality (AR) device feature projects a crosshair onto each lens to overlay the RTK topographic map to identify the object or point to calculate the distance based on the user AI golf assistant glasses 210 GPS location. The RTK topographic map overlay identifies an object or point on the RTK topographic map overlay the user selected. The user gives a verbal audible command of 'distance' and the AI golf assistant module 150 of FIG. 1 responds with an audible broadcast of the distance in yards to the object or point chosen by the user with the crosshairs.

In yet another embodiment, the AI golf assistant includes a mobile app for installation on a user's mobile device having a camera. The mobile app includes a camera laser rangefinder that displays crosshairs and a simulated laser beam. The camera laser rangefinder display allows the user to aim the mobile device camera laser rangefinder at an object or area and use the display to place, for example, the object in the crosshairs. The user then taps a laser icon on the display to actuate the laser. The laser determines the distance to the object and displays the yardage on the display. A laser processor calculates the distance adjusting for up or down elevation height differences between the user location and the object location.

In addition, the user's mobile device acquires the user's GPS coordinates and the camera laser rangefinder processor calculates the GPS location coordinates of the object taking into account the angle from true north. The image of the object can be viewed using the AI golf assistant glasses 210. The camera laser rangefinder mirrors the distance to the object and object GPS coordinates on the lenses of the AI golf assistant glasses 210. The object GPS coordinate may be used to display superimposed RTK topography on the glasses and the camera laser rangefinder display.

The camera laser rangefinder display makes it easier for the user to get the accurate distance to a chosen target than binoculars or a viewfinder scope. The user can quickly scan the course for the shot and receive multiple laser distances to assist the user in deciding on a preferred target and a club selection to either reach the object, or area, or in cases of hazards avoid reaching the hazard or safely dealing the hazard and potential penalty shots.

The user may pan the area of interest and select multiple targets. The camera laser rangefinder can record the laser beam results for each of the multiple targets and display a list of distances for each selected target in the order in which they were selected. The camera laser rangefinder, in one embodiment, includes a user voice-activated "laser" command to avoid the user having to move fingers to tap the laser icon to select the targets.

For example, how far did the user drive using a club driver 220 yds 220, what is the distance to a bunker on the left, how should the driver shot be performed, any wind to be concerned with on the shot, what is my chance of success and how have others done on this hole. The AI golf assistant responses include a distance of 190 yards to a bunker 222, a golf stance adjustment to perform a suggested slight draw left 224, an impact of a wind 5 mph left to right 230 aiming 5 yards to aim more to the right to compensate. Following the suggestion the AI golf assistant predicts the player est. success rate 58% 232 and have the following results other players ranked success pro—95%, HC-scratch 80%, HC-mid 70%, HC-high 60% 234. In one embodiment, the AI golf assistant glasses 210 include a microphone and speakers to allow the user to verbally communicate with the AI golf assistant. The AI golf assistant tracks and knows which club the user used for each golf shot because the AI caddy questions the user after and before each shot with audible questions and also based on the AI's recommendations the user acted upon and those dismissed by the user.

Figure 2B:
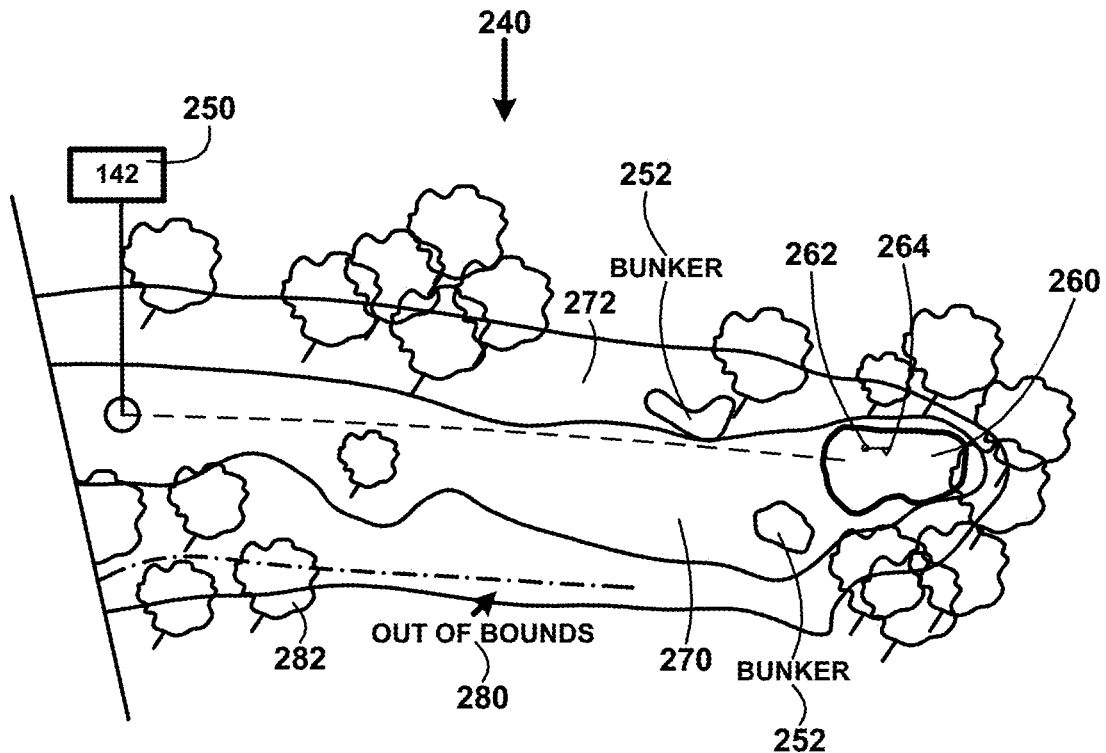
FIG. 2B shows for illustrative purposes only an example of the satellite topography of one embodiment.

FIG. 2B shows for illustrative purposes only an example of a portion of an RTK map approaching the green of one embodiment. FIG. 2B shows an RTK map of a portion of a hole to the green 240. The RTK map shows 142 yards to the green 250 from the current location of a user ball. Also showing are a left bunker 252, the green 260 including the cup 262 and flag 264. The fairway 270 has rough 272 on both sides, one area of out-of-bounds 280, and a tree 282 among the many trees along the course for this hole of one embodiment.

Figure 3:
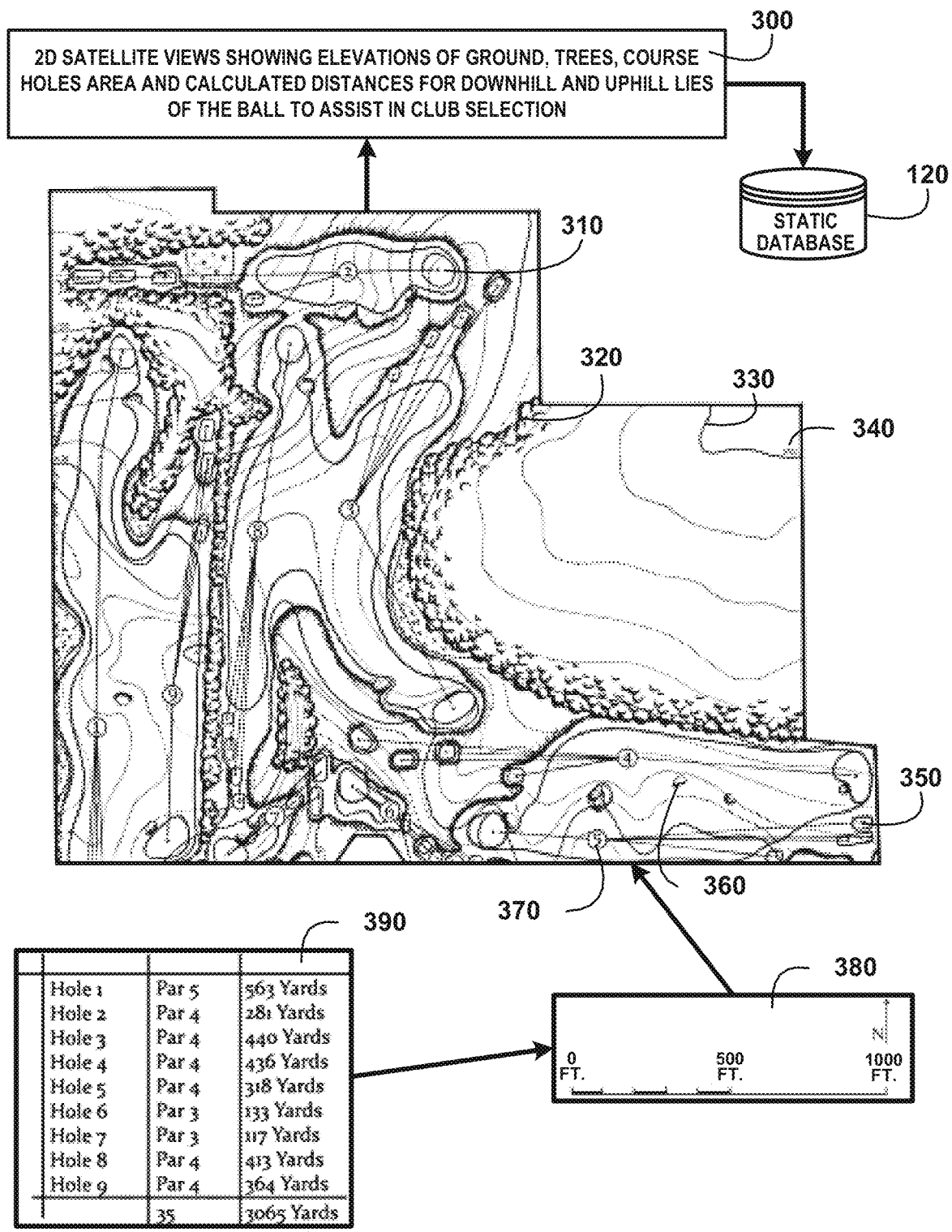
FIG. 3 shows for illustrative purposes only an example of satellite golf course contours of one embodiment.

FIG. 3 shows for illustrative purposes only an example of satellite golf course contours of one embodiment. FIG. 3 shows 2D satellite views showing elevations of ground, trees, course holes area, and calculated distances for downhill and uphill lies of the ball to assist in club selection 300. The 2D satellite view data is stored in the static database 120 for uses including, for example, distance measurements between features of a golf course hole map. The 2D satellite views show a green 310, trees 320, topographic contours 330, elevations 340, a tee 350, a bunker 360, and a hole number 370. Also shown is the scale 380 of the 2D satellite images used for measurements. A course hole yardage card 390 also provides a check on the measurement accuracy of one embodiment.

Figure 4:
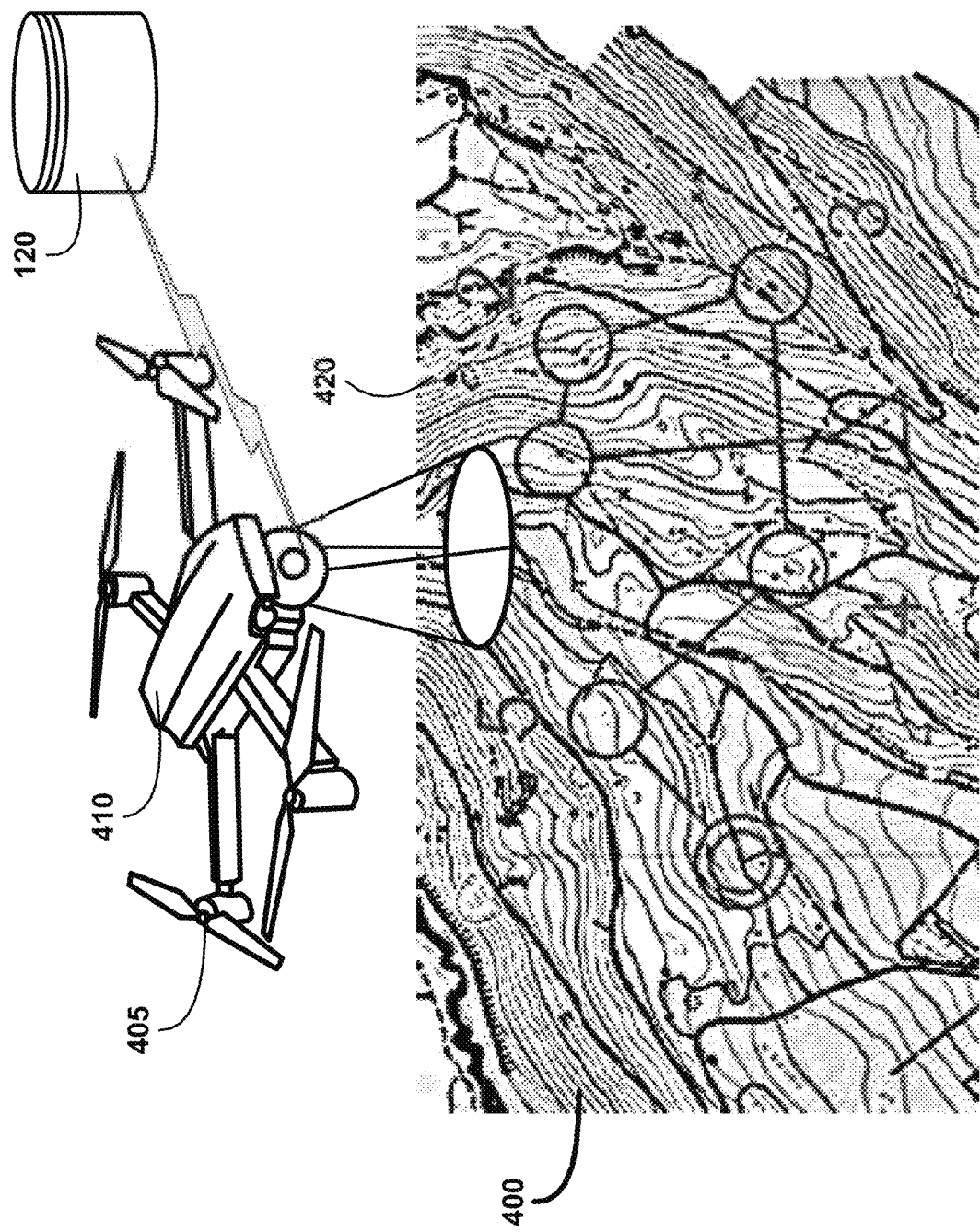
FIG. 4 shows for illustrative purposes only an example of lidar real-time kinematics golf course terrain details of one embodiment.

FIG. 4 shows for illustrative purposes only an example of satellite golf course contours of one embodiment. FIG. 4 shows a golf course 400 being flown over with an RTK drone 405. The RTK drone 405 includes Real-Time Kinematic sensor devices and camera 410 to collect topographic data of the golf course including elevation contour lines 420, scalable distances, features including bunkers, water hazards, trees including heights, cart paths, and other features with 1-2-centimeter accuracy. The RTK drone sensor data is transmitted for storage to the static database 120 of one embodiment.

Figure 5:
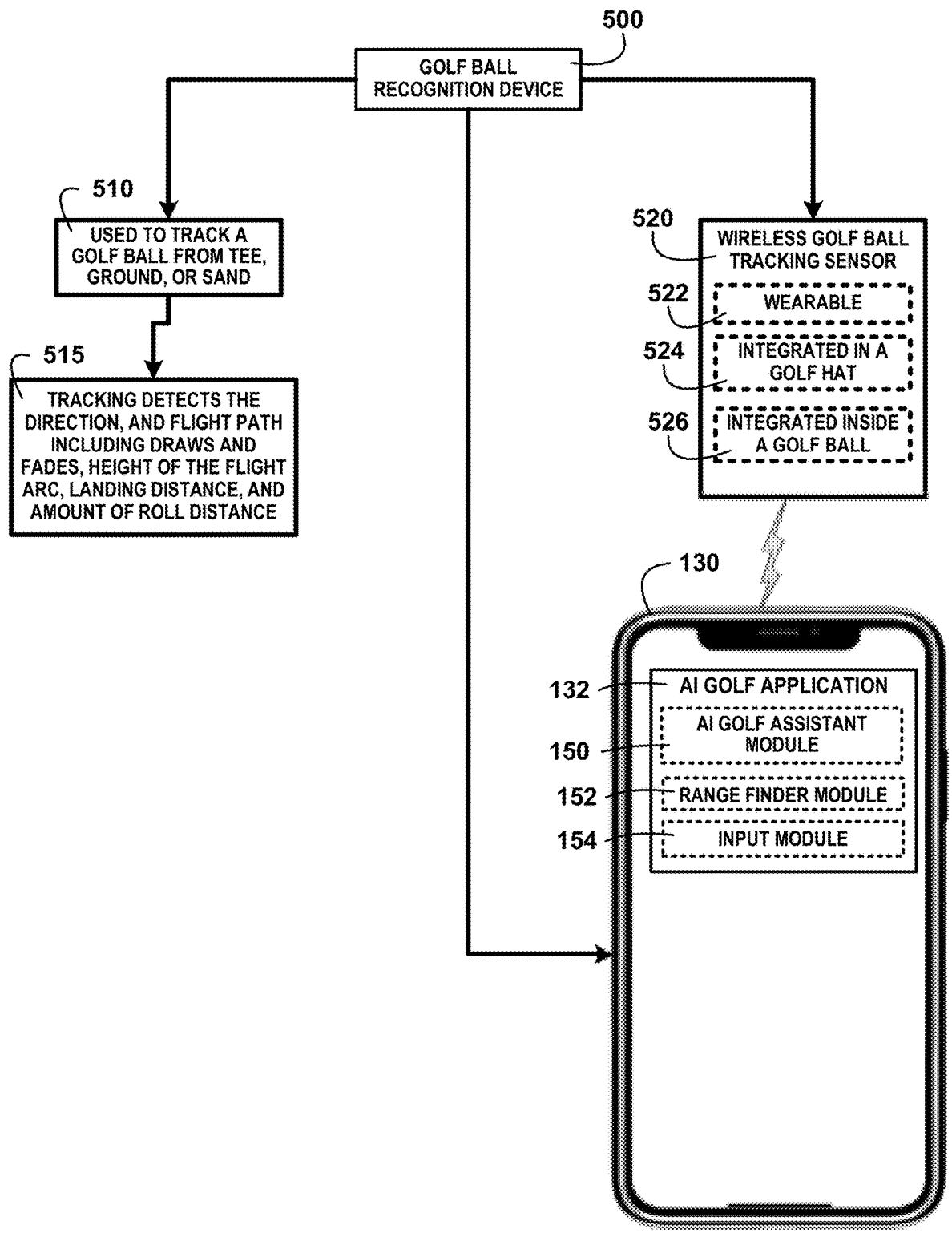
FIG. 5 shows a block diagram of an overview flow chart of a golf ball recognition device of one embodiment.

FIG. 5 shows a block diagram of an overview flow chart of a golf ball recognition device of one embodiment. FIG. 5 shows a golf ball recognition device 500 used to track a golf ball from tee, ground, or sand 510. The tracking detects the direction, and flight path including draws and fades, height of the flight arc, landing distance, and amount of roll distance 515. The information collected from a wireless golf ball tracking sensor 520 including a wearable 522, integrated in a golf hat 524 or an integrated inside a golf ball 526 also assists in determining where the ball lands and rolls. This allows the user to find the ball in a shorter time and reduces lost balls. The tracking data is transmitted to the user's mobile device 130 and displayed by the AI golf application 132 with the AI golf assistant module 150.

In one embodiment, the AI golf assistant module 150 tracks and knows which club the user used for each golf shot because the AI caddy questions you after and before each shot with audible questions and also based on AI's recommendations. AI tracks its recommendations and how often a golfer used it after a round to learn and predict how well AI performed and if a golfer would have done better with its recommendations, for example, the user used the AI recommendations 50% of the time and was right on those 90% of the shots, but the user was wrong on 30% of the user's 50% to not use the recommendations-so the user would have scored X shots better if they used the recommendations and vice versa.

The golf rounds are analyzed at the end of each golf round to teach the AI how to get better with custom recommendations for the user and other similar users based on how the user played with the recommendations. The AI tracks each shot, so it calculates penalties and scores for each hole and the total scores of the user and other players. Since AI tracks each shot from above, it can analyze the round and determine strategies for how to play better and avoid penalties and focus on what worked best for the user during the round to help with future rounds on that course and other courses with similar holes and determine the strengths and weaknesses of the golf user.

The analysis allows AI determination of how many strokes per type of shot are added or reduced strokes. For example, always using a driver off a tee. Instances of instead using an iron off the tee produces a better landing position for the next shot than a user's tendencies with a driver. Risking adding a stroke is a difficult decision due to erratic control of the driver as seen in the user's tendencies versus gaining control of the shot to save a stroke. A similar circumstance comes when hazards are present. Placement versus distance is recommended by the AI assistant module 600 based on the user's tendencies. Considerations of placement to avoid a hazard are a sure way to avoid penalty strokes.

In one embodiment, the AI golf application 132 of FIG. 1 also includes a range finder module 152 of FIG. 1 and an input module 154 of FIG. 1. In another embodiment, laser technology is coupled to the range finder module 152 in the glasses. In yet another embodiment, a laser plus GPS receivers are coupled to the range finder module 152 in the glasses. A rangefinder heads-up display that calculates the distance to an object or point selected by the user enables adjustments for selecting a different club. The range finder module 152 can include lasers and timing devices, GPS devices, optical sensors and cameras, LIDAR devices, landscape database object recognition information and triangulation devices to accurately detect distances from the user to an object, heights of objects, contours of landscape, distances between objects and angles between objects.

Audible commands, questions, and responses are used by the user and the AI golf application 132 of FIG. 1 to control the laser rangefinder and cameras to scan objects at a distance through the glasses with AR and GPS. A GPS rangefinder on a mobile device that is replicated as a heads-up display of an overlay of the RTK topographic on the AR glasses while on the golf course to determine distances and to track shots. The heads-up display will highlight hazards along the user's next shot. This will assist in making recommendations to the user of club selection and shot placement targeting.

The collected data is used to increase the predictability of a user shot with a determination of speed, path, and flight arc projection of landing based on 3D LIDAR golf course data. The predictability of a user shot is based on user tendencies when making a shot and this additional data increases the accuracy of the predictions of one embodiment.

Figure 6:
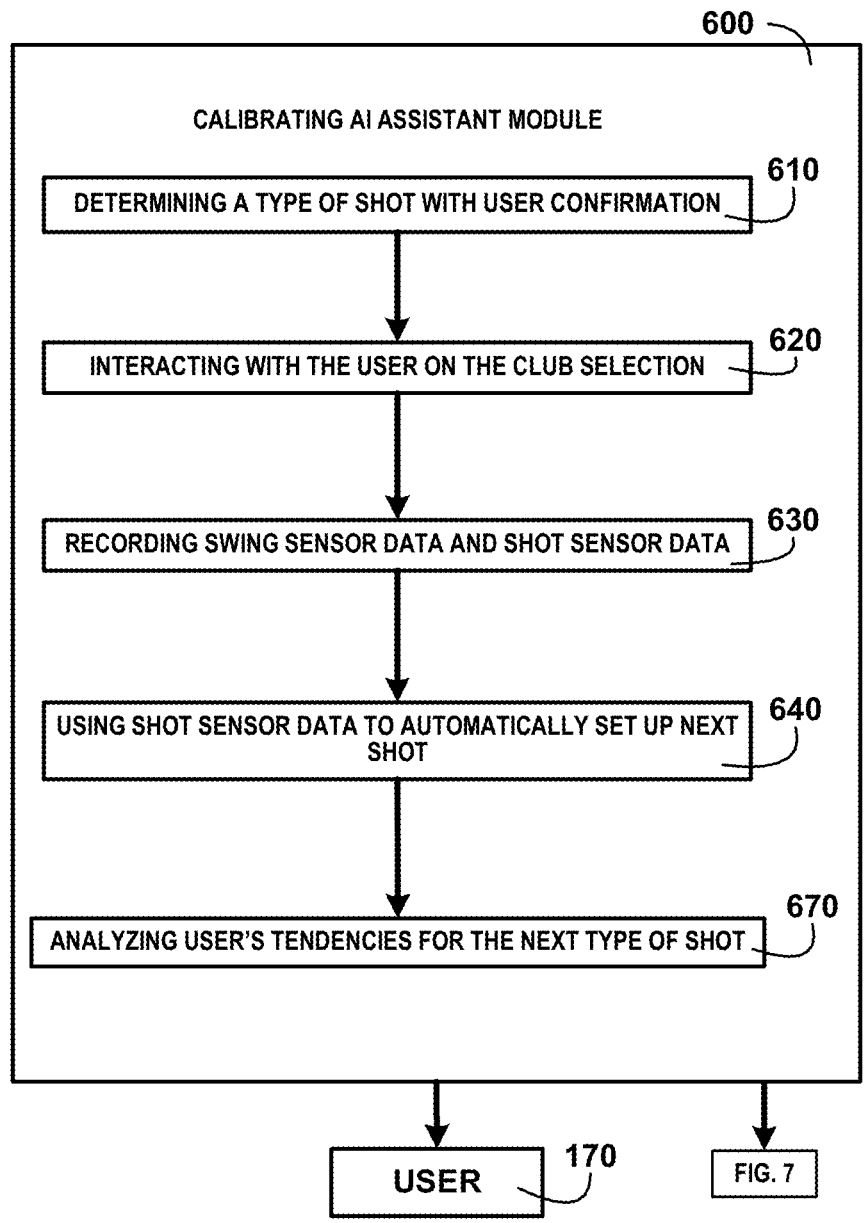
FIG. 6 shows a block diagram of an overview flow chart of calibrating the AI assistant module of one embodiment.
Figure 7:
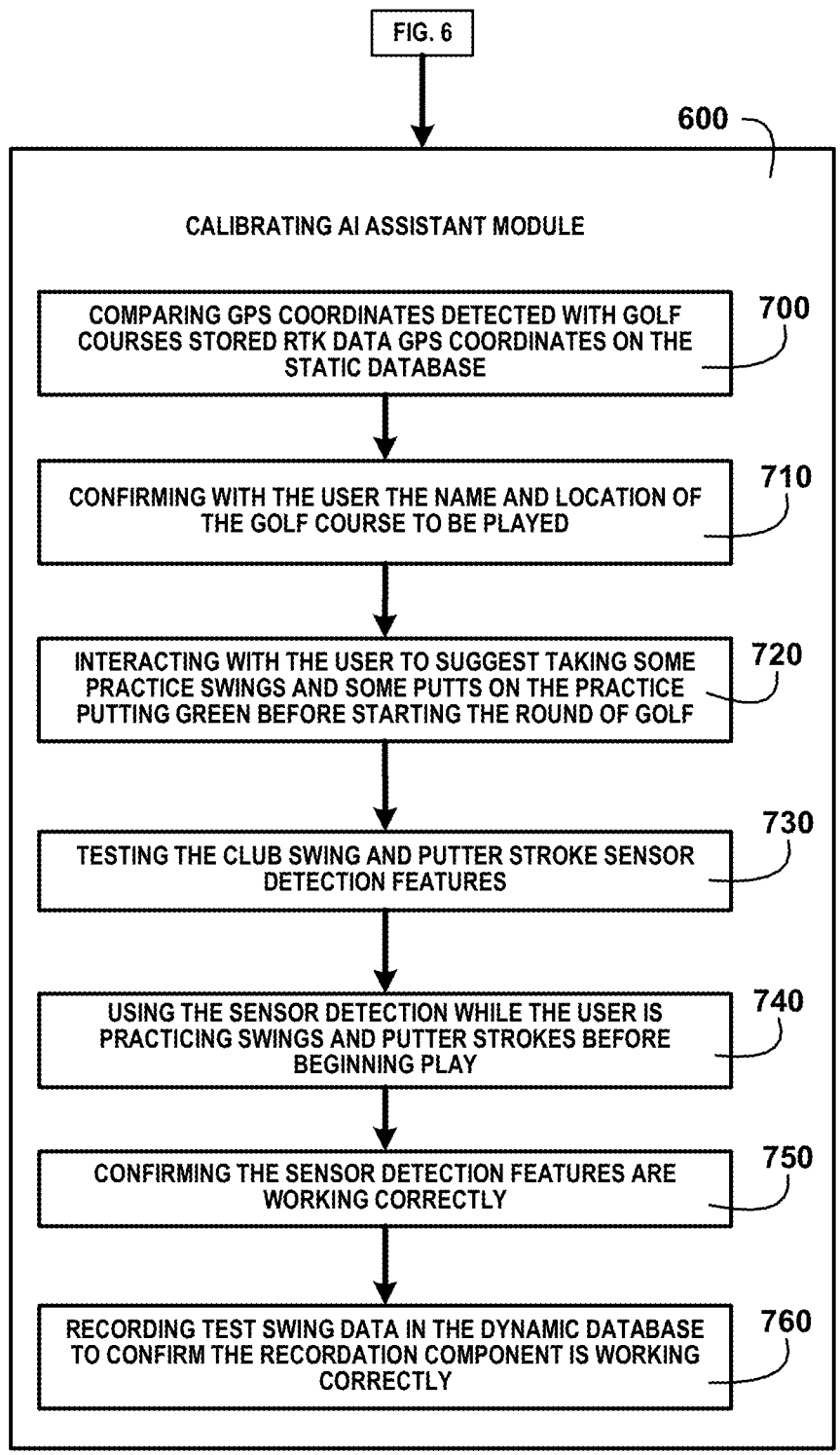
FIG. 7 shows a block diagram of an overview flow chart of calibrating AI assistant module continuation of one embodiment.

FIG. 6 shows a block diagram of an overview flow chart of an AI golf assistant of one embodiment. FIG. 6 shows the calibrating AI assistant module 600. Several sources are used for calibrating the AI assistant module as shown in FIG. 7. The AI golf assistant provides the user with course and hole information and recorded data with interaction by the user for determining a type of shot with user confirmation 610. This is further described in FIG. 8.

The type of shot, location along the fairway, and user tendencies are combined with interacting with the user on a club selection 620. Descriptions continue on FIG. 9. The dynamic database 124 of FIG. 1 stores historical data on the user's golf club swings and stroke performance tendencies data that the AI golf assistant uses in analyzing predictions on current user club selections and adjustments for a user swing to increase the success rate of each shot. This data is collected for each shot including practice swings.

Updating the tendencies is accomplished by recording swing sensor data and shot sensor data 630. The use of the tendencies is described in FIG. 10. Using shot sensor data to automatically set up the next shot 640 that will follow the current shot is taken into account for the current shot placement using the user tendencies, RTK mapping of the course hole, avoidance of obstacles and hazards in route to the current shot placement and avoidance of obstacles and hazards confronting the next shot. The AI golf application 132 of FIG. 1 uses the collected data for analyzing the user's tendencies for the next type of shot 670 by the user 170. The next shot assessment is described further in FIG. 11 of one embodiment.

FIG. 7 shows a block diagram of an overview flow chart of calibrating AI assistant module continuation of one embodiment. FIG. 7 shows calibrating AI assistant module 600 by comparing GPS coordinates detected with golf courses stored RTK data GPS coordinates on the static database 700. Confirming with the user the name and location of the golf course to be played 710 and interacting with the user to confirm the golf hole on the golf course is being played at times during play. Interacting with the user to suggest taking some practice swings and some putts on the practice putting green before starting the round of golf 720.

Testing the club swing and putter stroke sensor detection features 730. Using the sensor detection features while the user is practicing swings and putter strokes before beginning play 740. Confirming the sensor detection features are working correctly 750. Recording test swing data in the dynamic database to confirm the recordation component is working correctly 760. Analyzing the current practice swings with previous practice and shot swings to determine any changes in the user swings, particularly noting any improvements of one embodiment.

Figure 8:
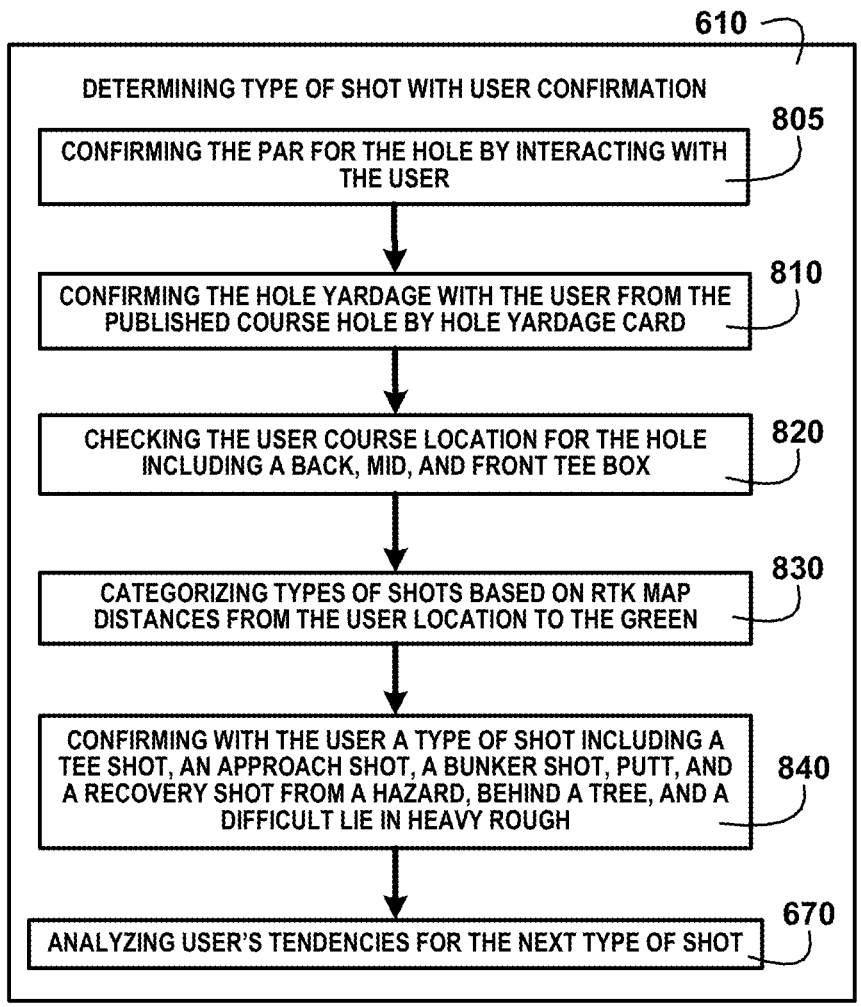
FIG. 8 shows a block diagram of an overview flow chart of determining the type of shot with user confirmation of one embodiment.

FIG. 8 shows a block diagram of an overview flow chart of calibrating AI assistant module continuation of one embodiment. FIG. 8 shows the determining type of shot with user confirmation 610. Determining the type of shot with user confirmation 610 includes confirming the par for the hole by interacting with the user 805. Confirming the hole yardage with the user from the published course hole by hole yardage card 810. Checking the user course location for the hole including a back, mid, and front tee box 820. Categorizing types of shots based on RTK map distances from the user location to the green 830. Confirming with the user a type of shot including a tee shot, an approach shot, a bunker shot, a putt, and a recovery shot from a hazard, behind a tree, and a difficult lie in heavy rough 840. Analyzing user's tendencies for the next type of shot 670 of FIG. 6 of one embodiment.

Figure 9:
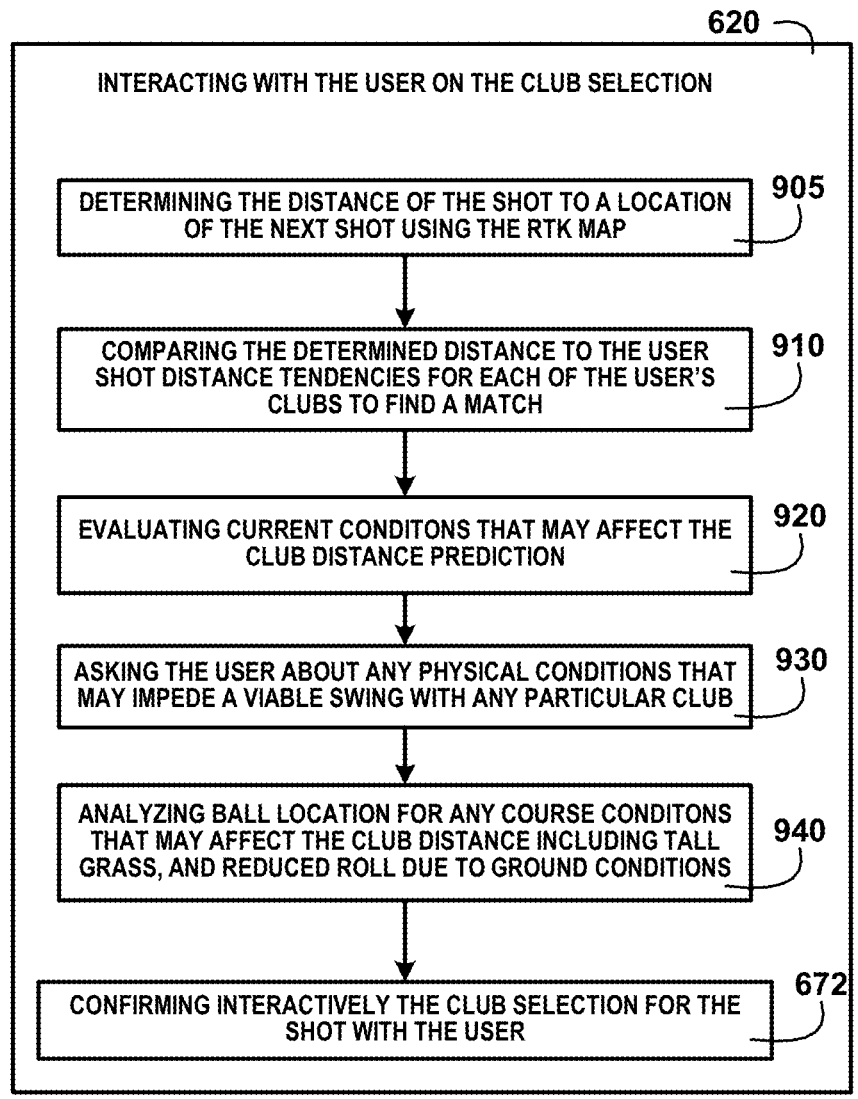
FIG. 9 shows a block diagram of an overview flow chart of interacting with the user on the club selection of one embodiment.

FIG. 9 shows a block diagram of an overview flow chart of determining the type of shot with user confirmation of one embodiment. FIG. 9 shows interacting with the user on the club selection 620. The interaction with the user includes determining the distance of the shot to the location of the next shot using the RTK map 905. Comparing the determined distance to the user shot distance tendencies for each of the user's clubs to find a match 910. Evaluating current conditions that may affect the club distance prediction 920. Ask the user about any physical conditions that may impede a viable swing with any club 930. Analyzing ball location for any course conditions that may affect the club distance including tall grass, and reduced roll due to ground conditions 940. Confirming interactively the club selection for the shot with the user 672 of one embodiment.

Figure 10:
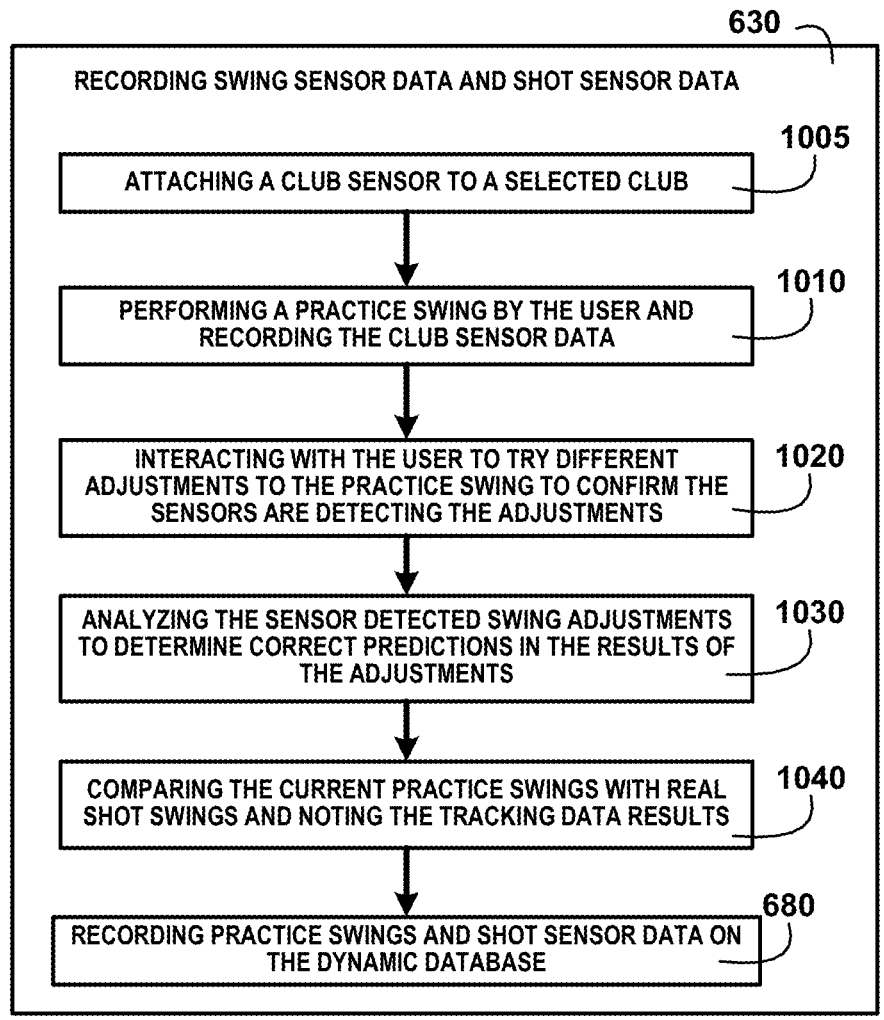
FIG. 10 shows for illustrative purposes only an example of recording swing sensor data and shot sensor data of one embodiment.

FIG. 10 shows a block diagram of an overview flow chart of interacting with the user on the club selection of one embodiment. FIG. 10 shows recording swing sensor data and shot sensor data 630. Collecting swing data, the user attaches a club sensor to a selected club 1005. The user proceeds to perform a practice swing by the user and recording the club sensor data 1010. Interacting with the user to try different adjustments to the practice swing to confirm the sensors are detecting the adjustments 1020. Analyzing the sensor detected swing adjustments to determine correct predictions in the results of the adjustments 1030. Comparing the current practice swings with real shot swings and noting the tracking data results 1040. Recording practice swings and shot sensor data on the dynamic database 680 of one embodiment.

Figure 11:
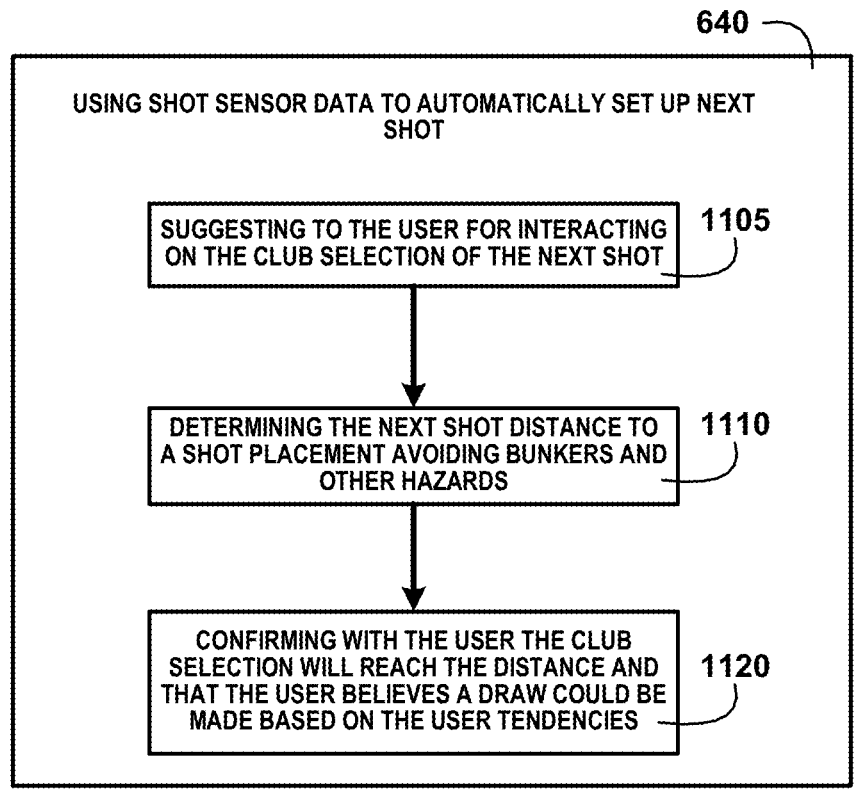
FIG. 11 shows a block diagram of an overview of using shot sensor data to automatically set up the next shot of one embodiment.

FIG. 11 shows for illustrative purposes only an example of recording swing sensor data and shot sensor data of one embodiment. FIG. 11 shows using shot sensor data to automatically set up the next shot 640. The AI golf assistant module suggests that the user interacts with the club selection of the next shot 1105. Determining the next shot distance to a shot placement avoiding bunkers and other hazards 1110. Confirm with the user the club selection will reach the distance and that the user believes a draw could be made based on the user tendencies 1120 of one embodiment.

Figure 12:
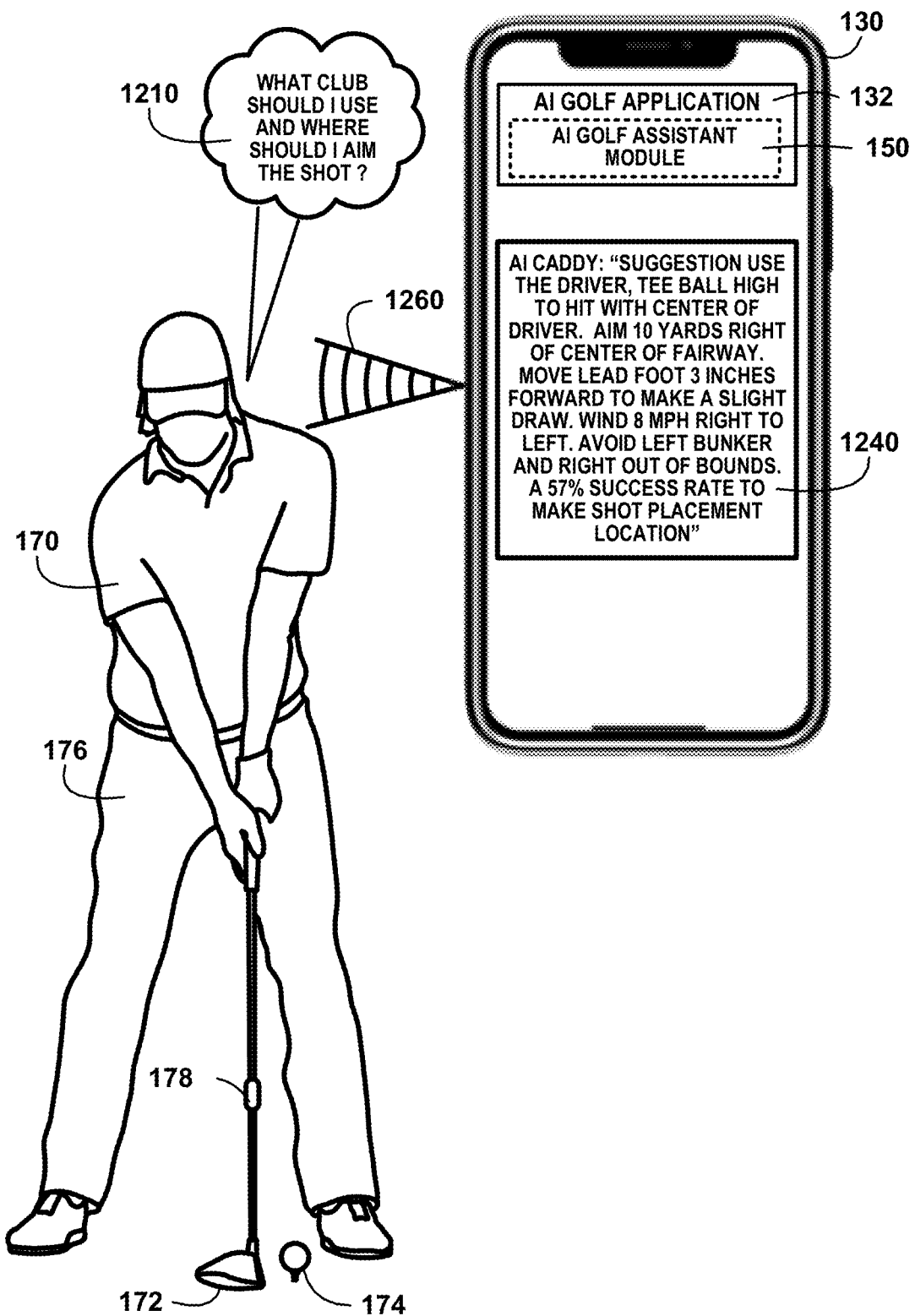
FIG. 12 shows a block diagram of an overview of a tee shot of one embodiment.

FIG. 12 shows a block diagram of an overview of a tee shot of one embodiment. FIG. 12 shows the user's mobile device 130 having the AI golf application 132 and its AI golf assistant module 150. The AI golf assistant module 150 uses at least one artificial intelligence and machine learning processor 122 to generate golf shot recommendations and suggestions based on the user course location and user tendencies and high-success shots of other amateurs and professional golfers on the same hole. The AI golf assistant module 150 interacts with the user with the AI caddy on the user's mobile device 130 to offer audible golf shot recommendations and suggestions and receive user verbal questions and two-way responses to the recommendations, suggestions, and user questions.

For example, the user asks, "What club should I use and where should I aim the shot?" 1210. FIG. 12 shows the user 170 having the club sensor receiver 176. The user is holding the driver 172 with the club sensor 178 attached. The user 170 is addressing the golf ball 174. The AI caddy: "Suggestion uses the driver, tee ball high to hit with the center of the driver. Aim 10 yards right of the center of the fairway. Move the lead foot 3 inches forward to make a slight draw. Wind 8 mph right to left. Avoid the left bunker and right out of bounds. A 57% success rate to make shot placement location" 1240 is the AI golf assistant module 150 verbal response 1260 of one embodiment.

The club sensor 178 includes a launch monitor to advise the user 170 with reasons for the recommendations. For example, the club sensor 178 launch monitor provides recommendations for club speed and explains audibly "Club speed is the velocity that the club head travels measured just before ball contact". The angle of attack is the angle at which the clubhead approaches the ball during impact, influencing ball flight, spin, and distance, and the path of the clubhead is measured in degrees. The angle of attack during impact influences the ball's flight, spin, and distance.

The ball speed is a measurement of the golf ball's velocity measured just after impact. The ball speed is the main component in generating distance. The launch angle is the initial vertical angle of the ascent relative to the ground plane measured in degrees. The launch angle, combined with ball spin and speed, will determine the ball's carry and total distance. The azimuth is also known as the side angle or deviation angle. The initial horizontal angle relative to the target line. The azimuth, combined with side spin, will determine the final ball position down range relative to the target line.

A side spin is a component of total spin that defines ball curvature or shot shape. Also related to the spin-tilt axis. The side spin includes negative side spin and positive side related to a draw and slice. Backspin is a component of total spin that defines ball lift and trajectory. Total spin is the total amount of spin around the tilt axis that creates curvature and lift. The spin-tilt axis is the axis that the golf ball rotates around to create shot curvature and lift. When the spin-tilt axis is positioned to the left, looking down range, the ball's trajectory will move from right to left. When the spin-tilt axis is positioned to the right, looking down range, the ball's trajectory will move from left to right.

Trees are hazards confronting the user 170 on a hole. The RTK topography shows the height of the trees on the course. The user tendencies show a peak height achieved by the user 170 for each club. The peak height is the apex of the trajectory measured from the ground plane. The AI golf assistant module 150 verbal recommendation will list the clubs with sufficient peak height to allow the user 170 to make a shot over the tree hazard. The user 170 may question the AI golf assistant module 150 whether it would be more advisable to make a shot around the tree rather than attempt to go over the tree. At least one artificial intelligence and machine learning processor 122 and at least one artificial intelligence and machine learning processor 122 analyses the user tendencies and the previous results of other amateurs and professional golfers and determines the user 170 has a higher percentage of gaining a stroke if the user 170 makes a shot around the tree. The user 170 agrees with the AI golf assistant module 150 verbal response to the user's question and proceeds to play around the tree.

Offline is the end position distance right or left measured from the target line. Carry is the total distance of flight produced by the initial launch condition. Total distance is the combined ball flight with bounce and roll the golf ball will travel for the shot. The AI golf assistant module 150 interactive verbal responses and explanations of the specific issue related to a recommendation allows the user 170 to better understand the reasons for the recommendations and to make adjustments to correct the swing to fit the circumstances encountered on the course.

The launch monitor may be integrated into the club sensor, integrated into the club grip, club shaft, or club head. The launch monitor may also be a separate device that can be positioned near the golf ball before the swing. In one embodiment, the launch monitor may transmit and display the data on a user's mobile device and audibly broadcast the data through the AI golf application 132 installed on the user's mobile device. In another embodiment, the launch monitor may transmit and display the data on a user's AI golf assistant glasses 210 of FIG. 2 lenses and broadcast the data audibly on micro speakers 1580 of FIG. 15.

A launch monitor may use various technologies including Doppler radar technology, high-speed cameras, photometrics, and other technologies. Launch monitors may use wireless communication devices compatible with mobile device operating systems, may have displays, and may be portable or integrated into golf club structures including grips, shafts, and club heads. A launch monitor analyzes a user's swing, tracks user progress in gaining strokes, and is used during practice sessions, indoors with golf simulators, or outside while playing a round of golf. The launch monitor gathers data and analyzes the data to generate data-driven improvements for a golfer. Launch Monitor Data are parameters including the flight of the ball, the movement of the golf club head, speeds, spins, distances, angles, impact characteristics, and performance measures such as dispersion. The analysis calculates user skill levels in tee shots, approach shots, chipping, and putting and compares the skill levels for each type of shot.

In one embodiment, the golf shot is tracked using a sensor coupled to the head of a club. The club head sensor detects the first impact of the club head with the golf ball. The club head sensor records the GPS coordinates of the first impact. In the next shot, the club head sensor records the GPS coordinates of a second club head golf ball impact and records the GPS coordinates of the second impact. The club head sensor records the GPS coordinates of each subsequent club head golf ball impact until the hole is completed on the green.

In another embodiment, the golf shot can be tracked with a sensor coupled to the golf equipment or the user's mobile device 130 to determine when the golf ball is struck indicating a shot has occurred. In addition, subsequent shots can determine distances and locations of previous ones, as each shot is linked with the next.

Also, other types of sensors, including audible sensors, optical sensors, motion sensors, location sensors, pressure sensors, magnetic sensors, and other sensors capable to reliably detect a golf shot can be used. In addition, self-reporting voice commands can be used to alert the AI golf assistant module 150 that a golf shot was made at a certain location that needs to be tracked. In another embodiment, the AI golf assistant module 150 tracks extra golf shots, such as provisional golf shots or "mulligan" or secondary golf shots that the user desires to hit again either with or without adding golf scoring penalties to the user's statistics and/or scoring. In another embodiment, the AI golf assistant module 150 can be used to allow multiple users to in competitive rounds of golf by disabling certain features of the AI golf assistant module 150 to comply with local rules and governing body rules of golf.

In another embodiment, the AI golf assistant module 150 can be used by multiple users to allow the users to compete against each other either while they are playing together or playing virtually in golf competitions. In this embodiment, the AI golf assistant module 150 collects data about each user and automatically records each shot and scores for each user that is local, remote, or virtual. In one embodiment, competitive golf rounds can be organized amateur and/or professional leagues, including in-person physical leagues and virtual leagues, where the AI golf assistant module 150 can be used to automatically organize, control, track, monitor, judge and keep score of golf rounds for the competitive leagues.

The AI golf assistant module includes a processor that superimposes each in order of the recorded club head golf ball impacts using the GPS coordinates on an overlay of the RTK topography and calculates the distance between the impacts. The superimposed tracked impacts are connected linearly to show the tracked route of the golf ball in relationship to the hole topography. The user 170 reviews after the hole completion or after the last hole played to see the tracked data to assess the outcomes of the shots. The displayed impact data includes the club used for the shot, the trajectory of the golf ball, and the distance achieved with the shot of one embodiment.

Figure 13A:
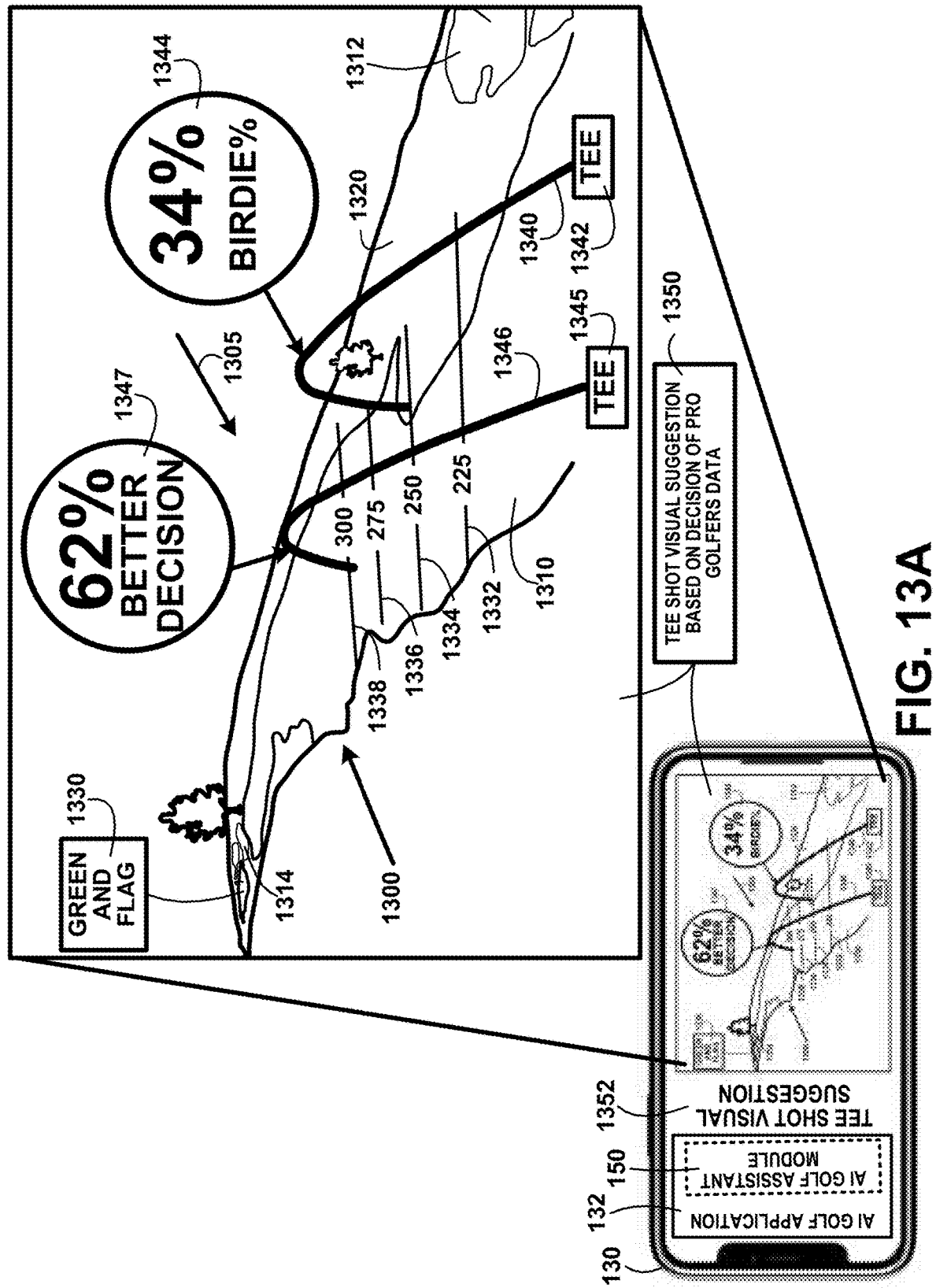
FIG. 13A shows a block diagram of an overview of a tee shot visual suggestion of one embodiment.

FIG. 13A shows a block diagram of an overview of the tee shot visual suggestion of one embodiment. FIG. 13A shows the user's mobile device 130 having the AI golf application 132 and it's AI golf assistant module 150 feature. The AI golf assistant module 150 is displayed on the user's mobile device 130 RTK course hole layout 1300. Also shown is the wind 1305, a fairway 1310, bunker 1312, a bunker near green 1314, rough 1320, and a green and flag 1330.

FIG. 13A shows the distance of an average amateur tee shot 1332 from the tee that other players reach with a tee shot. Players at the user's skill level hit past 225 yards from tee 1332 and reach 250 yards from tee 1334. The poor shot placement lands the golf ball in the rough. Players at a more advanced skill level hit past the 275 yards from tee 1336 and reach near the 300 yards from tee 1338 in the center of the fairway 1310.

The average amateur tee shot 1332 from the amateur tee 1342 has a 34% birdie % 1344. The advanced scoring tee shot 1345 from the mid tee 1346 has a 62% better decision 1347. One major improvement of the advanced scoring tee shot 1345 is the shot placement. Landing in the rough 1320 creates a more difficult next shot. The tee shot visual suggestion based on the decision of pro golfers' data 1350 produces a tee shot visual suggestion 1352 to aim the user tee shot to the center of the fairway 1310. The AI caddy can alert the user of a shot that will be affected by the user's stored average golf shot distance and dispersion and successful shots that overcame dispersion by other amateurs and professionals of one embodiment.

Figure 13C:
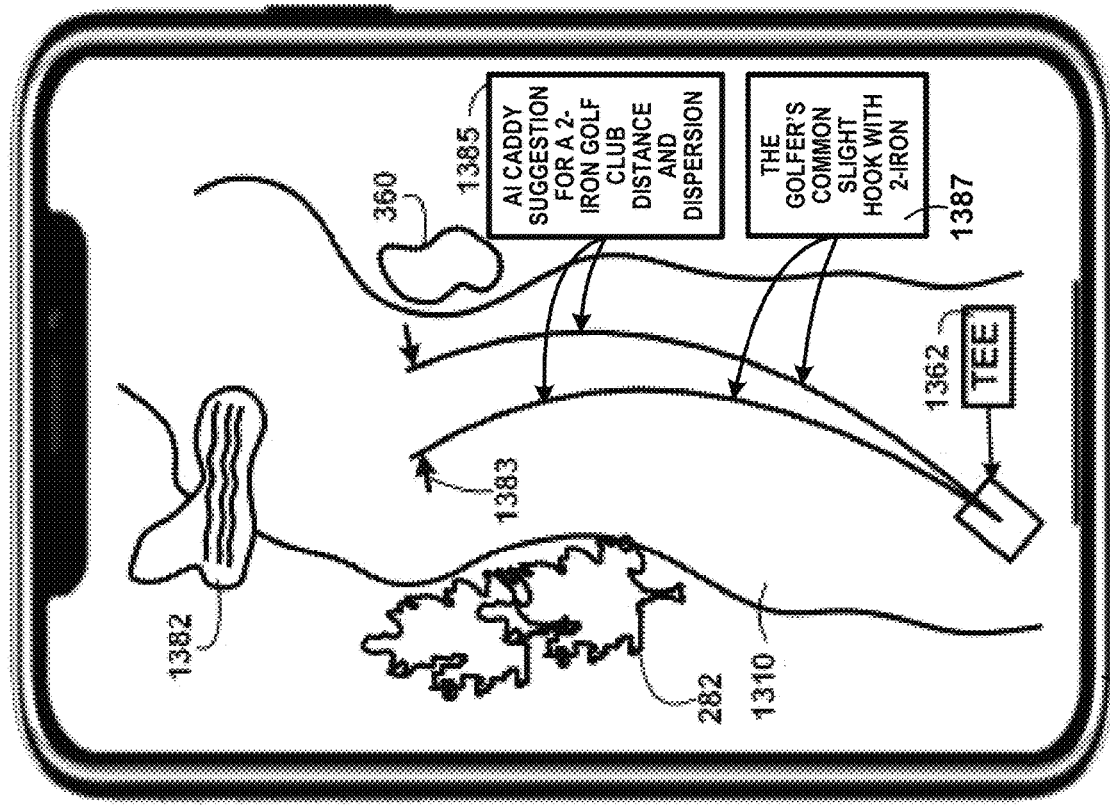
FIG. 13C shows for illustrative purposes only an example of a 2-iron golf club distance and dispersion of one embodiment.
Figure 13B:
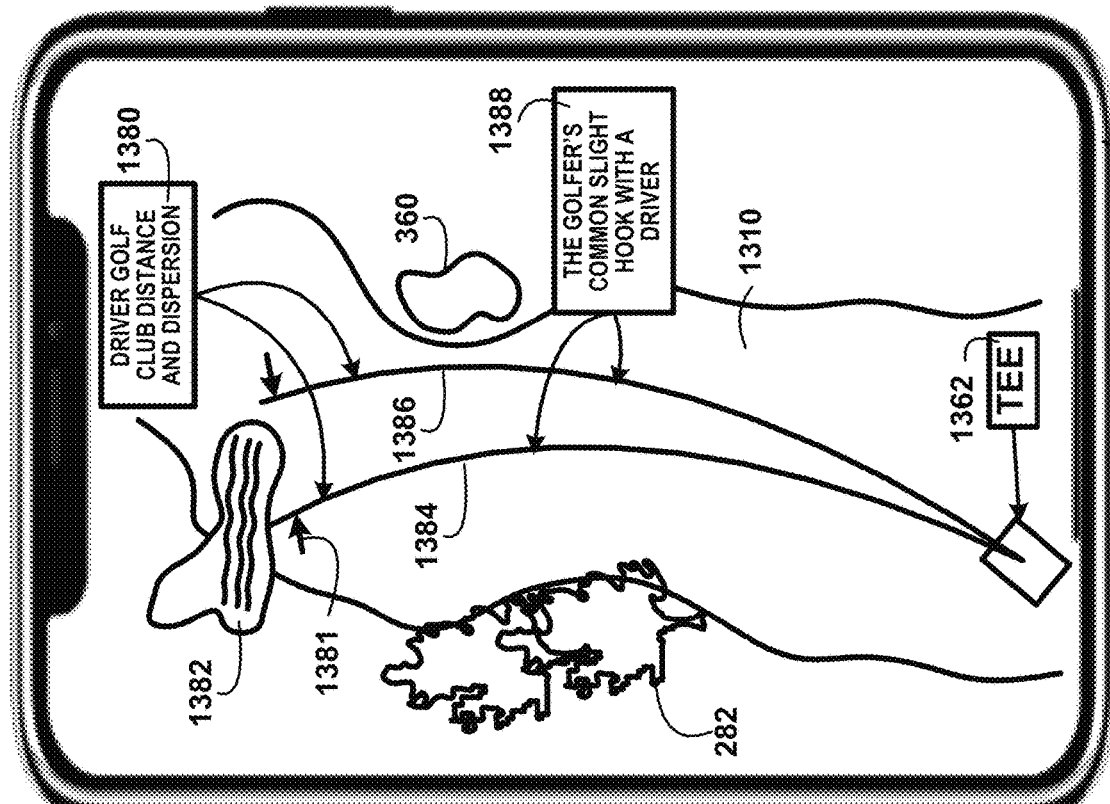
FIG. 13B shows for illustrative purposes only an example of driver golf club distance and dispersion of one embodiment.

FIG. 13B shows for illustrative purposes only an example of driver golf club distance and dispersion of one embodiment. FIG. 13B shows the user's mobile device 130 having the AI golf application 132 of FIG. 1 displaying the current hole the user is beginning to play. In one embodiment, the user is at the tee 1362 at the start of the fairway 1310. The RTK topography map shows the nearest tree 282. The RTK topography map also shows a bunker 360 to the right.

The AI assistant can alert the user of a shot that will be affected by the user's stored average golf shot distance and dispersion and successful shots that overcame dispersion by other amateurs and professionals. A hook or slice will vary in the amount of curvature imparted on the golf ball flight. Dispersion is the spread of the landing of the shot that will vary due to the curve of the flight trajectory. For example, the user may have an intended landing in the middle of the fairway but selects, for example, a driver.

Further from the tee 1362 is a water hazard 1382. The AI golf application 132 of FIG. 1 shows the driver golf club the user normally selects. The AI golf application 132 of FIG. 1 superimposes the user tendency of the user's driver shots. The user's tendency is the golfer's common slight hook with a driver 1388. The driver shot tendency has an average greater hook curve 1384 and an average lesser hook curve 1386. The spread of the golf ball landings between the average greater hook curve 1384 and the average lesser hook curve 1386 is referred to as dispersion. The user selects the driver to get a long distance. However, in this hole, the dispersion distance 1381 can lead to the golf ball ending up in the water hazard 1382. The driver golf club distance and dispersion 1380 may cause the hook to land the golf ball in the water hazard 1382 or roll into the water hazard 1382 of one embodiment.

FIG. 13C shows for illustrative purposes only an example of a 2-iron golf club distance and dispersion of one embodiment. FIG. 13C shows the user's mobile device 130 having the AI golf application 132 of FIG. 1 displaying the current hole. The dispersion will spread in an ever-increasing width the further the ball travels. This can result in an unintended course to a hazard. The AI caddy may suggest a shorter club to minimize the dispersion and shorten the distance to prevent reaching the hazard.

The user at the tee is beginning to play at the start of the fairway 1310. The RTK topography map shows the nearest tree 282. The RTK topography map also shows a bunker 360 to the right and further from the tee 1362 is the water hazard 1382.

The user's mobile device 130 also displays an AI assistant suggestion for a 2-iron golf club distance and dispersion 1385. The AI assistant shows the user's tendency with the 2-iron golf club. The golfer's common slight hook with 2-iron 1387 shows a short shot distance and reduced dispersion. The shorter distance and 2-iron average dispersion 1383 demonstrates the user has more shot control with the 2-iron versus the driver. In this instance, the water hazard poses a multi-stroke penalty opportunity as compared with eliminating the risk of a penalty versus a well-placed shot near the center of the fairway for the next shot of one embodiment.

Figure 14:
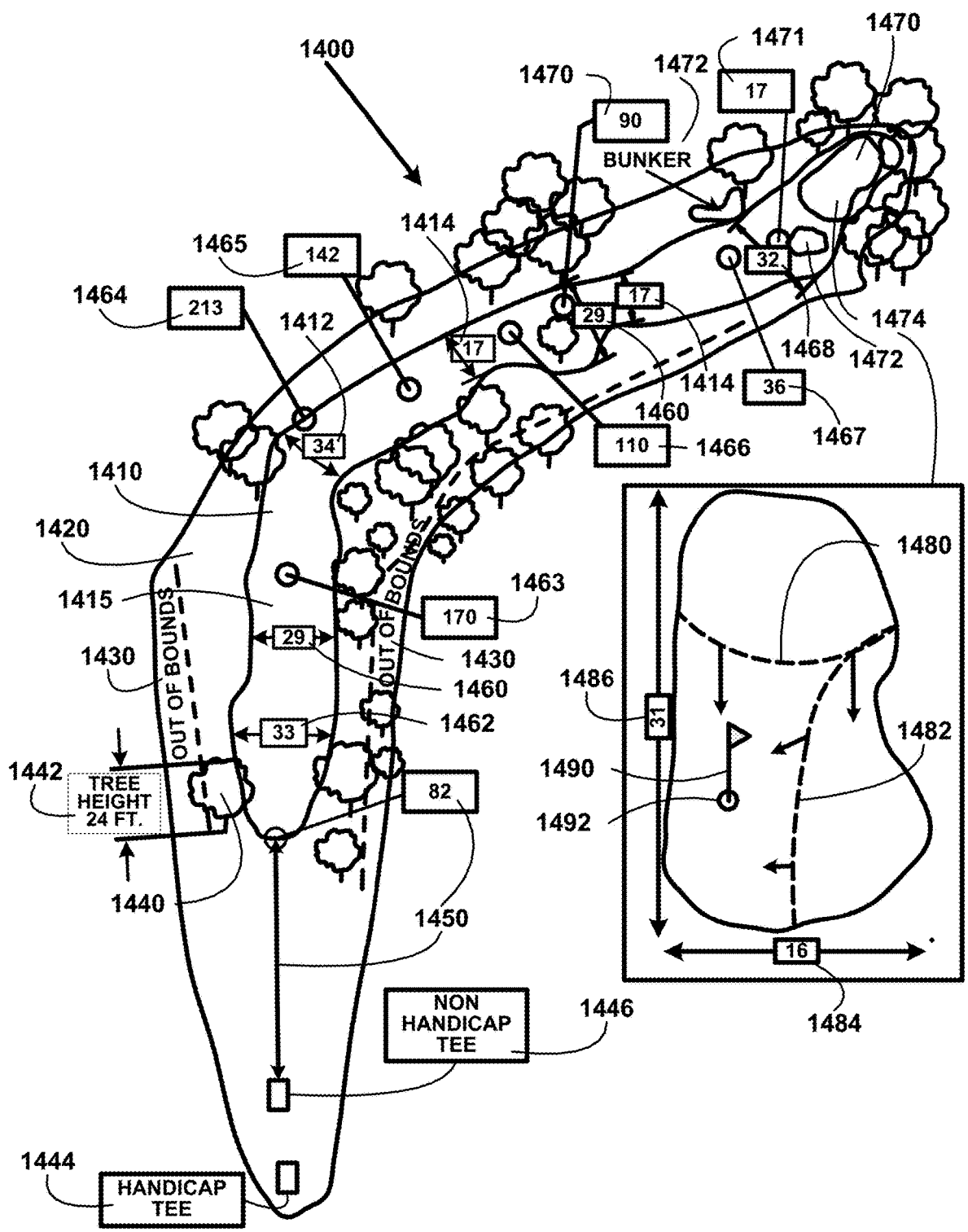
FIG. 14 shows for illustrative purposes only an example of a RTK golf course hole plan view of one embodiment.

FIG. 14 shows for illustrative purposes only an example of a RTK golf course hole plan view of one embodiment. FIG. 14 shows an RTK golf course hole plan view 1400. Starting at the handicap tee 1444 and the non-handicap tee 1446 a tree 1440 with a tree height of 24 ft. 1442. The distance shown is 82 yards to Fairway 1450. The shot placement is important to an entry tee shot to the hole because of the proximity of the trees to the fairway 1415 and penalty out of bounds 1430 on both sides in the rough.

The fairway widens to a 33-yard fairway width 1462 then narrows to a 29-yard fairway width 1460. It is 170 yards from non-handicap tee 1463 nearing the dogleg right 1410. The AI golf assistant module 150 of FIG. 1 suggests to the user to, "Use a 3 or 4-wood to the left side of the fairway 1415 to avoid the trees on the right side at the dogleg right 1410. A slight fade to avoid the rough 1420. This will better position the next shot through the dogleg right" 1410.

The user responds, "The 2 or 3-iron might be better as the user has better control of the long irons and I can usually get 180 to 190 yards which will be close to the shot placement you suggested". The RTK golf course hole plan view 1400 shows it is 213 yards from a non-handicap tee 1464 past the dogleg right 1410. The AI golf assistant module 150 of FIG. 1 interacts with the user with a reply that, "The distance between the 170 yards from non-handicap tee 1463 and the 213 yards from non-handicap tee 1464 is approximately 191 yards and the user response of a 2 or 3-iron would work perhaps better with the 2-iron to get closer to the 190 distance for setting up the next shot".

The user selects the 2-iron and prepares to hit the tee shot aiming to the left side of the fairway with a slight fade. The AI golf assistant module 150 of FIG. 1 interacts with the user to, "Suggest one or two practice swings with the 2-iron to check the predictable result". The user responds with an agreement. The prediction of the two practice swings shows a result for both landing at or near the shot placement position. The AI golf assistant module 150 of FIG. 1 displays on the RTK golf course hole plan view 1400 displayed on the user's mobile device 130 of FIG. 1 the landing positions of the two practice swings predicted landing positions. The user makes the shot and as predicted the golf ball lands near the shot placement.

The 34-yard fairway width 1412 at the dogleg right 1410 provides a clear path to the first 17-yard fairway width 1414 narrowing. The user asks, "What is the distance between the first narrowing of the fairway and the second narrowing?" The AI golf assistant module 150 of FIG. 1 responds to the user, "Approximately 125 yards to the first and 165 yards to the second narrowing". The user then asks, "What about a 5-iron to reach the second narrowing to get closer to the green for a shorter approach shot?". The AI golf assistant module 150 of FIG. 1 responds to the user, "You tend to hit a straight 5-iron but only an average of 150 yards, the 4-iron averages 160 to 165 yards but tends to have a slight hook". The AI golf assistant module 150 of FIG. 1 responds to the user, "Are you confident about countering the hook with a fade similar to the 2-iron first tee shot?".

The user asks, "How do I adjust to not under or overcorrect with the fade shot?" The AI golf assistant module 150 of FIG. 1 responds, "The average slight hook would be equivalent to a 3-inch draw shot, so an adjustment of a 4 to 5-inch movement of the lead foot back would counter the hook and produce a slight fade". The RTK course hole map 1400 indicates this next shot will pass the 142 yards from green 1465 and approach or pass the second 17-yard fairway width 1414. This may also pass the 110 yards to green 1466 to 90 yards to green 1470. The AI golf assistant module 150 of FIG. 1 suggests, "Try at least one practice swing with the 4-iron". The user agrees. The predictions of the user's three 4-iron practice swings show the stance adjustment will correct the hook and make a fade that will keep the landing point clear of the trees and near the center of the second narrowing. The user proceeds to make the next second shot. The prediction was correct except the golf ball rolled further than anticipated and left about 83 yards to the green.

The RTK golf course hole plan view 1400 shows at that landing point it passed the 29-yard fairway width 1460 and is left of the center of the second 17-yard fairway width 1414. The user queries the AI golf assistant module 150 of FIG. 1 about using an 8-iron to the front of the green on the left side towards the flag 1490. The AI golf assistant module 150 of FIG. 1 points out bunker 1472 on the left and bunker 1472 on the right in front of the green 1470 at the 32-yard fairway width 1468. The AI golf assistant module 150 of FIG. 1 adds that the flag 1490 is about 10 yards from the front of the left side of the green 1470. The AI golf assistant module 150 of FIG. 1 responds to the user question, "Your 8-iron tendency is 115 yards which would land towards the back of the green. Your 9-iron tendency is 102 yards. The distance to the flag is 93 yards. The green slopes to the left and front on the left front side. The slopes with the added backspin of the 9-iron should roll the golf ball towards the flag shortening the putt".

The user agrees and will try some practice swings to try and reduce the 9-iron yardage to get closer to the flag 1490. The predictions for the 2 practice swings show the user would cut 5 yards off the 102 average tendency and hit a straight shot. The user proceeds with the 9-iron approach shot to the green. The golf ball lands 7 yards past the flag and rolls back 4.5 yards. The three shots to get on the green are superimposed on the RTK course hole map 1400 using the tracking data results 1040 of FIG. 10. The approach shot past the 36 yards to green 1467 and 17 yards to green 1471 yardages. The green details 1474 section of the map indicates the golf ball position on the green 1470. The green details 1474 show the 16 yards green width 1484 and 31-yard green length 1486 general dimensions of the green and the back downhill slope 1480 and right to left downhill slope 1482 on the left front portion of the green 1470 where the user hit the green.

The user has a 7.5-foot downhill putt to the cup 1492. The user places a ball marker 2202 of FIG. 22 behind the golf ball and reviews the ball marker user interface 2222 of FIG. 22 to see the angle and force of the putt to sink the golf ball in the cup 1492. The user takes 2 practice putts and sees the results that the putt should be turned 1 inch to the left to follow the target path 2342 of FIG. 23 to the cup. The user makes the putt and lands the golf ball in the cup. The user has made par for the hole.

While waiting for the next hole to clear for the tee shot, the user and the AI golf assistant module 150 of FIG. 1 review the previous hole. The AI golf assistant module 150 of FIG. 1 points out the improvements the user has made on the fade shots and well-thought-out adjustments suggested during the interaction that led to the user scoring a par for a difficult hole of one embodiment.

Figure 15:
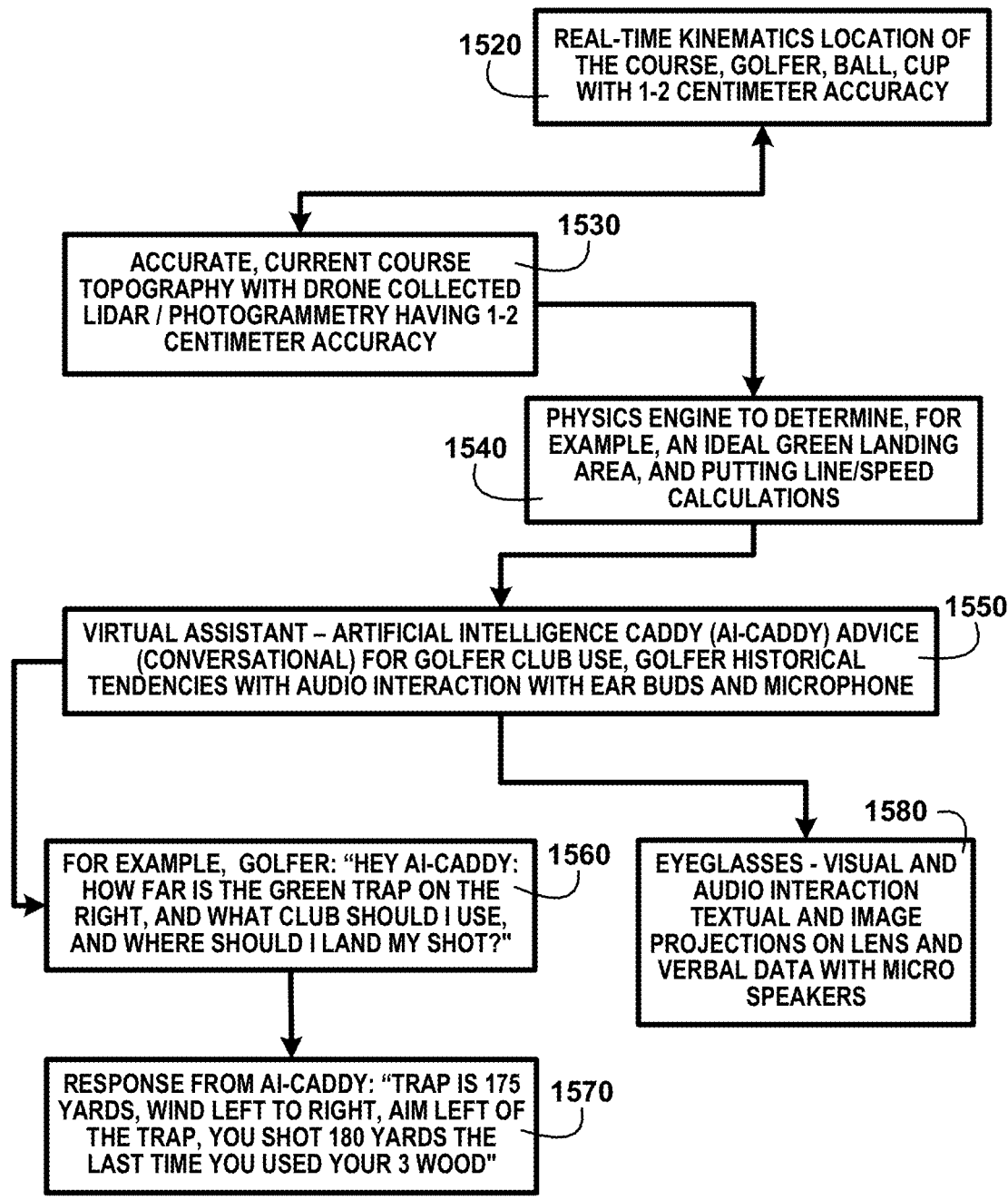
FIG. 15 shows for illustrative purposes only an example of the real-time kinematics of one embodiment.

FIG. 15 shows for illustrative purposes only an example of the real-time kinematics of one embodiment. FIG. 15 shows real-time kinematics location of the course, golfer, ball, and cup with 1-2-centimeter accuracy 1520. In one embodiment, the accurate, current course topography with drone collected lidar/photogrammetry having 1-2-centimeter accuracy 1530. A physics engine to determine, for example, an ideal green landing area, and putting line/speed calculations 1540. A virtual assistant-artificial intelligence assistant (AI-assistant) advice (conversational) for golfer club use, golfer historical tendencies with audio interaction with ear buds and microphone 1550.

For example, golfer: "Hey AI-assistant: how far is the green trap on the right, and what club should I use, and where should I land my shot?" 1560. The response from the AI assistant: "Trap is 175 yards, wind left to right, aim left of the trap, you shot 180 yards the last time you used your 3-wood" 1570. The user may also use AI golf application 132 of FIG. 1 eyeglasses-visual and audio interaction textual and image projections on the lens and verbal data with micro speakers 1580 to see and hear suggestions and data related to the personalized user tendencies and predictions of shot success from practice swings and putting strokes analysis of one embodiment.

Figure 16:
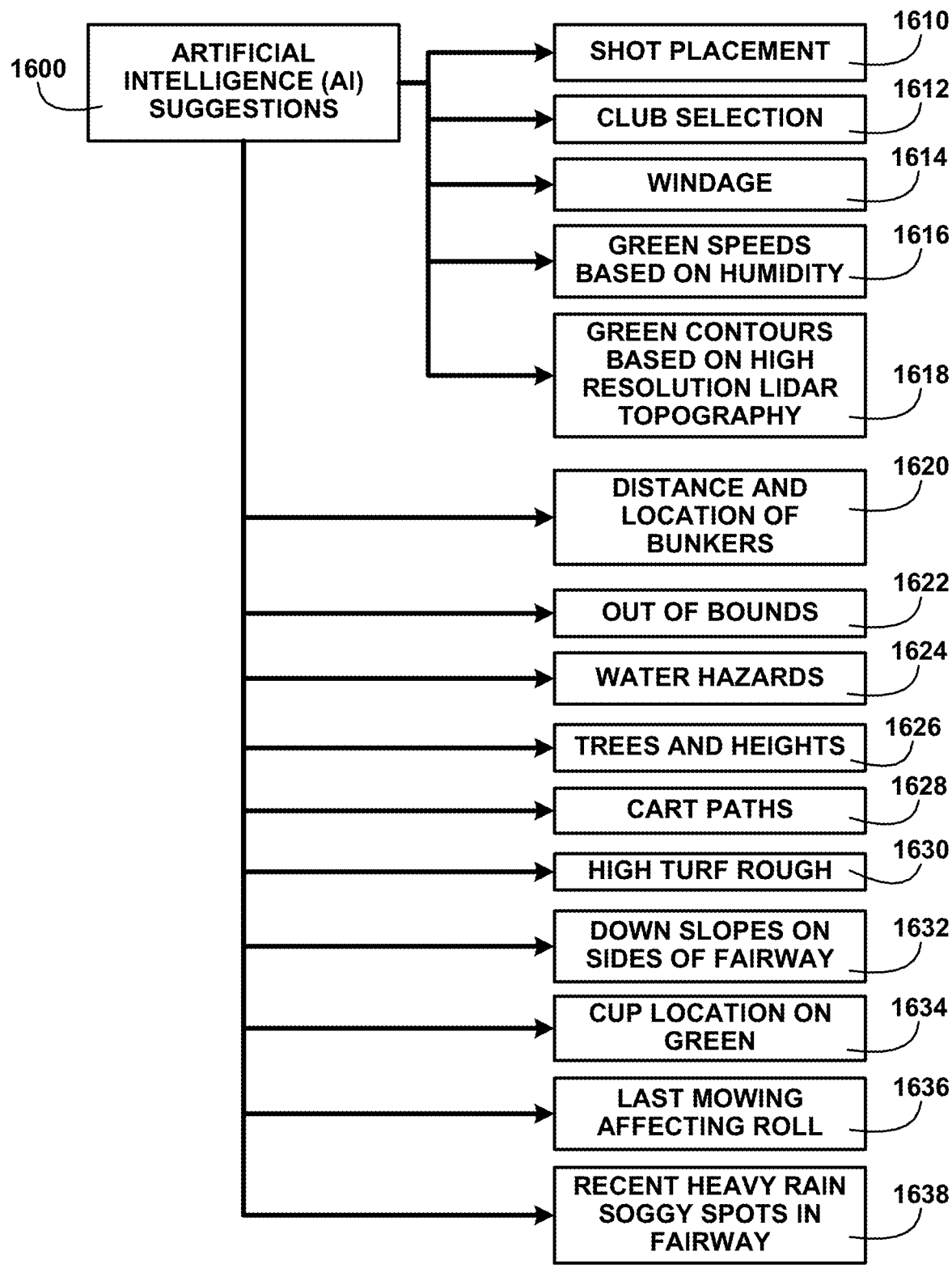
FIG. 16 shows for illustrative purposes only an example of artificial intelligence (AI) suggestions of one embodiment.

FIG. 16 shows for illustrative purposes only an example of artificial intelligence (AI) suggestions of one embodiment. FIG. 16 shows artificial intelligence (AI) suggestions 1600 based on the user's stored tendencies and stored results of other amateur and professional golfers. The AI golf assistant module 150 of FIG. 1 responds to user questions and offers suggestions on several topics, for example, shot placement 1610, club selection 1612, windage 1614, green speeds based on humidity 1616, and green contours based on high-resolution lidar topography 1618.

Other topics include the distance and location of bunkers 1620, out-of-bounds 1622, water hazards 1624, trees and heights 1626, and cart paths 1628. Some topics, for example, relate to the course condition including high turf rough 1630, down slopes on sides of fairway 1632, cup location on green 1634, last mowing affecting roll 1636, and recent heavy rain soggy spots in fairway 1638 of one embodiment.

Figure 17:
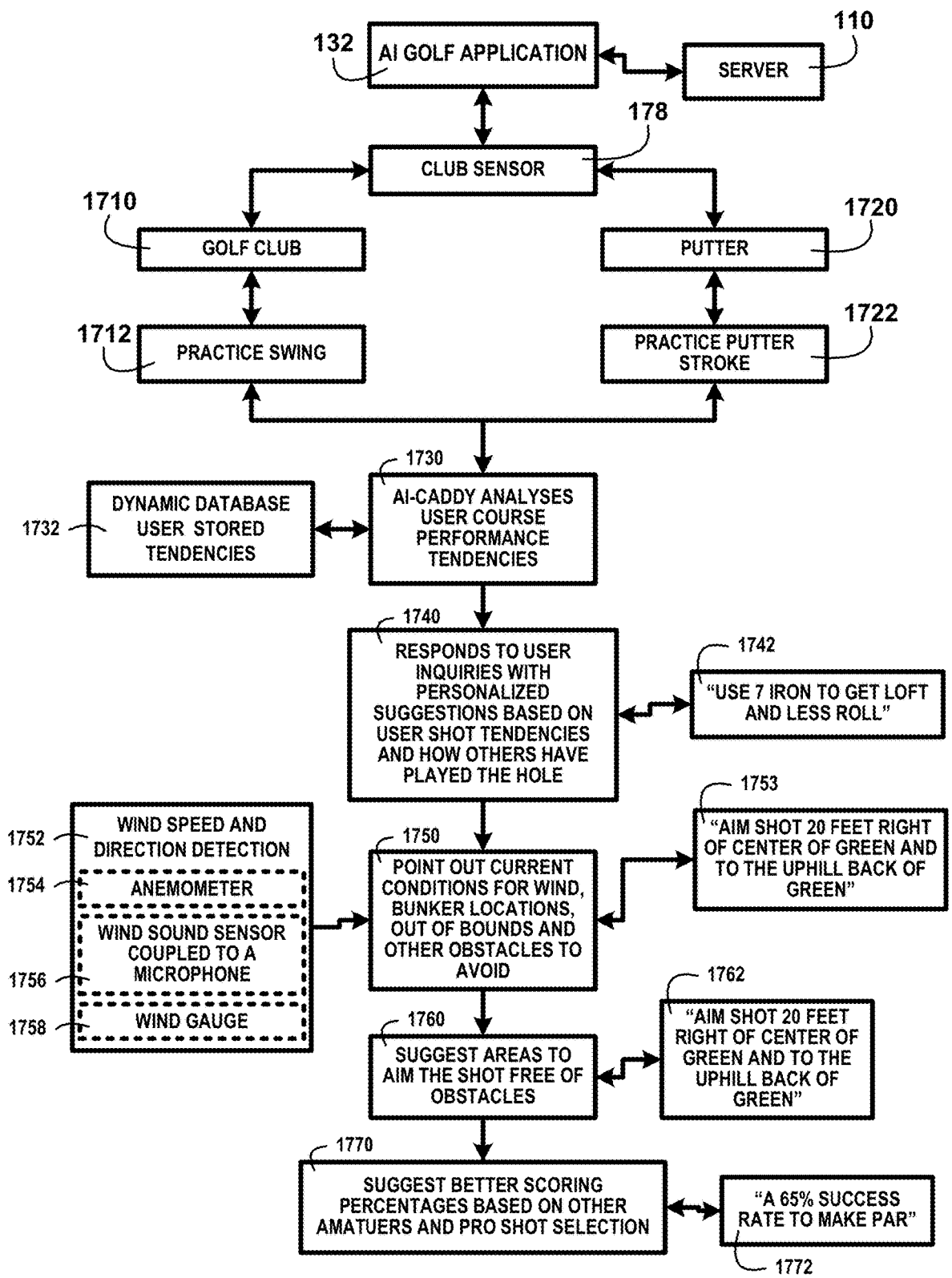
FIG. 17 shows a block diagram of an overview of the AI module application of one embodiment.

FIG. 17 shows a block diagram of an overview of the AI module application of one embodiment. FIG. 17 shows the AI golf application 132 and server 110 that receives data from the club sensor 178 attached to a golf club 1710 during a practice swing 1712 and a putter 1720 during a practice putter stroke 1722. An AI assistant analyses user course performance tendencies 1730 from dynamic database user stored tendencies 1732. This allows the AI golf application 132 to generate information that responds to user inquiries with personalized suggestions based on user shot tendencies and how others have played the hole 1740.

For example, a user may ask what club to use, and the AI golf assistant module 150 of FIG. 1 may respond with, "Use 7-iron to get loft and less roll" 1742 and point out current conditions for wind, bunker locations, out of bounds and other obstacles to avoid 1750, and, "Aim shot 20 feet right of center of green and to the uphill back of green" 1753. The AI golf application 132, for example, collects current wind data for wind speed and direction detection 1752 from devices wirelessly coupled to the AI golf assistant module 150 of FIG. 1, including an anemometer 1754, wind sound sensor coupled to a microphone 1756, and a wind gauge 1758.

The AI golf assistant module 150 of FIG. 1 may respond to the user's request to suggest areas to aim the shot free of obstacles 1760. The responses may include, "Aim shot 20 feet right of the center of green and to the uphill back of green" 1762. The AI golf assistant module 150 of FIG. 1 may respond to suggest better-scoring percentages based on other amateurs and pro shot selection 1770 with, "A 65% success rate to make par" 1772 of one embodiment.

The AI golf assistant module 150 includes a processor that superimposes each shot in the order of the recorded club head golf ball impacts using the GPS coordinates on an overlay of the RTK topography and calculates the distance between the impacts. The superimposed tracked impacts are connected linearly to show the tracked route of the golf ball in relationship to the hole topography. The user reviews after the hole completion or after the last hole played to see the tracked data to assess the outcomes of the shots. The displayed impact data includes the club used for the shot, the trajectory of the golf ball, and the distance achieved with the shot of one embodiment.

The sensor data is recorded for each club selected for different types of shots. The data includes shot distances for each club. The data enables an analysis of shot distances across various shot types for each club, facilitating comparisons between clubs for different shot types. The strokes gained is a golf stats methodology that measures a golfer's skill by each part of their game. Strokes gained is a golf statistic made up of four main components strokes gained off the tee, strokes gained on approach shots, strokes gained around the green chipping, and strokes gained putting. The strokes gained track the user's shot results for each club and type of shot and measure a golfer's skill by each part of their game.

The strokes gained analysis is to measure the overall skill of a golfer. It can assess a golfer's putting skill, chipping skill, approach shot skill, driving skill, or all of these combined into one statistic. It is a relative statistic based on average "benchmarks" for each type of shot. Total strokes gained combines all non-aggregated metrics which include off the tee, approach, around the green, and putting. The aggregated strokes gained metric is an overall measurement of a golfer's skill. The strokes gained analysis data of the user shot distances analysis provides real data for the AI golf assistant module 150 to suggest a club selection to the user 170 that has the highest percentage of resulting in a stroke gained improvement.

Figure 18:
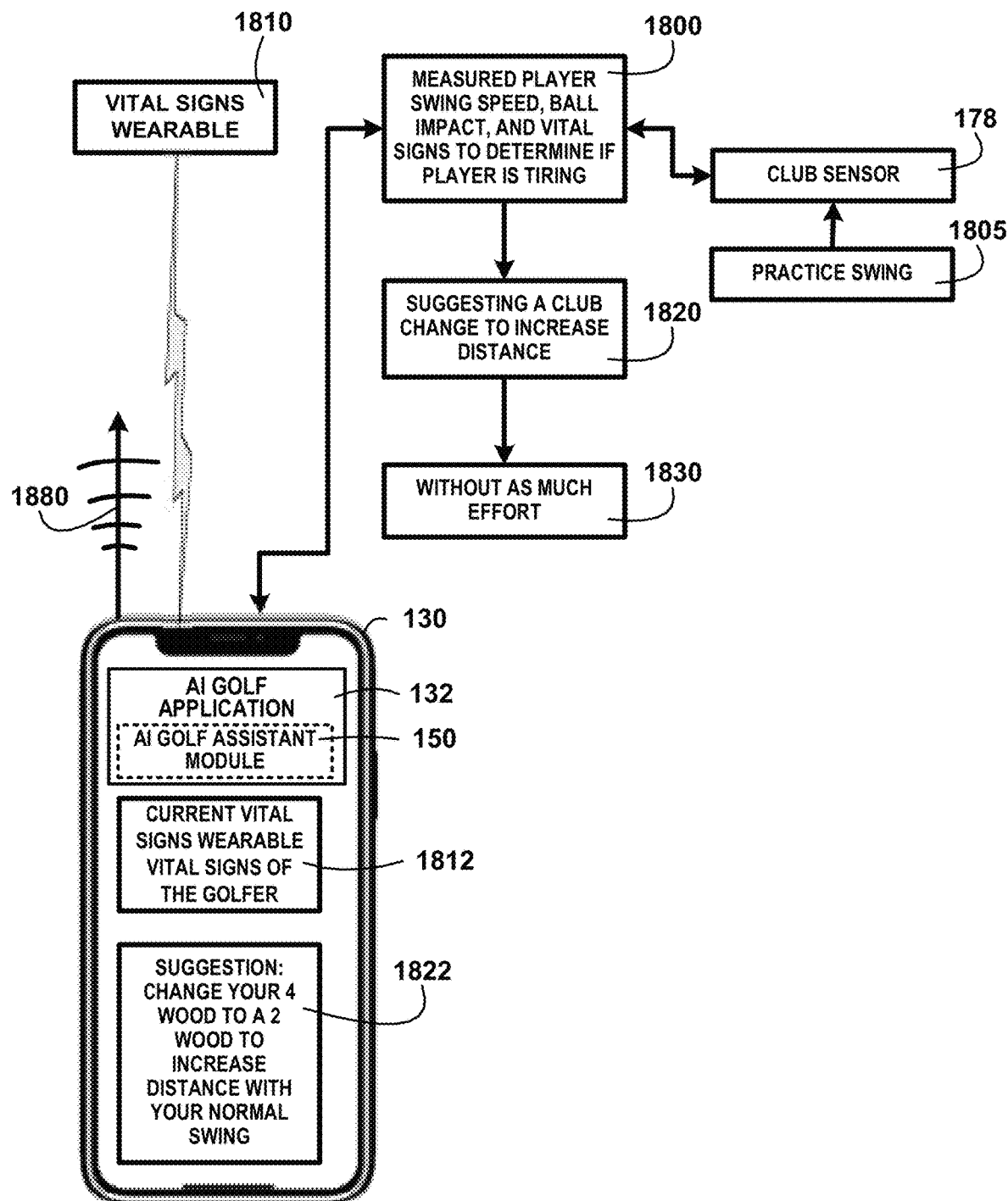
FIG. 18 shows for illustrative purposes only an example of vital signs wearable of one embodiment.

FIG. 18 shows for illustrative purposes only an example of vital signs wearable of one embodiment. FIG. 18 shows in one embodiment, the user's mobile device 130 having the AI golf application 132 with the AI golf assistant module 150. The AI golf assistant module 150 detects measured player swing speed, ball impact, and vital signs to determine if the player is tiring 1800. A player user has a vital sign wearable 1810 used to determine if the user is tired.

The club sensor 178 detects and measures a practice swing 1805 to determine swing speed and ball impact. Should the swing speed and ball impact force show decreasing levels the AI golf assistant module 150 is suggesting a club change to increase distance 1820 without as much effort 1830. The user's mobile device 130 having the AI golf application 132 with the AI golf assistant module 150 receives the current vital signs wearable vital signs of the golfer 1812. For example, should the vital signs show signs of reduced physical strength confirmed by reduced swing speed and ball impact force in the practice swing it would indicate the player user is tiring.

The AI golf assistant module 150 may interact with the user by suggesting: "Change your 4-wood to a 2-wood to increase distance with your normal swing 1822". This may also be an AI golf assistant module verbal suggestion 1880 of one embodiment.

Figure 19:
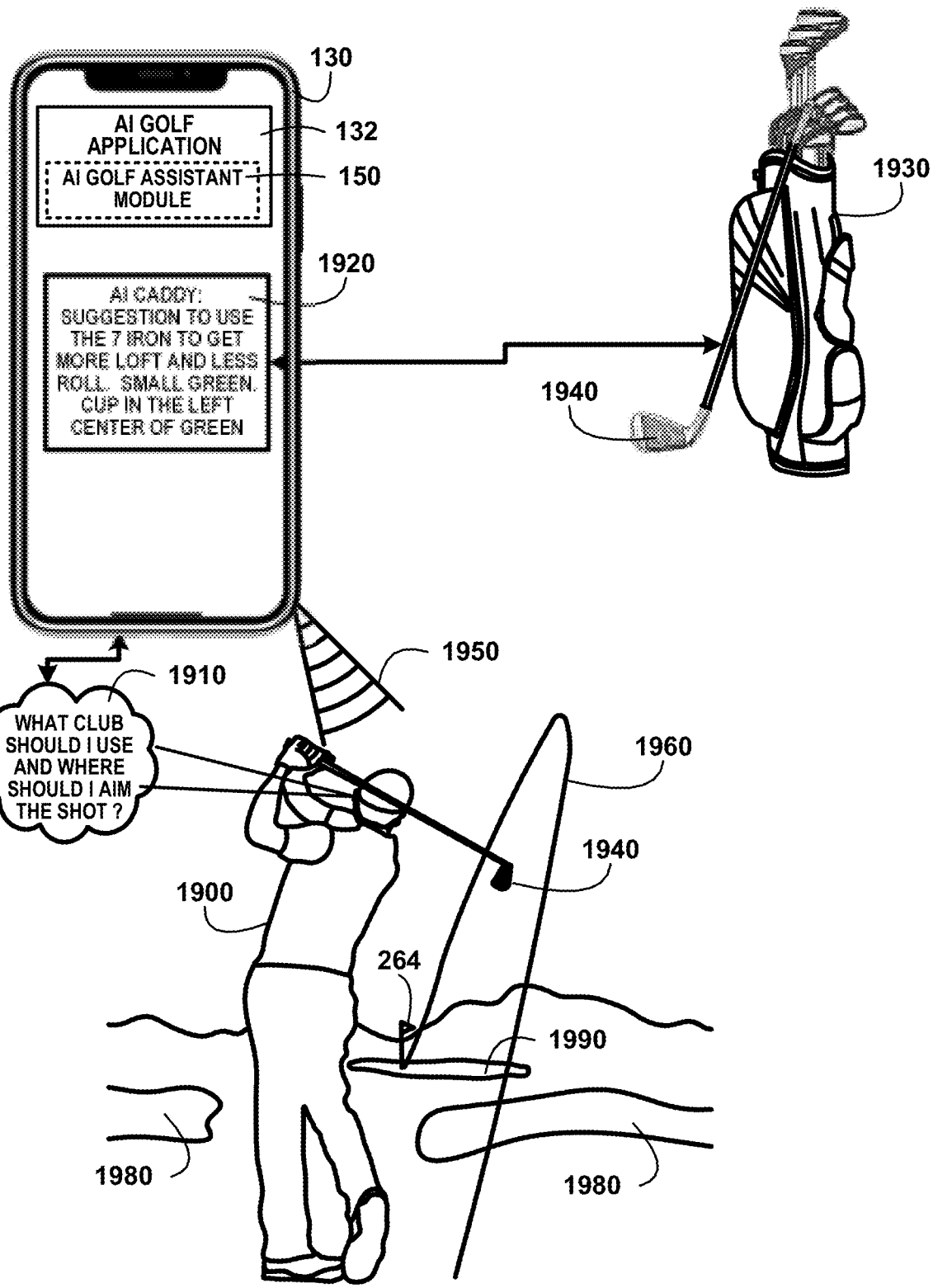
FIG. 19 shows for illustrative purposes only an example of an approach shot of one embodiment.

FIG. 19 shows for illustrative purposes only an example of an approach shot of one embodiment. FIG. 19 shows the user after the approach shot swing 1900. Before the actual approach shot the user questions on the user's mobile device 130 having the AI golf application 132 and AI golf assistant module 150 feature, "What club should I use and where should I aim the shot?" 1910. The response is an "AI caddy: suggestion to use the 7-iron to get more loft and less roll, small green, cup in the left center of the green." 1920. The user selects the 7-iron 1940 from the golf bag with clubs 1930 as indicated in the AI golf assistant module verbal suggestion 1950. After the shot swing the golf ball flight tracked 1960 shows the golf ball lands on the green 1990 near the flag 264 and avoided any bunker 1980 of one embodiment.

Figure 20A:
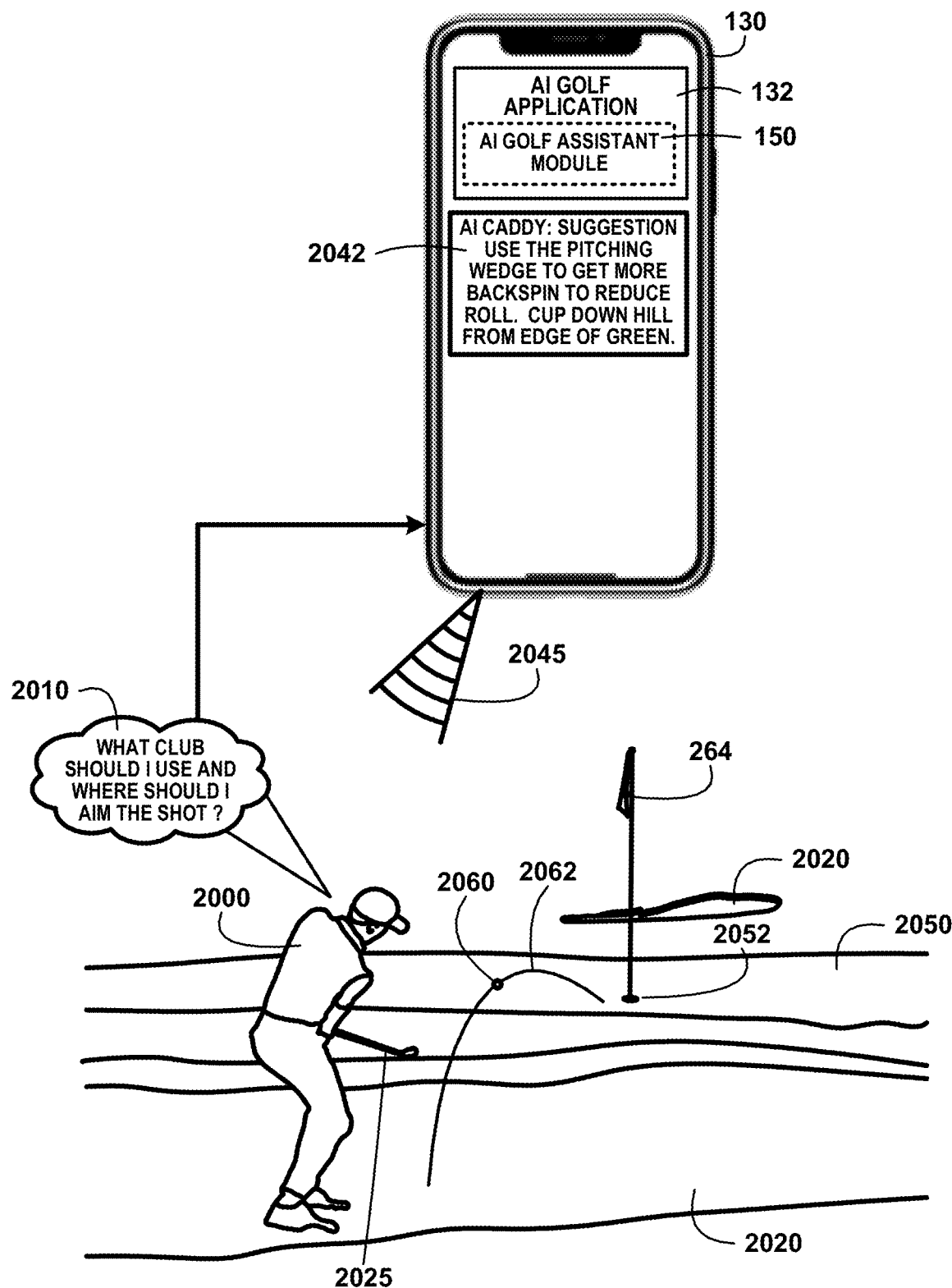
FIG. 20A shows for illustrative purposes only an example of a bunker shot of one embodiment.

FIG. 20A shows for illustrative purposes only an example of a bunker shot of one embodiment. FIG. 20A shows the user 2000 asking the AI golf assistant module 150, "What club should I use and where should I aim the shot?" 2010 on the user's mobile device 130 having the AI golf application 132. The AI assistant: suggestion, "Use the pitching wedge to get more backspin to reduce roll, cup downhill from the edge of the green." 2042. The AI golf assistant module is a verbal suggestion 2045. The user is in the sand bunker 2020 and selects the suggested club 2025. The user aims for the flag 264. FIG. 20A shows the golf ball in flight 2060 with the flight path of the ball 2062 to the green 2050 and towards the cup 2052 of one embodiment.

In another embodiment, a sensor detects the movements of a club the user selected for a shot. The sensor includes a high-speed camera optical sensor to record and track the movements of the club head. The detected sensor data includes the movements of the club including back swing, striking of the golf ball, and follow through.

The sensor detection further includes the club face orientation relative to the golf ball. The detected and tracked club movements are used to calculate the club speed, the golf ball speed from impact to final landing, the force imparted to the ball, the club head travel path to contact the golf ball, distance of the shot, and record elapsed time of club head travel to determine speed.

The data is processed using at least one processor to calculate speeds and angles along the travel path of the club head and golf ball after impact. The high-speed optical calculated data is used to determine club speed, ball speed, swing speed, and golf ball strike angles to determine predictable loft, and poor contact with the golf ball that affects distance, trajectory, draws, and slices. The club used for each shot, distance achieved, and swing impact data are used to display the user performance with golf ball trajectory, distance, and the calculated data displayed on an overlay of the RTK topography. A review by the user after each hole and at the end of the round provides the AI golf assistant module 150 to offer recommendations on corrective measures to allow the user to improve shots and reduce the number of strokes of one embodiment.

Figure 20B:
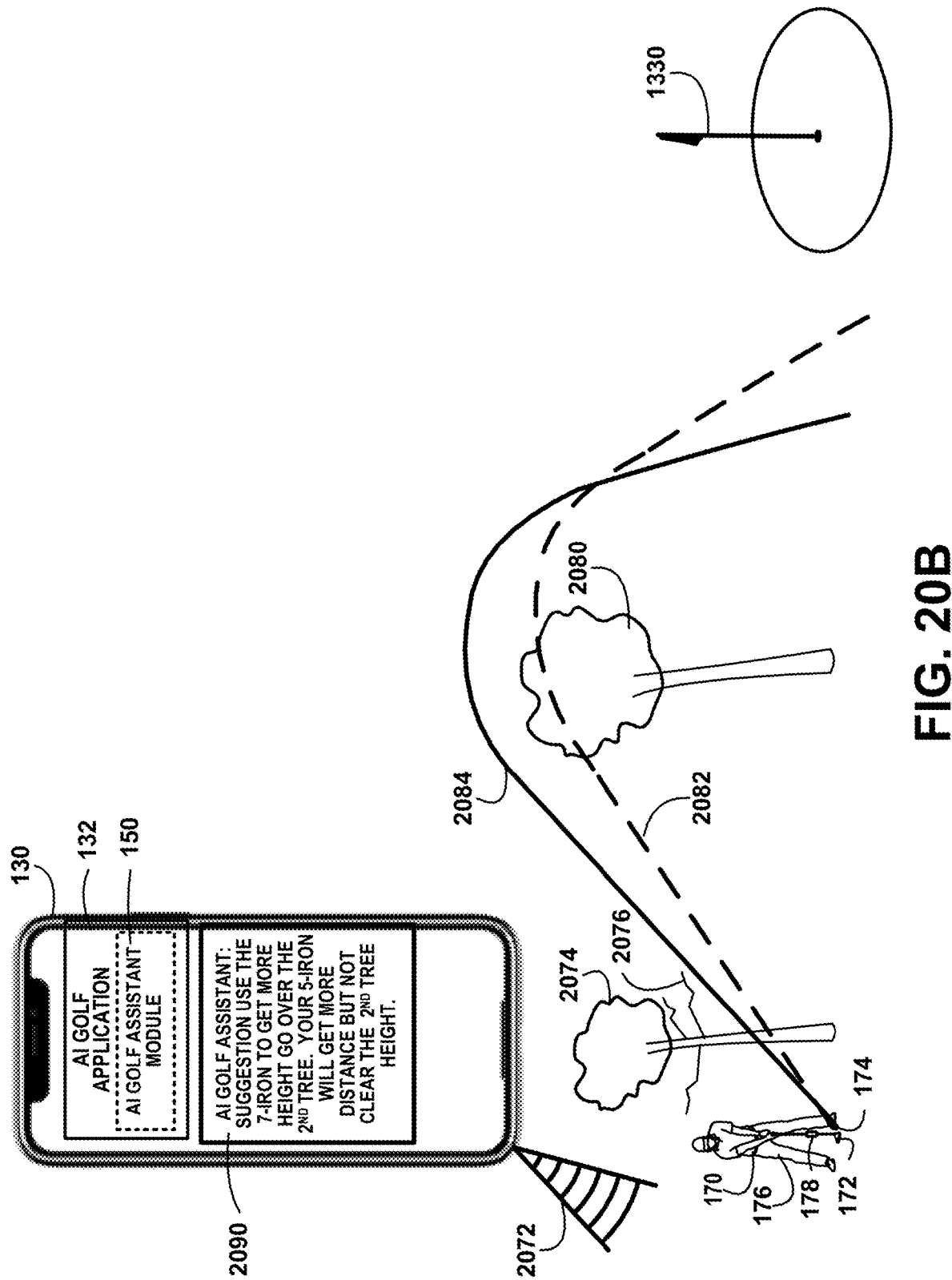
FIG. 20B shows for illustrative purposes only an example of a geometric calculated approach shot over a tree of one embodiment.

FIG. 20B shows for illustrative purposes only an example of a geometric calculated approach shot over a tree of one embodiment. FIG. 20B shows the user 170 has a wearable golf environment detector 176. The golf club 172 has a club sensor 178 attached to the shaft. The club sensor 178 includes an accelerometer, a gyroscope, a pressure sensor, a force sensor, a light sensor, and a transmitter. A processor coupled to the club sensor is used to analyze measured golf club swing data to predict a golf ball trajectory based on practice swing data including club head speed, club path direction, club face orientation, and swing path contact position.

The user 170 addressing the golf ball 174. While addressing the golf ball 174 the user sees a first tree 2074 a short distance away that has a first tree branch 2076 low on the trunk. The user also sees a taller second tree 2080 further away but in the path to the green and flag 1330. The user's mobile device 130 having the AI golf application 132 is aware of the user's position and the two trees based on the RTK course hole map 1400 of FIG. 14. The height of both trees is indicated on the RTK course hole map 1400 of FIG. 14. The AI golf application 132 using a processor and the user's tendencies with different clubs calculates a predicted path of the golf ball 174 with an average of the user's club shots.

The predicted paths are calculated using geometry to predict adequate height to clear the second tree 2080 while starting the shot low enough to miss the first tree branch 2076. Based on the user's tendencies the AI golf assistant module 150 displays interactively on the user's mobile device 130 the following message: "AI golf assistant: suggestion use the 7-iron to get more height to go over the 2nd tree. Your 5-Iron will get more distance but not clear the 2nd tree height." 2090. The AI golf assistant module 150 will also display the geometric predicted shot paths to show the user the geometric paths. The AI golf assistant module 150 additionally broadcasts a verbal suggestion 2072 to alert the user of the suggestion of one embodiment.

Figure 21:
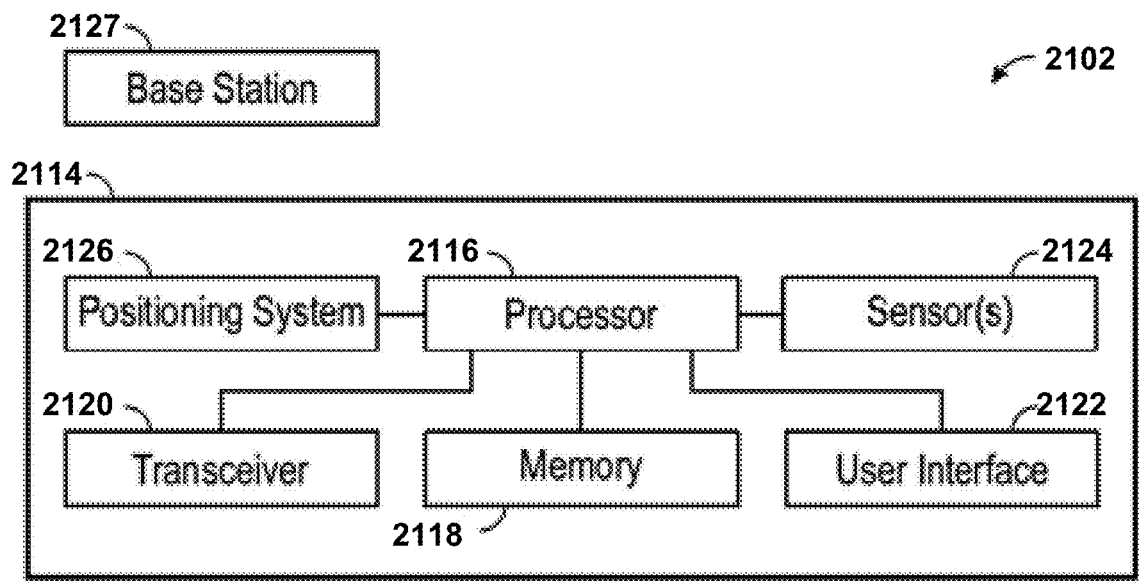
FIG. 21 shows for illustrative purposes only an example of a schematic view of a ball marker sensor system of one embodiment.

FIG. 21 shows for illustrative purposes only an example of a schematic view of a ball marker sensor system of one embodiment. FIG. 21 shows a schematic of the sensor system 2102 of the base station 2127 of the ball marker and its unit components 2114. The components include a positioning system 2126, processor 2116, sensor(s) 2124, transceiver 2120, memory 2118, and a user interface 2122 of one embodiment.

The sensor system 2102 can include a housing configured to house and support the components of the sensor system 2102. The sensor system 2102 can include a processor 2116, memory 2118, one or more transceivers 2120, one or more user interfaces 2122, one or more sensor(s) 2124, and a positioning system 2126.

The processor 2116 can be any circuit or virtual circuit (e.g., a physical circuit emulated by logic executing on an actual processor) that manipulates data values according to control signals (e.g., "commands," "opcodes," "machine code," etc.) and that can produce corresponding output signals that can be applied to operate a machine. A processor can be one or more of a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or the like. A processor can further be a multi-core processor having two or more independent processors (sometimes referred to as "cores") that may execute instructions contemporaneously.

The memory 2118 can be connected to the processor 2116 and can be a machine-readable medium, which can be a component, device, or other tangible medium able to store instructions and data temporarily or permanently and can include random-access memory (RAM), read-only memory (ROM), buffer memory, flash memory, optical media, magnetic media, cache memory, other types of storage (e.g., erasable programmable read-only memory (EPROM)), or any suitable combination thereof. The term "machine-readable medium" should be taken to include a single medium or multiple media (e.g., a centralized or distributed database, or associated caches and servers) able to store instructions.

The term "machine-readable medium" shall also be taken to include any medium, or combination of multiple media, that is capable of storing instructions (e.g., code) for execution by a machine, such that the instructions when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices.

The transceiver 2120 can be any antenna or device configured to send or receive signals, such as using one or more communication protocols such as Bluetooth™, cellular, NFC, Ethernet, Wi-Fi, or the like. Further examples are discussed in FIG. 7. The transceiver 2120 can be connected to the processor 2116 such as to receive data therefrom and to transfer data thereto. One or more transceivers 2120 can be configured to transmit data to or receive data from external devices (through any protocol or medium discussed above or below) such as the AI golf application 132 of FIG. 1, the user audio device, the club sensor 178 of FIG. 1, or the user device.

The user interface 2122 can be any display and/or input device. For example, the user interface 2122 can be a touchscreen monitor or display, or any combination of buttons, lights, switches, speakers, or the like. The user interface 2122 can be connected to the processor 2116 and can be configured to display information for receipt by the golfer. Optionally, the processor 2116 can be configured to receive information from the user, such as via selectable indications or buttons, which can be transmitted by the user interface 2122 to the processor 2116. The user interface 2122 can optionally be connected to an outer portion of the housing to allow user interaction with the user interface 2122. The user interface 2122 can optionally extend at least partially through the housing.

One or more sensors 2124 can be any sensors configured to collect location or swing information. For example, as noted above, one or more sensors 2124 can include one or more of a radar sensor, a lidar sensor, an image capture device (e.g., camera), an optical sensor, or the like. One or more sensors 2124 can produce one or more signals based on observed or monitored swings of the golfer that can be transmitted to the AI golf application 132 of FIG. 1, the user device, or other devices. One or more sensors 2124 can be connected to the processor 2116 such as to transmit data collected from one or more sensors 2124. The one or more sensors 2124 can optionally extend at least partially through the one or more sensors 2124 such as to enable collection of swing data.

The positioning system 2126 can include one or more positioning receivers (such as a GPS receiver, i.e., L-band radio receiver) and a processor for communicating with satellites and resolving a position of the sensor system 2102 based on the resolution or calculation. The positioning system 2126 can optionally be or can include an RTK system including a receiver and processor for using a corrective stream to more accurately resolve or determine a location of the positioning system 2126 and the sensor system 2102.

The correcting stream can be received from one or more base stations 2127. The base station 2127 can be located at the golf course or can be located within a radius of several golf courses. The positioning system 2126 can receive a correcting stream from the base station 2127 and can (optionally with the GPS-determined location) resolve the location of the sensor system 2102 more accurately. For example, the positioning system 2126 including the RTK system can determine the location of the sensor system 2102 with an accuracy of up to ±1 centimeter.

In operation of some examples, the user can power on the sensor system 2102, such as using the user interface 2122. Once powered on, the sensor system 2102 can be positioned at or near the ball on the green of the golf course or any golf course. The positioning system 2126 can determine the location of the sensor system 2102, which can be transmitted to the AI golf application 132 of FIG. 1 or the user device for comparing to a database or table of courses and holes for identifying the hole and the golf course on which the sensor system 2102 is placed.

New hole placement on a green is updated based on recent golfers playing on the course using the AI golf application 132 of FIG. 1. The ball marker data while putting will upload to the server and be used to update the stored RTK data on the new hole location. A user may plan on a drone fly-over of the course following the GPS coordinates of each from the RTK mapping to quickly determine any changes in the hole locations.

As discussed above, the location of the sensor system 2102 can also be used by the sensor system 2102, the AI golf application 132 of FIG. 1, or the user device to determine the relative position of the sensor system 2102 and the ball to the hole, such as by referring to a table of hole placements for the identified putting green and the identified golf course. Once the ball and hole locations are determined, a green topography can be determined, and a desired ball trajectory can be selected. Once selected, required swing characteristics can be determined, as discussed above, and the user can indicate, such as through the user interface 2122 or the user device that the user wants to perform a practice swing to be observed or monitored by the sensor system 2102.

When the sensor system 2102 receives an input or instruction from the golfer that a practice swing is to be observed, the sensor system 2102 can activate one or more sensors 2124, and one or more sensors 2124 can observe or monitor the practice swing of the user, such as via an image capture device or radar. One or more sensors 2124 can produce a signal including data from the observed practice swing, which can be transmitted to the processor 2116. The processor 2116 can determine one or more practice swing characteristics based on the received signals from one or more sensors 2124. The processor 2116 can then compare the practice swing characteristics to the required characteristics to put the ball on the selected trajectory. Optionally, the processor 2116 can instruct one or more transceivers 2120 to transmit the sensor data and the calculations can be performed at the AI golf application 132 of FIG. 1 or the user device.

Figure 22:
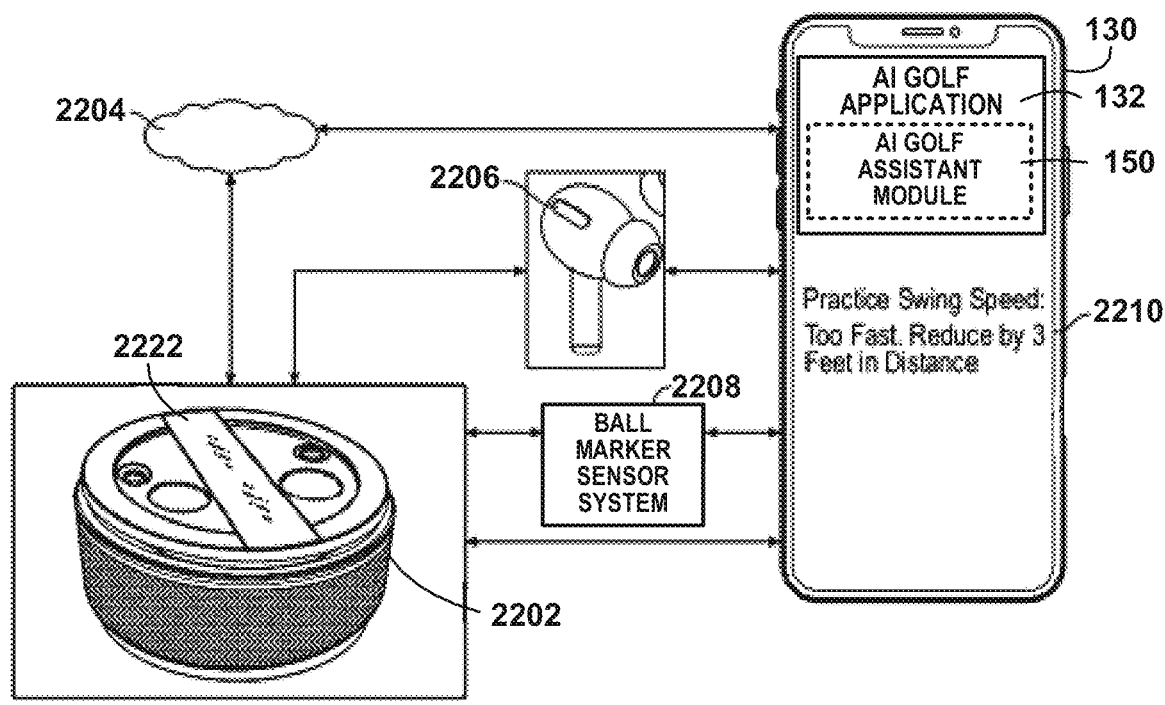
FIG. 22 shows a block diagram of an overview of the AI module application display screen of a text message of one embodiment.

The processor 2116 (or other processor of the AI golf application 132 of FIG. 1 or the user device) can determine whether the practice swing characteristics are likely to put the ball on the selected trajectory and the results of the determination can be transmitted to the user, such as via the transceiver one or more transceivers 2120 to the user audio device 2206 of FIG. 22. Optionally the results can be transmitted to the user through the user interface 2122 or the user device. The devices of the sensor system 2102 can be used to perform additional steps, as discussed below concerning FIGS. 26 and 27.

FIG. 22 shows a block diagram of an overview of the AI module application display screen of a text message of one embodiment. FIG. 22 shows the user's mobile device 130 of FIG. 1 having the AI golf application 132 of FIG. 1 with the AI golf assistant module 150 of FIG. 1 feature. The AI golf assistant module 150 of FIG. 1 informs the user that the "Practice swing speed: too fast, reduce by 3 feet in distance" 2210. A ball marker 2202 includes a ball marker user interface 2222 that allows the user to see the results of the ball marker sensor system 2208 detections of the putter stroke. The ball marker sensor system 2208 detections are transmitted to an AI golf application 132 via cloud 2204 for recordation in the dynamic database 124 of FIG. 1. The user may also receive the sensor data using a user audio device 2206 for a verbal message interaction with the AI golf assistant module 150 of FIG. 1 of one embodiment.

The user's mobile device 130 of FIG. 1 can be a tablet, smartphone, computer, laptop computer, or other device including a processor and a transceiver. The user audio device 2206 can be an audio device, such as headphones or earbuds configured to output audio via a speaker. Optionally, the user audio device 2206 can include a microphone configured to receive audio input, such as from a user. The user audio device 2206 can be connected to one or more devices of the golf swing system such as the user's mobile device 130 of FIG. 1 and the ball marker sensor system 2208 of one embodiment.

Figure 23:
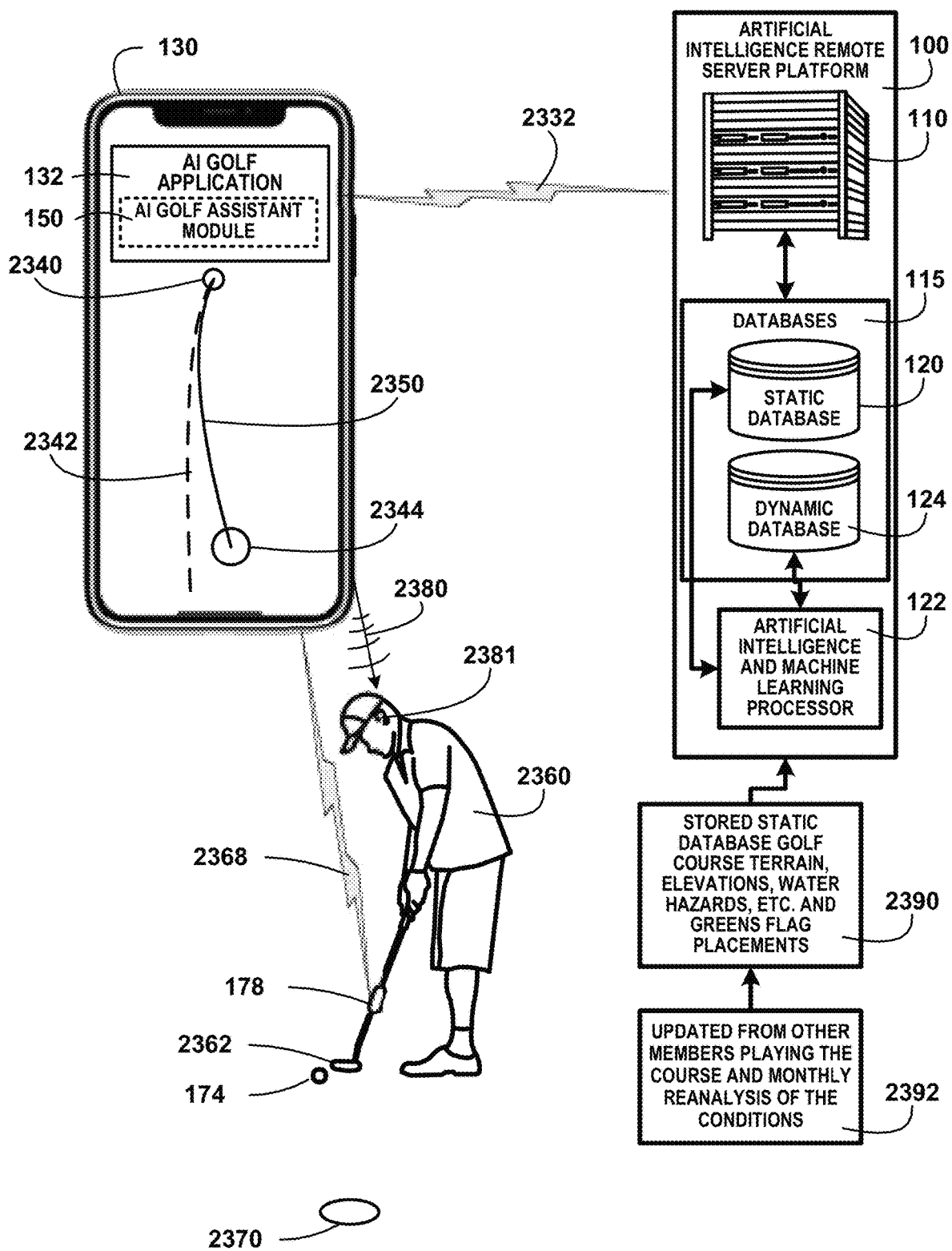
FIG. 23 shows a block diagram of an overview of the AI module application display screen of a graphic putt path of one embodiment.

FIG. 23 shows a block diagram of an overview of the AI module application display screen of a text message of one embodiment. FIG. 23 shows the user's mobile device 130, AI golf application 132, and AI golf assistant module 150. The AI golf application 132 provides bidirectional communication 2332 with the artificial intelligence remote server platform 100. The artificial intelligence remote server platform 100 includes the artificial intelligence server 110, databases 115 including at least one static database 120, and dynamic database 124. The artificial intelligence remote server platform 100 includes the artificial intelligence and machine learning processor 122.

FIG. 23 shows the actual golf ball 174 as it is positioned relative to the actual hole 2370. These actual relative positions are displayed on the user's mobile device 130. FIG. 23 shows the AI golf assistant module 150 displaying the golf ball 2340 and a target path 2342 to aim the putt to follow a slope curve 2350 to the cup 2344.

The AI golf assistant module audio suggestion 2380 broadcasts the audio suggestion to the user 2360, in this example, where the user audio device may include earbuds 2381. The target path 2342 is based on the user practice strokes, transmissions from club sensor 2368, stored static database golf course terrain, elevations, water hazards, etc., and greens flag placements 2390, other players of the hole stored in the dynamic database 124, and green slope contours measured accurately up to ±1 centimeter. The club sensor 178 is attached to the putter 2362 to detect, measure, and transmit the movements, speed, direction, and force level of the putter during the user's 2360 practice strokes.

The contours and other physical and conditional characteristics of the golf course and each hole are recorded from the RTK golf course hole plan view 1400 of FIG. 14 collected in the real-time kinematic flyover measurement detection observations. The RTK golf course hole plan view 1400 of FIG. 14 is updated from other members playing the course and monthly reanalysis of the conditions 2392. The updates and monthly reanalysis of the conditions are stored static database of golf course terrain, elevations, water hazards, etc., and greens flag placements 2390 of one embodiment.

Figure 24:
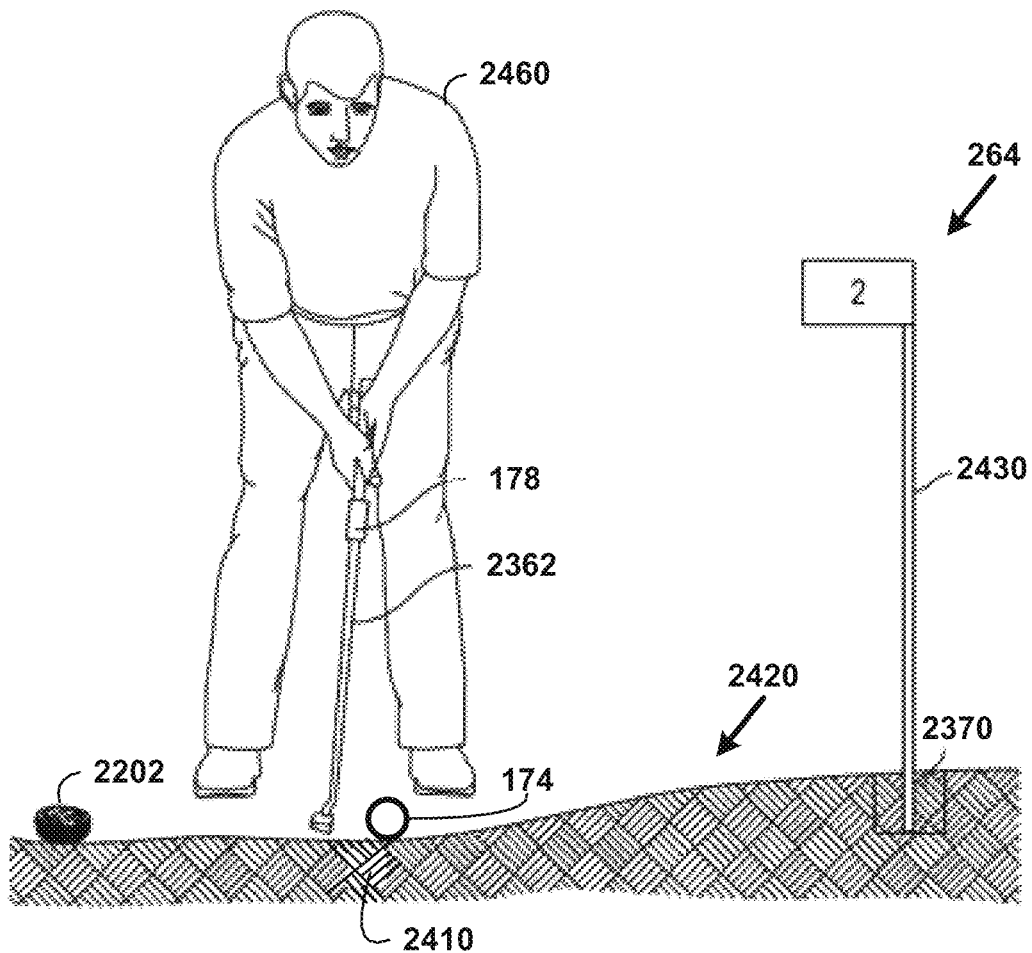
FIG. 24 shows a block diagram of an overview of a golfer on a putting green of one embodiment.

FIG. 24 shows a block diagram of an overview of a golfer on a putting green of one embodiment. FIG. 24 shows a ball marker 2202 and a user 2460 on a putting green of a golf course. More specifically, user 2460 is illustrated holding a putter 2362 and addressing a golf ball 174 on a green uphill slope 2420 of the putting surface 2410 of the green. The user 2460 is aligned toward a cup 2370 indicated by a flag 264 and flagstick 2430. The ball marker 2202 of FIG. 22 can be placed or located on or near the green uphill slope 2420, such as behind the golf ball 174 relative to the cup 2370. The ball marker 2202 can include one or more sensors for observing a swing of the user 2460, such as a practice swing or a stroke of the putter 2362 as it contacts the golf ball 174. The ball marker 2202 can produce swing data based on the observed or monitored swing, to provide swing guidance to the user.

The ball marker 2202 can also include one or more sensors to determine or transmit a location of the ball marker 2202. The location of the ball marker 2202 can be used to identify the course and hole of the course on which the ball marker 2202 is placed. The AI golf application 132 of FIG. 1 can determine, based on the hole location, one or more required swing characteristics to put the golf ball 174 on the selected path to make the putt or stroke.

The AI golf application 132 of FIG. 1 can then compare the practice swing characteristics of the putt, as observed by the ball marker 2202, to the required swing characteristics to make the putt and provide feedback or guidance to the user 2460. For example, the AI golf assistant module 150 of FIG. 1 can inform the user 2460 whether the stroke is likely to result in a made putt, helping to improve a user's score, help the user learn their golf course, and help improve the user's green reading skills.

A computing environment includes a ball marker 2202 that is connected to a user's mobile device 130 of FIG. 1 (e.g., a smartphone) via the connection. Connection can typically be a Bluetooth™ connection; however, any other type of connection over which two computing devices can communicate could be used. The user's mobile device 130 of FIG. 1 is connected to an artificial intelligence server 110 of FIG. 1 via a wireless connection. Connection can typically be a mobile network data connection; however, any other type of connection can also be used.

The user's mobile device 130 of FIG. 1 can be any type of computing device that can be carried by the golfer. For example, the user's mobile device 130 of FIG. 1 can be the user's smartphone having an AI golf application 132 of FIG. 1 for communicating with the ball marker 2202 and artificial intelligence server 110 of FIG. 1.

In typical usage, a user 2460 will carry the ball marker 2202 and user's mobile device 130 of FIG. 1 onto the green and use the ball marker 2202 to mark the golf ball 174 of FIG. 1. The ball marker 2202 communicates information to the user's mobile device 130 of FIG. 1 which is routed to the artificial intelligence server 110 of FIG. 1. The artificial intelligence server 110 uses the information to calculate the force and direction information for the shot and routes this information back to ball marker 2202 via user's mobile device 130 of FIG. 1. The ball marker 2202 can then display the force and direction information to the golfer to assist the golfer in playing the shot of one embodiment.

Figure 25:
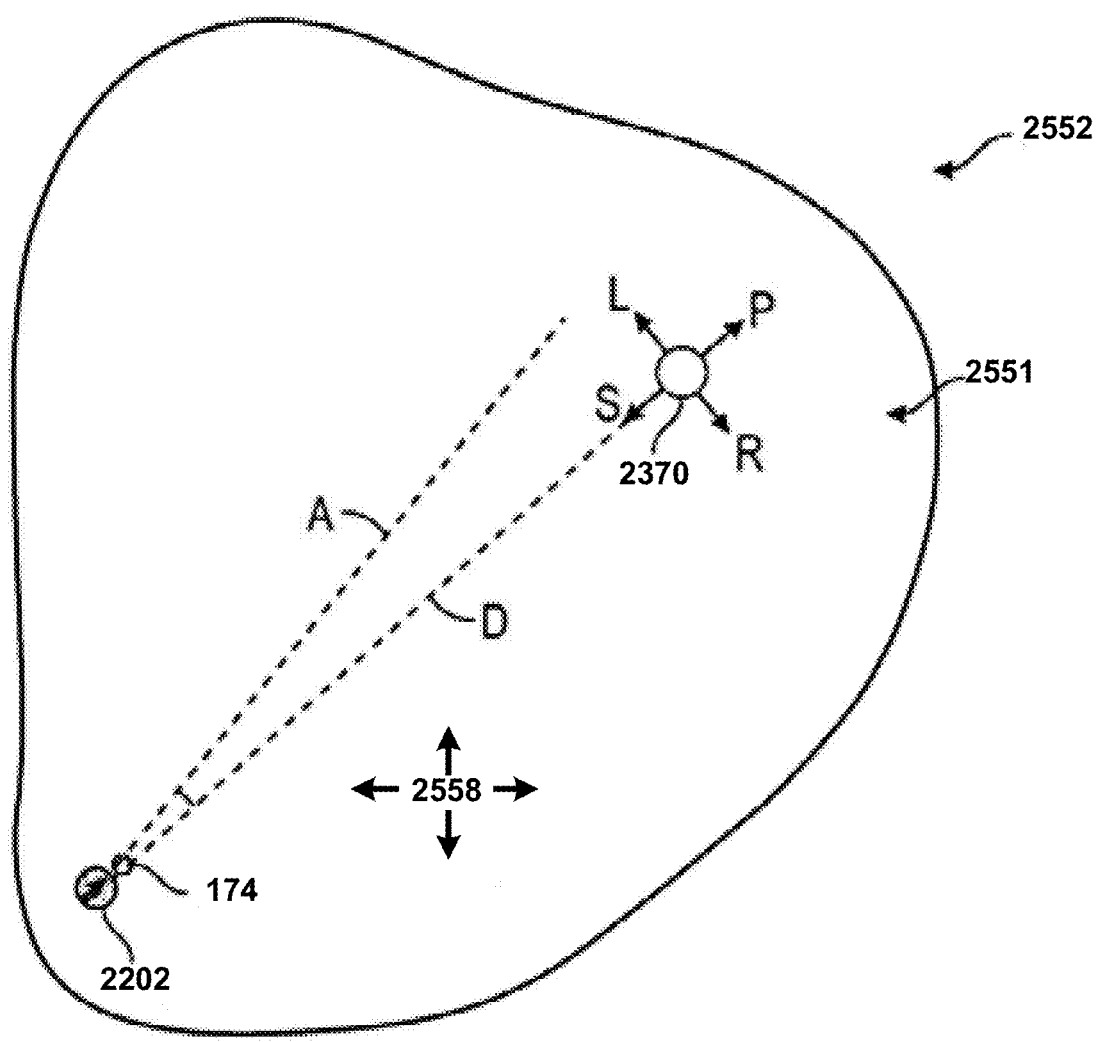
FIG. 25 shows for illustrative purposes only an example of a plan view of a putting green of one embodiment.

FIG. 25 shows for illustrative purposes only an example of a plan view of a putting green of one embodiment. FIG. 25 shows a putting green 2551 of a golf course 2552. The ball marker 2202 is shown on the putting green 2551 putting surface 2558 positioned behind the golf ball 174 aligned toward cup 2370 indicated by a flag 264 of FIG. 2. Based on the alignment with the ball marker 2202 FIG. 25 shows directions Left, Right, Past, and Short. The ball marker 2202 can include a transceiver configured to connect to an external system, such as the AI golf application 132 of FIG. 1 through one or more local or remote antennas. The ball marker 2202 and the AI golf application 132 of FIG. 1 can, together, use the global positioning system (GPS) along with a real-time kinematics (RTK) system to determine the location of the ball marker 2202 and therefore the location of the golf ball 174. The determined location can be used to identify the golf course and the putting green of the hole of the ball marker 2202 and the user 170 of FIG. 1.

The ball marker 2202, or the user's mobile device 130 of FIG. 1 can include access to the static database 120 of FIG. 1 of golf courses and holes where a topography of each green is stored and maintained. The database can also store recent golf hole locations on each green, which can be input by previous users (e.g., golfers or workers). Optionally, if the location of the hole is shown incorrectly, user 170 of FIG. 1 can place the ball marker 2202 at the location of the hole to correct (such as using GPS and RTK) the location of the hole on the green. The hole location can then be updated in the database, such as in the static database 120 of FIG. 1. For example, the ball marker 2202 can be used to determine the location of the cup 2370 on the putting green.

Because the system e.g., the ball marker 2202 knows the location of cup 2370 and golf ball 174, the ball marker 2202 can determine a distance D between golf ball 174 and cup 2370. Further, because the system knows the topography of the putting green, the ball marker 2202 can determine, using a physics engine, a plurality of trajectories of the ball to be holed or made by a putt. The trajectories can be presented to the user 170 of FIG. 1 for selection of a desired trajectory, i.e., a putt with a desired speed and path to the hole.

The ball marker 2202 can determine, based on the hole location, one or more required swing characteristics to put the ball on the selected path. The selected path can be communicated to the user 170 of FIG. 1 such as via the user's mobile device 130 of FIG. 1 or the ball marker 2202 and can be used by the ball marker 2202 or AI golf application 132 of FIG. 1 on the user's mobile device 130 of FIG. 1 to determine putting stroke instructions. For example, though the distance between the golf ball 174 and the hole is D, the ball marker 2202 can provide instructions to make a stroke at a force that normally falls short of the hole, such as by a distance of one foot (or about 0.3 meters).

Similarly, the ball marker 2202 can provide directional aiming instructions relative to the cup 2370. For example, though the shortest path to the hole is shown by the line indicating distance D, the system can show an aiming path A (e.g., graphically) such as on the user's mobile device 130 of FIG. 1 or the ball marker 2202. The aiming path A can also be communicated to the user 170 of FIG. 1 in relative directional instructions. For example, directions can be sent (e.g., via the user audio device 2206 of FIG. 22) to aim left of the hole by 3.3 feet (or about 1 meter). The user can optionally use this information of an aim point and an aiming distance to make a stroke or to make a practice stroke.

If the user so decides, the user can select, such as via the user's mobile device 130 of FIG. 1, to have the ball marker 2202 observe a practice swing or practice stroke. The ball marker 2202 can observe, such as via one or more sensors, the practice swing of the golfer. The ball marker 2202 can produce data based on the observed or monitored practice swing. The data can be transmitted to the AI golf assistant module 150 of FIG. 1 on the user's mobile device 130 of FIG. 1 or can be stored at the ball marker 2202. The data of the practice swing can be used to determine one or more practice swing characteristics, which any of the ball marker 2202 or the AI golf assistant module 150 of FIG. 1 on the user's mobile device 130 of FIG. 1 can compare to the one or more required swing characteristics to put the golf ball 174 on the selected path.

Based on this comparison, the AI golf application 132 of FIG. 1 (any of the ball marker 2202 or AI golf assistant module 150 of FIG. 1 on the user's mobile device 130 of FIG. 1) can determine a probable stroke result or outcome of the putt and can transmit the probable stroke result to the user's mobile device 130 of FIG. 1, or can transmit such information through the ball marker 2202 or the user audio device 2206 of FIG. 22. For example, the AI golf assistant module 150 of FIG. 1 can inform the user 170 of FIG. 1 whether or not the stroke is likely to result in a made putt. This information (or feedback) can be provided to the user in several ways, such as through audio feedback (e.g., through the user audio device 2206 of FIG. 22, the ball marker 2202, or the user's mobile device 130 of FIG. 1).

The feedback or information can also be provided to the user 170 of FIG. 1 via visible feedback such as a display of images on the GUI 148 of FIG. 1 screen of the user's mobile device 130 of FIG. 1 or through one or more lights on the ball marker 2202. The feedback or information can also be provided to user 170 of FIG. 1 in other ways, such as the vibration of the user's mobile device 130 of FIG. 1, such as when it is in the pocket of the user 170 of FIG. 1. For example, a first vibration characteristic (e.g., quick vibrations) can indicate a bad practice stroke and a second vibration characteristic (e.g., slow vibrations) can indicate a good practice stroke.

The user 170 of FIG. 1 can receive this information and modify their swing and can optionally repeat the practice swing process until the user receives a notification that the practice swing is likely to result in a holed putt. In this way, user 170 of FIG. 1 can use feedback provided by the ball marker 2202 (or the AI golf application 132 of FIG. 1 or the user's mobile device 130 of FIG. 1) to select a putting trajectory or line and can further use the golf swing ball marker 2202 to determine whether a practice stroke of user 170 of FIG. 1 is likely to result in a ball trajectory on the selected line. These AI golf applications 132 of FIG. 1 and methods can help to lower a golfer's score while helping a golfer learn green reading and putting distance control.

Optionally, user 170 of FIG. 1 can select an indication on the user's mobile device 130 of FIG. 1 or ball marker 2202 that user 170 of FIG. 1 is going to deliver a stroke to the golf ball 174. The ball marker 2202 can observe or monitor the delivered stroke and can produce stroke data which can be used to determine one or more stroke characteristics. The stroke characteristics can be compared to the required characteristics and the practice swing characteristics and feedback or guidance for use on future putts can be provided to the user 170 of FIG. 1 of one embodiment.

Figure 26:
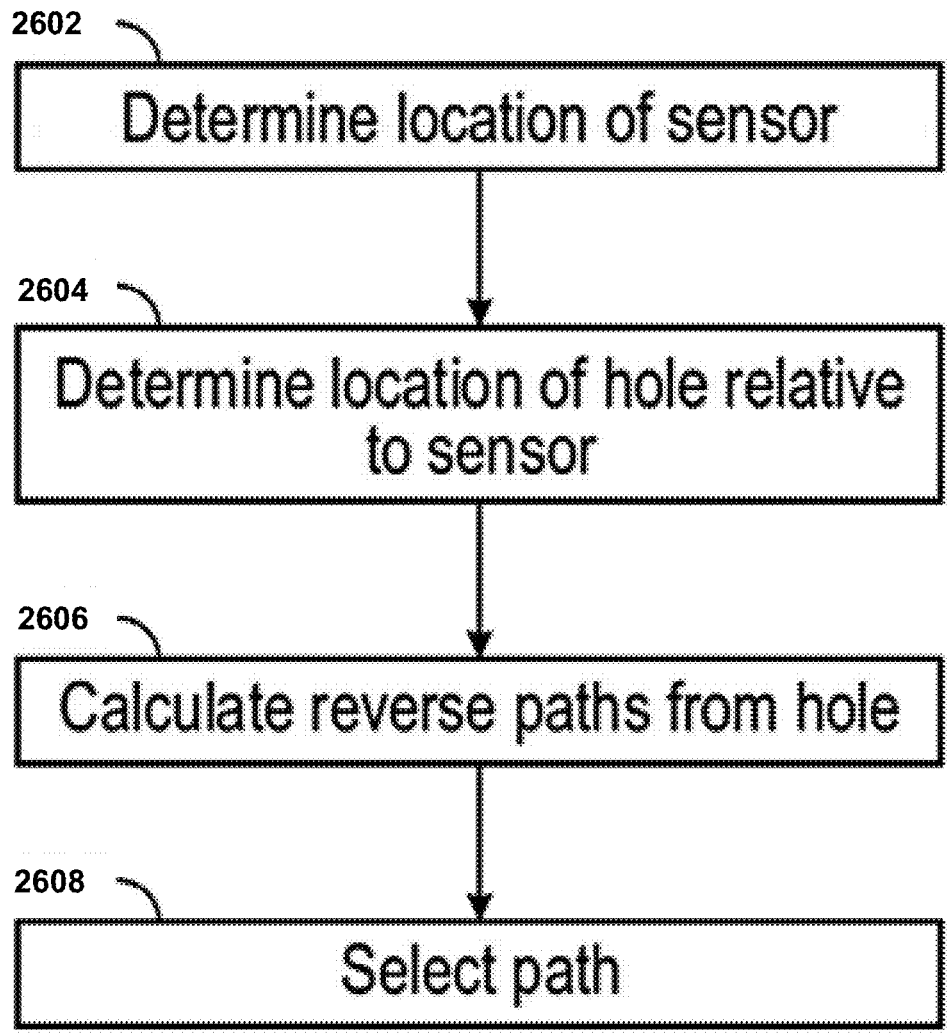
FIG. 26 shows for illustrative purposes only an example of putt path determination of one embodiment.

FIG. 26 shows for illustrative purposes only an example of putt path determination of one embodiment. FIG. 26 shows the process to determine the location of sensor 2602 and determine the location of the hole relative to sensor 2604. Upon the determinations, the AI golf application 132 of FIG. 1 will calculate reverse paths from hole 2606. The select path 2608 calculations will factor in the contours of the green and other factors affecting the roll of the golf ball 174 of FIG. 1. The determinations are providing golf swing information, guidance, or feedback to a user and can be performed using one or more of the devices discussed above or below. The feedback to the user is produced using the AI golf application 132 of FIG. 1.

The determinations include the location of the ball marker 2202 of FIG. 22 positioned on the ground surface. For example, the ball marker 2202 of FIG. 22 (e.g., the positioning system of the ball marker 2202 of FIG. 22) can communicate with a GPS network (and optionally an RTK network) to determine the location of the ball marker 2202 of FIG. 22. The ball marker 2202 of FIG. 22 can transmit the location to the AI golf application 132 of FIG. 1 on the user's mobile device 130 of FIG. 1 where either device can use the location to identify the golf course (e.g., the golf course) and the putting green (e.g., the putting green) such as by referencing the static database 120 of FIG. 1 of stored locations of the golf course and putting greens.

The golf swing ball marker 2202 of FIG. 22 (e.g., the AI golf application 132 of FIG. 1) can also include a stored database of recent hole locations and can use the location of the ball marker 2202 of FIG. 22 to determine the location of the nearest and most recent hole. Once the golf hole location is determined, the AI golf application 132 of FIG. 1 on the user's mobile device 130 of FIG. 1 can transmit the location to the user, which can be displayed on the display screen of the user's mobile device 130 of FIG. 1, the ball marker 2202 of FIG. 22 user interface, or can be transmitted via another device, such as the user audio device 2206 of FIG. 22. Upon receipt of the identifying information, the user can be presented with a confirmation indication on the display screen or the user interface, to confirm the location.

A location of the hole relative to the ball marker 2202 of FIG. 22 can be determined. For example, once the hole location is confirmed or updated, the golf swing ball marker 2202 of FIG. 22 (e.g., the AI golf application 132 of FIG. 1) can use the location of cup 2370 and the location of the golf ball 174 of FIG. 1 to determine a relative location of the ball marker 2202 of FIG. 22 (located at the golf ball 174 of FIG. 1) to the cup 2370 of FIG. 23.

Then the AI golf application 132 of FIG. 1 can determine paths or trajectories, such as reverse paths, from the hole to the ball. Because the golf swing ball marker 2202 of FIG. 22 knows the identity of the putting green of the golf course, the golf swing ball marker 2202 of FIG. 22 can look up or find a stored green topography for the putting green. The ball marker 2202 of FIG. 22 (e.g., the AI golf application 132 of FIG. 1) can then determine, such as using a physics engine to determine one or more reverse paths or trajectories from the cup 2370 of FIG. 23 to the golf ball 174 of FIG. 1.

A path can be selected. For example, the ball marker 2202 of FIG. 22 (e.g., through the user's mobile device 130 of FIG. 1 GUI 148 or the ball marker 2202 of FIG. 22 user interface) can present to the user 170 of FIG. 1 one or more paths or trajectories of which the user 170 of FIG. 1 can select a trajectory or path to the hole, such as based on required putting speed or velocity. Optionally, the golf swing ball marker 2202 of FIG. 22 can select an optimal path. The selected path can also be used by the ball marker 2202 of FIG. 22, AI golf application 132 of FIG. 1, or the user's mobile device 130 of FIG. 1 to determine putting stroke instructions. For example, the ball marker 2202 of FIG. 22 can determine or produce instructions to make a stroke at a particular distance and a particular aiming point relative to the hole, as discussed above in one embodiment.

Figure 27:
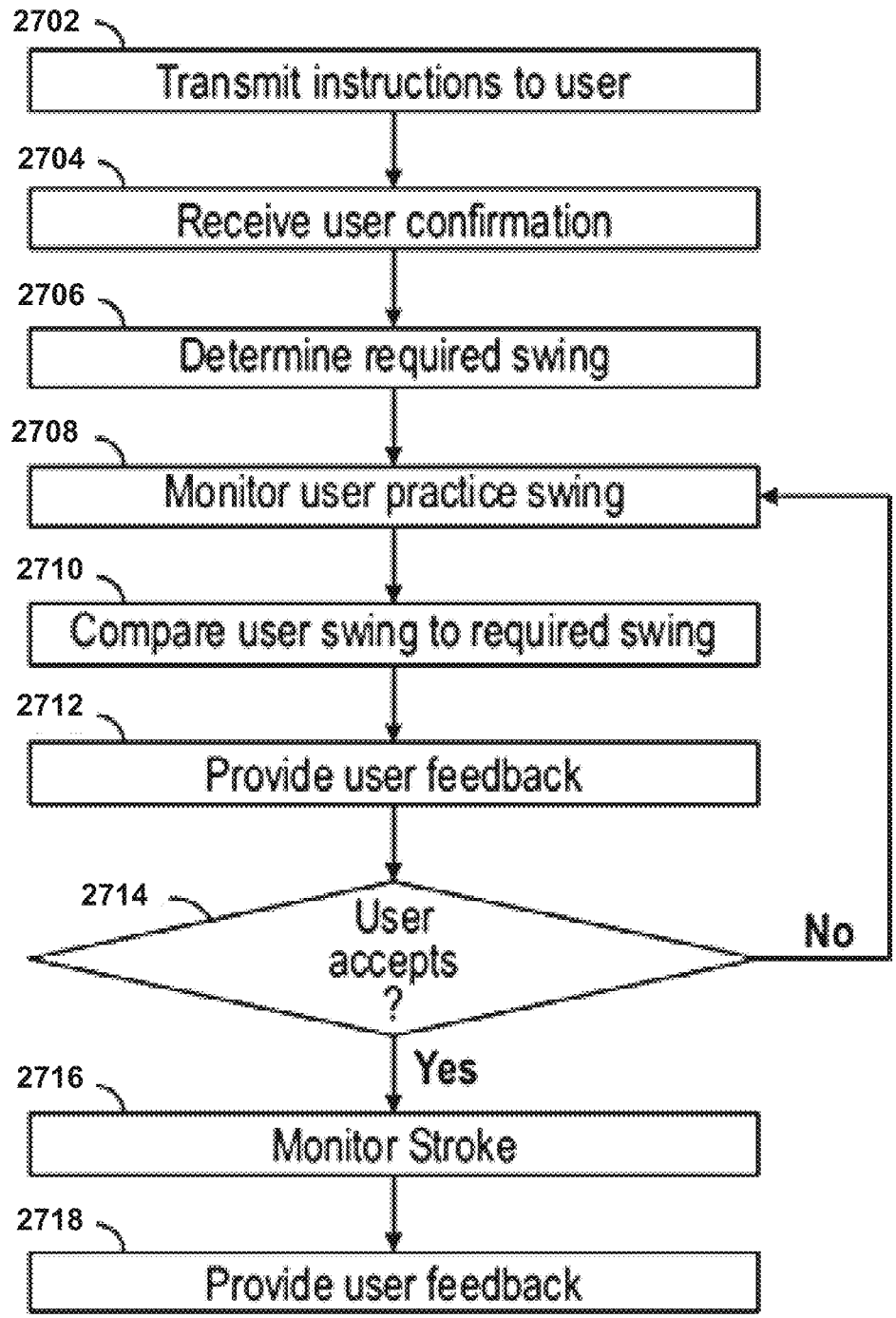
FIG. 27 shows for illustrative purposes only an example of interactive putt path selection of one embodiment.

FIG. 27 shows for illustrative purposes only an example of interactive putt path selection of one embodiment. FIG. 27 shows feedback to transmit instructions to user 2702 and receive user confirmation 2704. The feedback will display the results to determine the required swing 2706. The ball marker 2202 of FIG. 22 will monitor user practice swing 2708 and then compare user swing to required swing 2710. The user and systems interaction will provide user feedback 2712 on the viability of the practice swing and ask if the user accepts. 2714. A user NO response will send the process back to an additional monitor user practice swing 2708. A user's YES response will prompt the ball marker 2202 of FIG. 22 to monitor stroke 2716 and provide user feedback 2718 on the stroke and either the success of the golf ball 174 of FIG. 1 falling into the cup or the cause of a miss of the cup.

Figure 28:
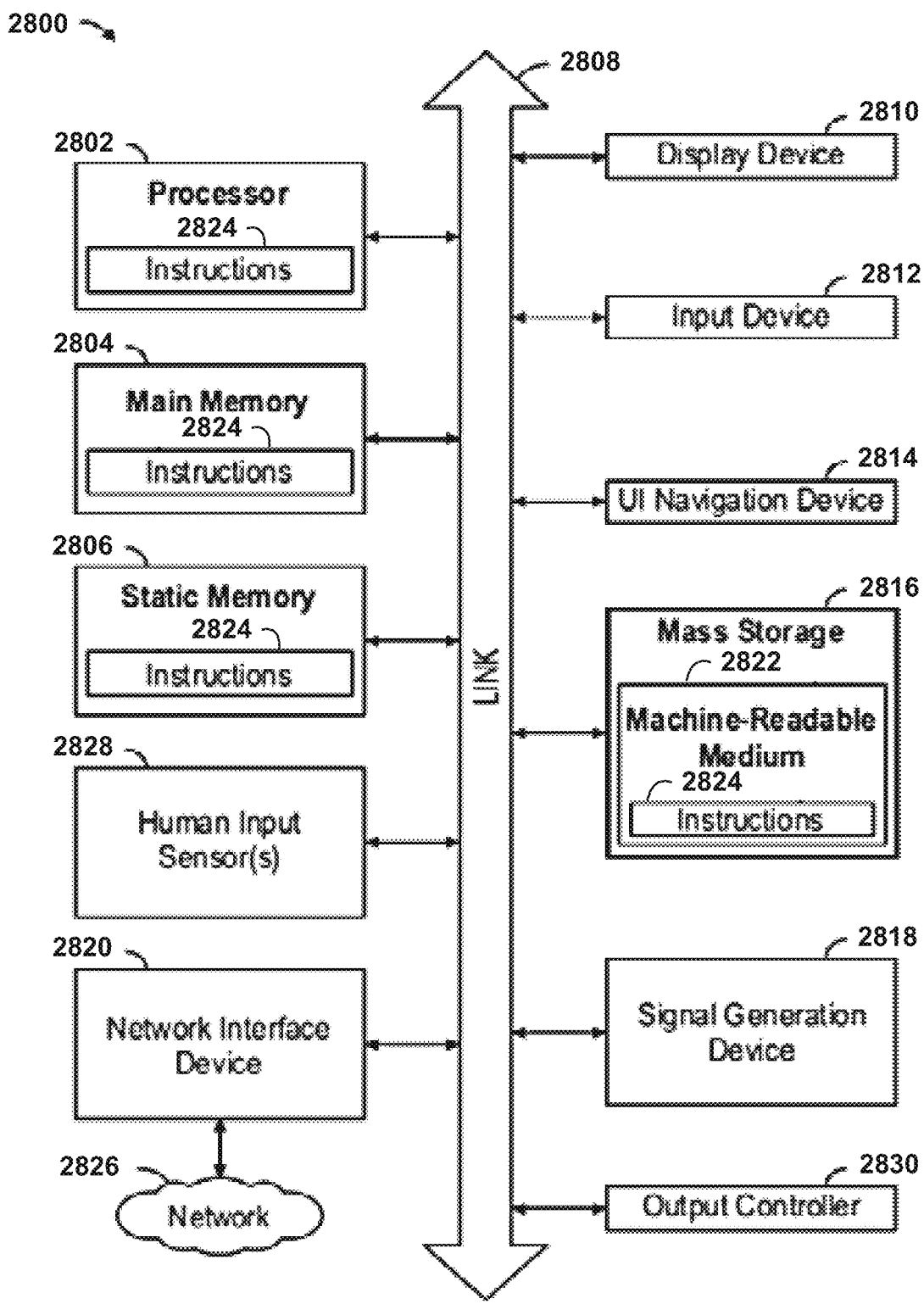
FIG. 28 shows for illustrative purposes only an example of user AI golf assistant interaction of one embodiment.

FIG. 28 shows for illustrative purposes only an example of user AI golf assistant interaction of one embodiment. FIG. 28 shows a machine 2800 that may include or may operate by, logic or several components, or mechanisms in the machine 2800 where the machine 2800 can be one or more of the devices or systems discussed above, such as the golf swing ball marker 2202 of FIG. 22, the AI golf application 132 of FIG. 1, or the user's mobile device 130 of FIG. 1. The machine 2800 may include a processor 2802 with instructions 2824, main memory 2804 with instructions 2824, and a static memory 2806 with instructions 2824. The machine 2800 may also include human input sensor(s) 2828, a network interface device 2820, a connection to a network 2826, a display device 2810, an input device 2812, a UI navigation device 2814, mass storage 2816, machine-readable medium 2822 with instructions 2824, a signal generation device 2818, an output controller 2830, and at least one link 2808 between the components.

The machine 2800 may include circuitry (e.g., processing circuitry) of a collection of circuits implemented in tangible entities of the machine 2800 that include hardware (e.g., simple circuits, gates, logic, etc.). Circuitry membership may be flexible over time. Circuitries include members that may, alone or in combination, perform specified operations when operating. For example, the hardware of the circuitry may be immutably designed to carry out a specific operation (e.g., hardwired).

For example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa.

The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components concerning the machine 2800 follow.

In alternative embodiments, the machine 2800 may operate as a standalone device or may be connected (e.g., networked) to other machines. In a networked deployment, machine 2800 may operate in the capacity of a server machine, a client machine, or both in server-client network environments. For example, machine 2800 may act as a peer machine in a peer-to-peer (P2P) (or other distributed) network environment. The machine 2800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 2800 may include a hardware processor 2802 (e.g., a central processing unit (CPU), a graphics processing unit (GPU), a hardware processor core, or any combination thereof), a main memory 2804, a static memory (e.g., memory or storage for firmware, microcode, a basic-input-output (BIOS), unified extensible firmware interface (UEFI), etc.) 2806, and mass storage 2808 (e.g., hard drive, tape drive, flash storage, or other block devices) some or all of which may communicate with each other via an interlink (e.g., bus) link 2808.

The machine 2800 may further include a display unit 2810, an alphanumeric input device 2812 (e.g., a keyboard), and a user interface (UI) navigation device 2814 (e.g., a mouse). For example, the display unit 2810, input device 2812, and UI navigation device 2814 may be a touch screen display. The machine 2800 may additionally include a storage device (e.g., drive unit), a signal generation device 2818 (e.g., a speaker), a network interface device 2820, and one or more sensors, such as a global positioning system (GPS) sensor, compass, accelerometer, or another sensor.

The machine 2800 may include an output controller 2830, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). Registers of the processor 2802, the main memory 2804, the static memory 2806, or the mass storage 2816 may be, or include, a machine-readable medium 2822 on which is stored one or more sets of data structures or instructions 2824 (e.g., software) embodying or utilized by any one or more of the techniques or functions described herein.

The instructions 2824 may also reside, completely or at least partially, within any of the registers of the processor 2802, the main memory 2804, the static memory 2806, or the mass storage 2816 during execution thereof by the machine 2800. For example, one or any combination of the hardware processor 2802, the main memory 2804, the static memory 2806, or the mass storage 2816 may constitute the machine-readable media 2822. While the machine-readable medium 2822 is illustrated as a single medium, the term "machine-readable medium" may include a single medium or multiple media (e.g., a centralized or distributed database, and/or associated caches and servers) configured to store one or more instructions 2824.

The term "machine-readable medium" may include any medium that is capable of storing, encoding, or carrying instructions for execution by the machine 2800 and that causes the machine 2800 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter.

Accordingly, non-transitory machine-readable media are machine-readable media that do not include transitory propagating signals. Specific examples of non-transitory machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2824 may be further transmitted or received over a communications network 2826 using a transmission medium via the network interface device 2820 utilizing any one of several transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others.

For example, the network interface device 2820 may include one or more physical jacks (e.g., Ethernet, coaxial, or phone jacks) or one or more antennas to connect to the communications network 2826. For example, the network interface device 2820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encode, or carry instructions for execution by the machine 2800, and includes digital or analog communications signals or other intangible medium to facilitate communication of such software. A transmission medium is a machine-readable medium.

Figure 29:
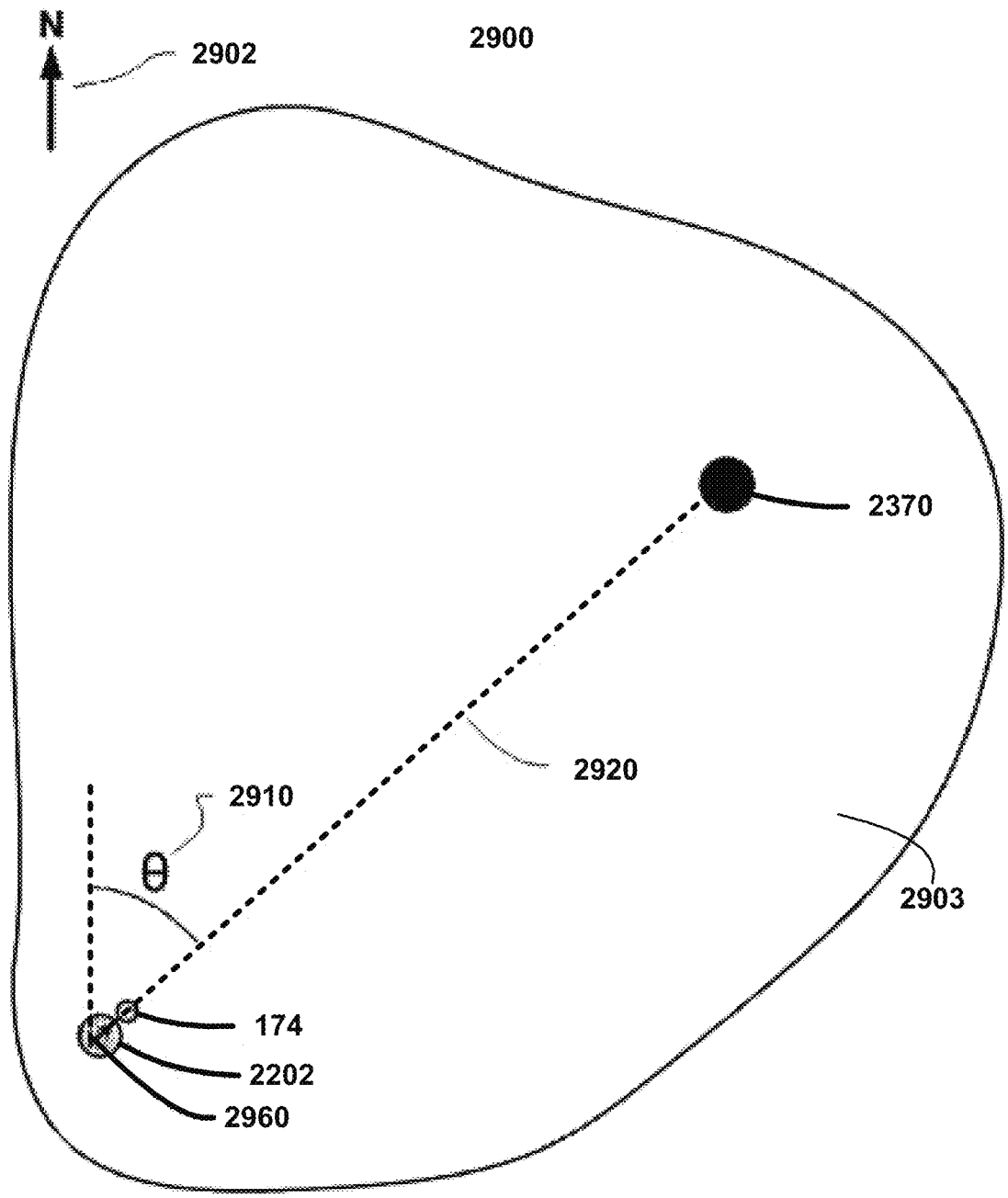
FIG. 29 shows a block diagram of an overview flow chart of the ball marker placement of one embodiment.

FIG. 29 shows for illustrative purposes only an example of ball marker placement of one embodiment. FIG. 29 shows a green 2900 with an indication of true north 2902. Also shown is a cup 2370 with a line from cup to ball 2920. Also shown is an angle from true north 2910 to the line from cup to ball 2920. Next to the golf ball 174 is the ball marker 2202 whose arrow 2960 is oriented to be in line with the line from cup to ball 2920. The green 2900 comprises a putting surface 2903 having a hole 2370 marked by a flagstick or pin.

The putting surface 2903 comprises grass that is cut very short so that a golf ball 174 may roll for a long distance. The putting surface 2903 may further include various physical contours, such as slopes or grades which are designed to challenge the player in putting the golf ball 174 into hole 2370. Accordingly, a player must account for the physical contours of putting surface 2903 when putting golf ball 174 into the hole 2370.

To accurately provide swing parameters (e.g. force and direction information) for putting the golf ball 174 into the hole 2370, three general pieces of information must be known: (1) the position of golf ball 174 on green 2900; (2) the position of the hole 2370 on green 2900; and (3) the topography of the green 2900 (e.g. the slope of putting surface 2903 between golf ball 174 and hole 2370). The present invention enables the quick determination of the required information and the calculation of recommended swing parameters in an accurate manner without slowing play.

Specifically, the topography of the green 2900 and the position of the hole 2370 can be preprogrammed into artificial intelligence server 110 of FIG. 1 (because the topography should remain constant and the position of the hole 2370 is changed infrequently and can be updated accordingly). However, the position of golf ball 174 is different for each golfer. Accordingly, the ball marker 2202 can be used to determine the position of the golf ball 174 on the green 2900. The determination of the position of the golf ball 174 can use two types of data: (1) the angle from true north formed by a line between ball 174 and the hole 2370; and (2) the distance between golf ball 174 and the hole 2370.

Figure 30:
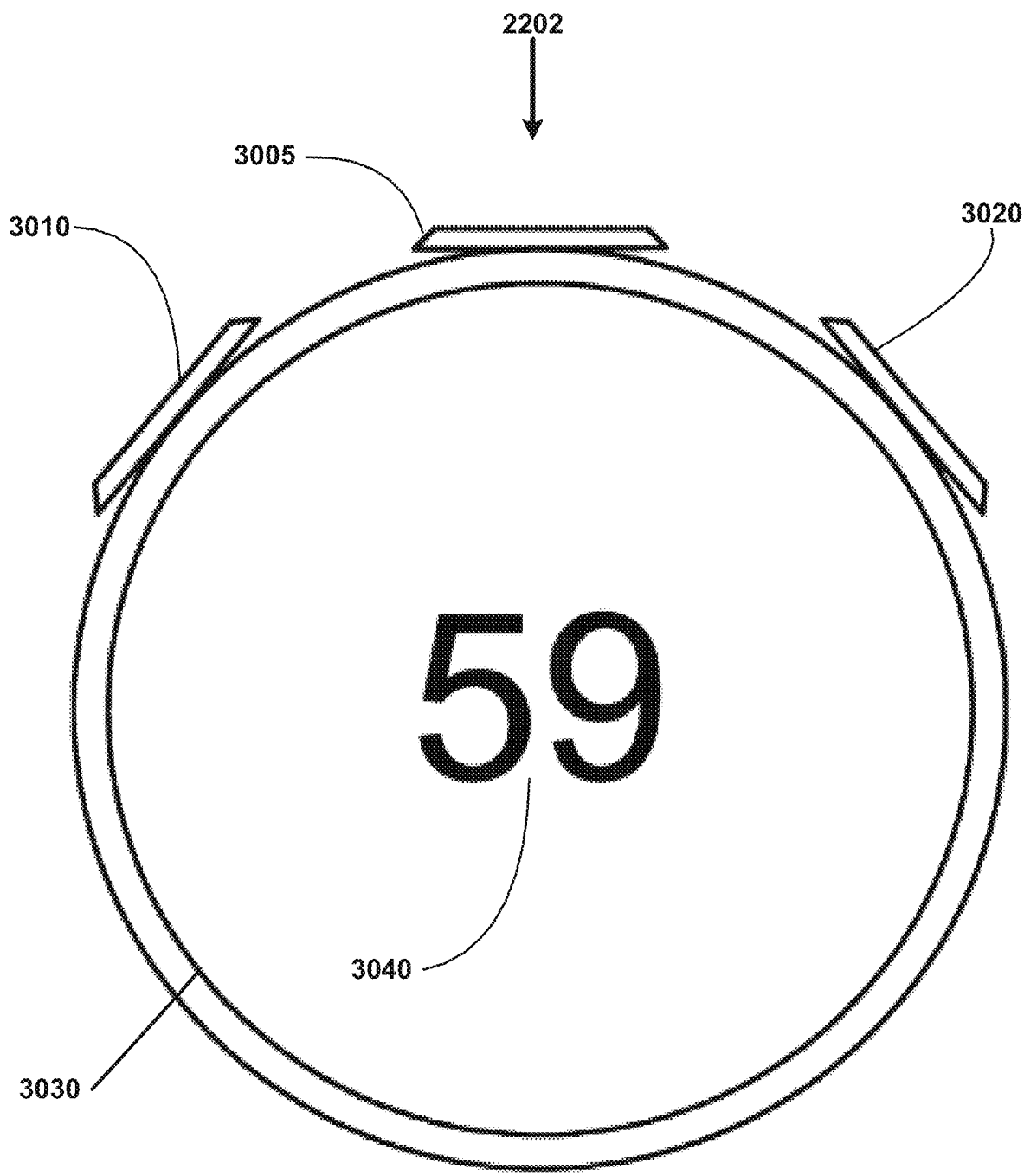
FIG. 30 shows a block diagram of an overview flow chart of the estimated distance input of one embodiment.

FIG. 30 shows a block diagram of an overview flow chart of the estimated distance input of one embodiment. FIG. 30 shows three input buttons 3005-3020 of the ball marker 2202. Button 3005 can be pressed to switch between modes for entering distance and requesting an angle. Button 3010 can be used to change the value of the most significant digit of distance 59 3040, for example, 5 in this case. Button 3020 can be used to change the value of the least significant digit of distance 59 3040, for example, 9 in this case. The display 3030 can be a touch display, displaying a distance which is shown as being 59 ft.

The ball marker 2202 can be used to receive user 170 of FIG. 1 input of an estimated distance. Buttons 3005-3020 can be pressed to input or modify distance 3040. For example, button 3005 can be pressed to switch between modes for entering distance and requesting an angle. Before placing ball marker 2202 behind the golf ball 174 of FIG. 1, the estimated distance can be input such as by using buttons 3010 and 3020. For example, button 3010 can be used to change the value of the most significant digit of distance 3040, and button 3020 can be used to change the value of the least significant digit of distance 3040.

As described above, buttons 3005-3020 are the only way in which input can be provided to ball marker 2202, and any other type of input device or means can also be used. For example, display 3030 can be a touch display so that no buttons or other input controls are required. In other cases, a combination of buttons or other input controls and a touchscreen call also be provided. Similarly, ball marker 2202 can be configured to accept speech input in some embodiments. Accordingly, ball marker 2202 can receive user input of an estimated distance in any appropriate manner.

Once a distance is input, ball marker 2202 can be placed behind the golf ball 174 of FIG. 1, as shown in FIG. 4, after which the ball is typically removed from the green. Referring specifically to the example in FIG. 30, after a distance is input, button 3005 can be pressed to switch to the mode for acquiring an angle. In this mode, ball marker 2202 can use a compass module to determine an angle from true north and submit the angle and the distance input by the user 170 of FIG. 1 to artificial intelligence server 110 of FIG. 1 via the user's mobile device 130 of FIG. 1.

In some embodiments, the compass module can be configured to detect the angle once ball marker 2202 has been at rest for a specified duration of time or in response to input from user 170 of FIG. 1, which would allow the user 170 of FIG. 1 to align the indication with the hole before the angle determination being made. Once the angle is determined by the compass module, ball marker 2202 can be picked up or otherwise removed from the putting surface.

In this manner, ball marker 2202 only requires the user 170 of FIG. 1 to input an estimated distance and then place the ball marker behind the golf ball. Typically, a golfer is required to mark his ball on the green with some type of ball marker, and therefore, placing ball marker 2202 behind golf ball 174 of FIG. 1 does not require any additional time than would otherwise be taken by the user 170 of FIG. 1.

Using the present invention, the only additional step required of the user 170 is the input of an estimated distance. However, because ball marker 2202 can provide recommended force and direction information for putting the ball, which the typical golfer would otherwise spend a significant amount of time determining mentally, the use of ball marker 2202 may not slow play, and in many cases may even speed play.

For example, as will be more fully described below, ball marker 2202 can inform the golfer how hard the putt should be hit and the approximate direction to aim. This information can be determined and returned immediately by artificial intelligence server 110 of FIG. 1 for display on ball marker 2202 thereby relieving the golfer from having to spend the time to figure out this information on his own. The golfer only needs to view the information on the ball marker 2202 and play the shot accordingly.

Using the estimated distance input by the golfer and the angle calculated by the compass module, artificial intelligence server 110 of FIG. 1 can accurately determine the position of the ball on the green. Using this position in combination with the known position of the hole and the topography of the green, artificial intelligence server 110 of FIG. 1 can calculate the approximate amount of force with which the ball should be hit, and the approximate direction to hit the ball. For example, based on the topography of the green between the position of the ball and the hole, artificial intelligence server 110 of FIG. 1 can determine that the hole is four feet uphill from the ball and that there is a rightward slope of 10 degrees. Artificial intelligence server 110 of FIG. 1 can therefore recommend hitting the ball x feet to the left of the hole (to account for the break to the right) and with a force Y (to account for the uphill slope).

Figure 31:
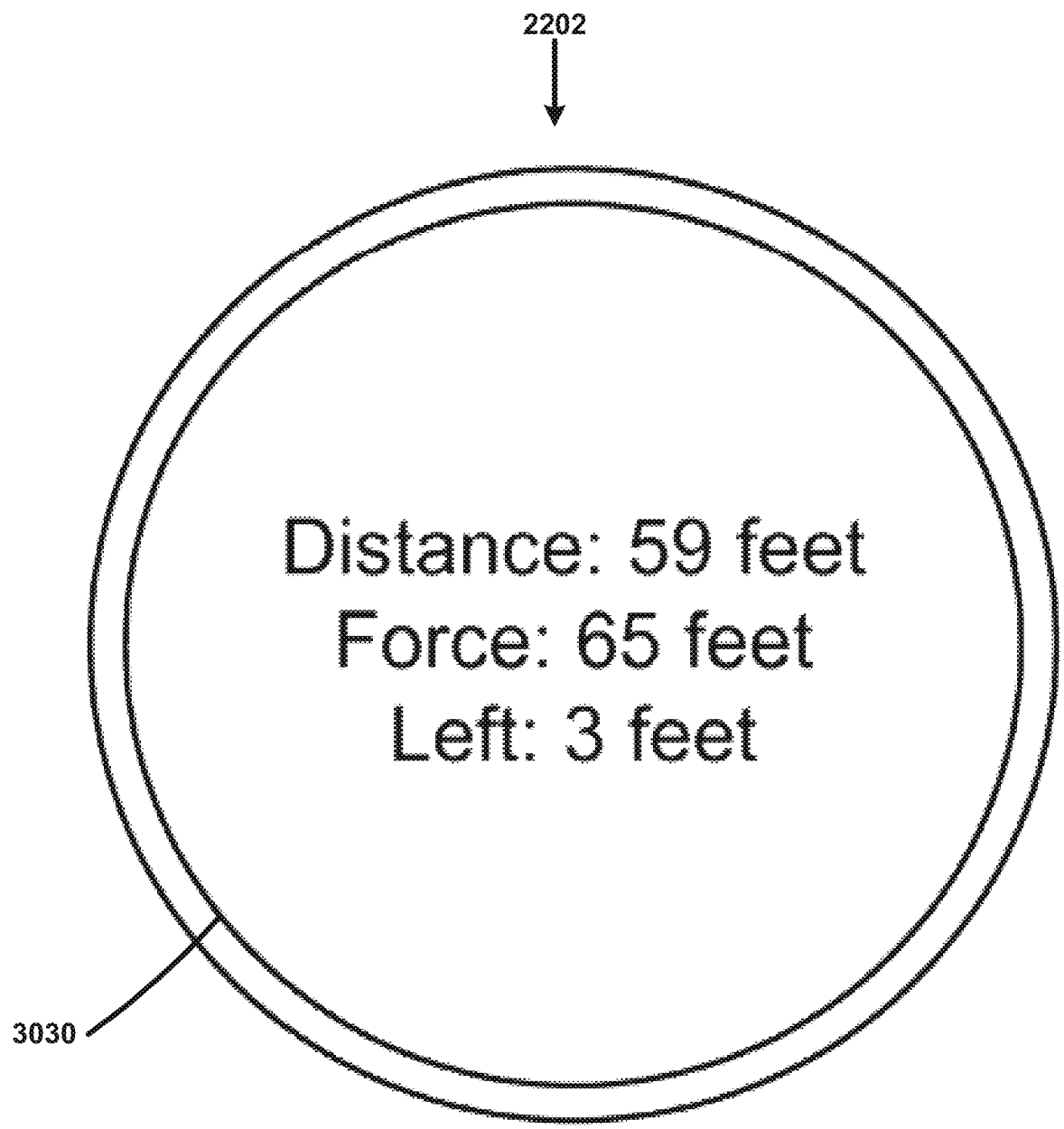
FIG. 31 shows for illustrative purposes only an example of recommended force and direction information of one embodiment.

FIG. 31 shows for illustrative purposes only an example of recommended force and direction information of one embodiment. FIG. 31 shows the ball marker 2202. The ball marker 2202 display 3030 can be a touch display. In this instance, display 3030 shows a distance: of 59 feet, a force: of 65 feet, and an angle of left: of 3 feet.

The display of recommended force and direction information on ball marker 2202 uses the example numbers from FIG. 30. As shown, given an estimated distance of 59 feet and the other known parameters, artificial intelligence server 110 of FIG. 1 has recommended that the putt be hit with a force of 65 feet (i.e. with a force that would result in the ball moving 65 feet over a flat green) and at 3 feet to the left of the hole.

Figure 32:
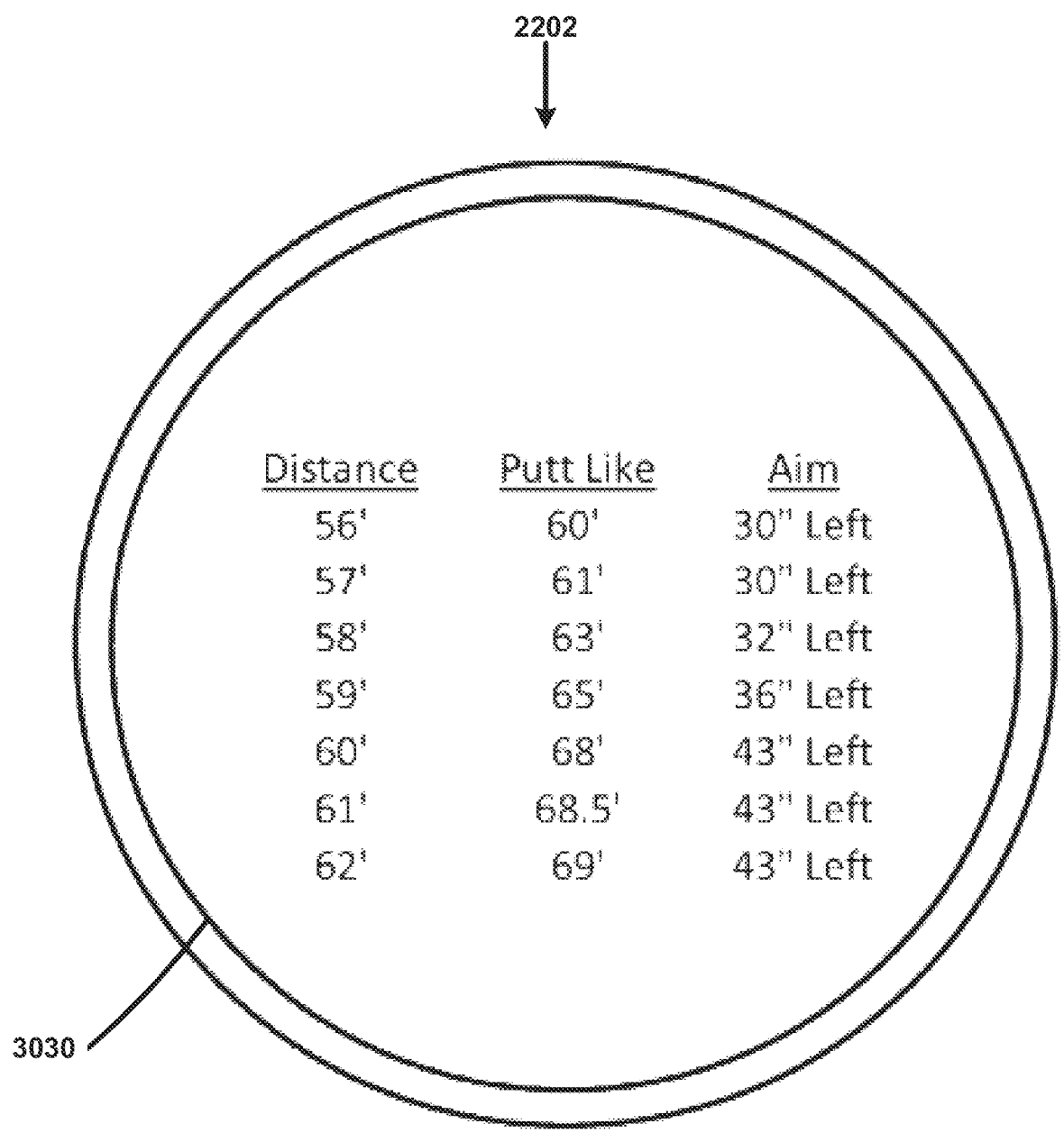
FIG. 32 shows for illustrative purposes only an example of recommended swing parameters for multiple distances of one embodiment.

FIG. 32 shows for illustrative purposes only an example of recommended swing parameters for multiple distances of one embodiment. FIG. 32 shows the ball marker 2202 with the display 3030. The display 3030 is showing recommended swing parameters for multiple distances. Each recommendation includes distance, putt like, and aim factors as described in FIG. 31. The recommendations include for example 56', 60', 30" left; 57', 61', 30" left; 58', 61', 30" left; 59', 65', 36" left; 60', 68', 43" left; 61', 68.5", 43" left; and 62', 69', 43" left.

The number of distances for which swing parameters are recommended can be a user 170 of FIG. 1 configurable parameter or may vary based on the topography of the green. In this way, user 170 of FIG. 1 can easily see if a change in the estimated distance will result in a significant change in the recommended shot. For example, if a significant break existed at 60 feet from the hole but not at 58 feet from the hole (as shown in FIG. 32 by the 11" difference between the recommended aim for 58' and 60'), the golfer could see the significant difference between recommended force/distance information and adjust his shot accordingly.

However, if the force/distance information changes linearly with the estimated distance, the user 170 of FIG. 1 need not be too concerned that following recommended information for the wrong distance will give undesirable results. In some embodiments, artificial intelligence server 110 of FIG. 1 can also provide recommended force and direction information for other distances around the estimated distance. For example, because the estimate is likely not to be perfectly accurate, artificial intelligence server 110 of FIG. 1 can calculate recommended force and direction information for distances of 56, 57, 58, 60, 61, and 62 feet using the same determined angle.

Figure 33:
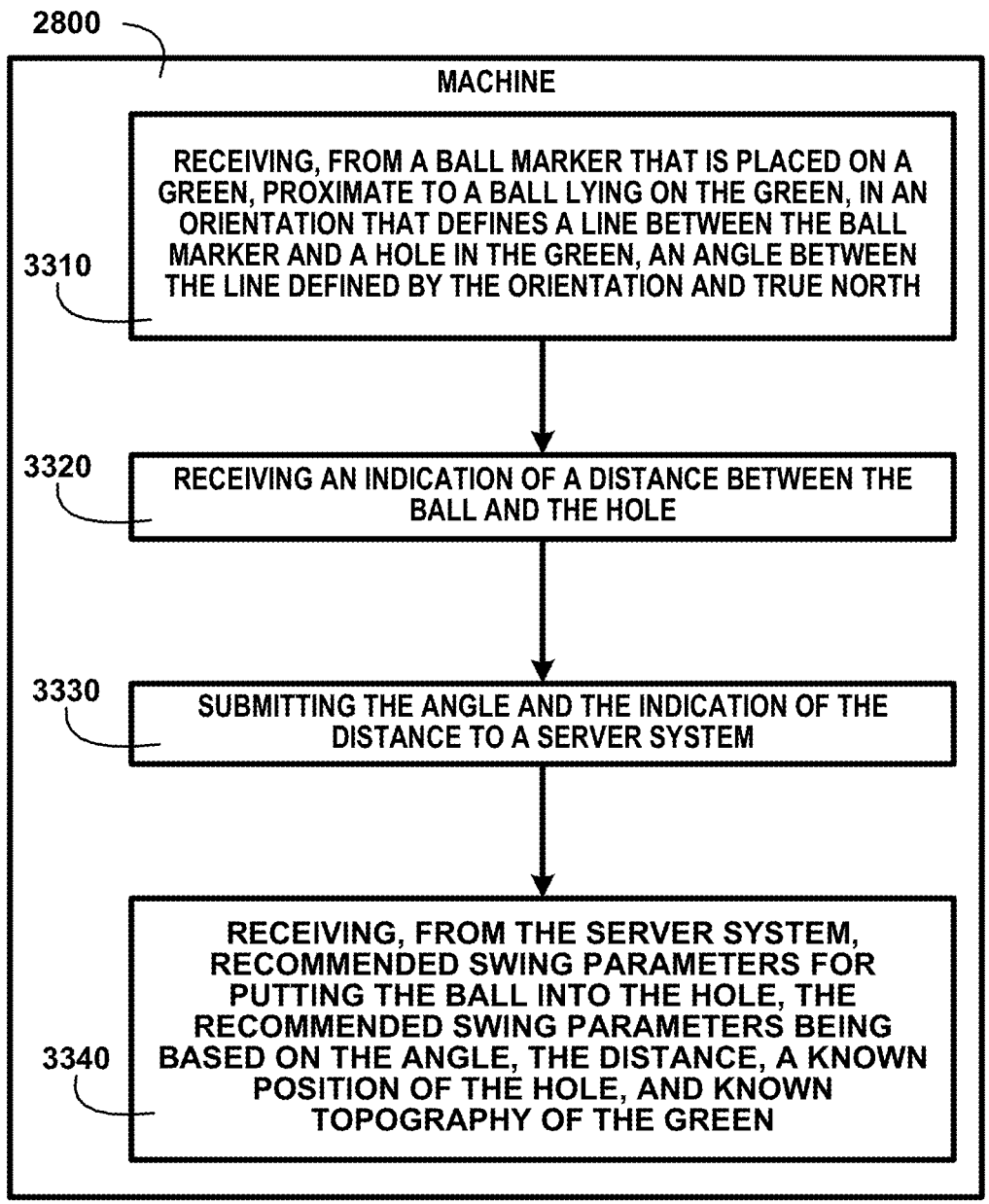
FIG. 33 shows for illustrative purposes only an example of generating recommended putt stroke parameters of one embodiment.

FIG. 33 shows for illustrative purposes only an example of generating recommended putt stroke parameters of one embodiment. FIG. 33 shows the machine 2800 receives, from a ball marker that is placed on a green, proximate to a ball lying on the green, in an orientation that defines a line between the ball marker and a hole in the green, an angle between the line defined by the orientation and true north 3310. Receiving an indication of a distance between the ball and the hole 3320. Submitting the angle and the indication of the distance to server system 3330. Receiving, from the server system, recommended swing parameters for putting the ball into the hole, the recommended swing parameters being based on the angle, the distance, a known position of the hole, and the known topography of the green 3340 of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A system for providing golf swing guidance to a user on a golf course, the system comprising:
a database coupled to a remote server to collect, store, and maintain updated topography of golf courses based on LIDAR topography;
a club sensor configured to removably attach to one or more portions of a golf club and further configured to measure the predetermined physical movement of the golf club to collect the club sensor golf club swing data;
a remote server configured to identify a real-time location of a user by accessing the database-updated topography of golf courses based on the LIDAR topography when positioned at a golf ball and a location when positioned at a golf course using a real-time kinematics device and indicate the user's locations on mapped LIDAR topography and wherein the remote server is further configured to generate golf swing adjustments based on a practice swing characteristic and a required swing characteristic for the selected target path and interactively transmit the golf swing adjustments to the user audio device;
a user audio device with a microphone and speaker wirelessly coupled to the remote server configured to interactively communicate with the remote server by having the audio device send voice commands as user recommendation requests via the microphone and receive feedback guidance from the remote server via the speaker; and
wherein the feedback guidance includes golf club selection, golf club swing adjustment recommendations, and golf aiming adjustment recommendations for a selected target path that are based on the real-time location, previous tracked golf playing history of the user, previous tracked golf playing history of other users, and the club sensor golf club swing data.

2. The system of claim 1, wherein the remote server is further configured to generate a swing characteristic for the selected target path from club sensor data of a user golf club swing and interactively transmit the swing characteristic to the user device during a practice swing using a vibration device the user has in a pocket, wherein short quick vibrations are made to indicate a bad practice stroke and extended slow vibrations indicate a good practice stroke, wherein the club sensor includes an accelerometer, a gyroscope, a pressure sensor, a force sensor, a light sensor, and a transmitter.

3. The system of claim 1, further comprising a computing system coupled to the remote server configured to interactively receive a user's mobile device global positioning system sensor data coordinates and display on the user's mobile device the user's location on the golf course LIDAR topography map, and superimposing the target path of a next golf shot, identify a golf course and hole number based on the location of the user's mobile device global positioning system sensor data, and select golf course topography based on the identified hole number and the identified golf course to interactively display the location of hazards, out of bounds, rough, and a fairway relative to a target path.

4. The system of claim 1, further comprising a computing system coupled to the remote server configured to interactively recommend golf club selection, swing characteristics, user's swing tendencies based on previously recorded user's golf shots for tee shots, fairway grass shots, approach shots and chip shots.

5. The system of claim 1, further comprising a computing system coupled to the remote server configured to calculate a plurality of target paths to the hole location based on the sensor location, the hole location, and the course topography features using a topography physics engine, and wherein the user interactively selects one of the plurality of target paths to the hole based on the user's location.

6. The system of claim 1, further comprising a computing system coupled to the remote server configured to interactively transmit the selected target path to the user audio device interactively receive a user confirmation of the selected target path.

7. The system of claim 1, further comprising a computing system coupled to the remote server configured to calculate the required swing characteristics to achieve the desired ball trajectory on the selected target path and interactively transmit the required swing characteristic to the audio user device.

8. The system of claim 1, further comprising a computing system coupled to the remote server is a cloud-based computing system.

9. A system for providing golf swing guidance to a user on a golf course, the system comprising:
a database coupled to a remote server to collect, store, and maintain updated topography of golf courses based on LIDAR topography;
a club sensor configured to removably attach to one or more portions of a golf club and further configured to measure the predetermined physical movement of the golf club to collect the club sensor golf club swing data;
a remote server configured to identify a real-time location of a user by accessing the database-updated topography of golf courses based on the LIDAR topography when positioned at a golf ball and a location when positioned at a golf course using a real-time kinematics device and indicate the user's locations on mapped LIDAR topography and wherein the remote server is further configured to generate golf swing adjustments based on a practice swing characteristic and a required swing characteristic for the selected target path and interactively transmit the golf swing adjustments to the user audio device;
a user audio device with a microphone and speaker wirelessly coupled to the remote server configured to interactively communicate with the remote server by having the audio device send voice commands as user recommendation requests via the microphone and receive feedback guidance from the remote server via the speaker; and
wherein the feedback guidance includes golf club selection, golf club swing adjustment recommendations, and golf aiming adjustment recommendations for a selected target path that are based on the real-time location, previously tracked golf playing history of the user, previously tracked golf playing history of other users, and the practice golf club swing characteristics to the predicted golf ball trajectory golf club swing characteristics to make the shot to an aimed targeted location;
wherein the user audio device interactively verbalizes the golf ball aiming instructions and the required-swing characteristics based on the received data comparison; and
a computing system coupled to the remote server configured to calculate a plurality of target paths to the hole location based on the sensor location, the hole location, and the course topography features using a topography physics engine, wherein the user interactively selects one of the plurality of paths to the hole based on the user's location.

10. The system of claim 9, wherein the remote server is further configured to generate a swing characteristic for the selected target path from club sensor data of a user golf club swing and interactively transmit the swing characteristic to the user device during a practice swing using a vibration device the user has in a pocket, wherein short quick vibrations are made to indicate a bad practice stroke and extended slow vibrations indicate a good practice stroke, wherein the club sensor includes an accelerometer, a gyroscope, a pressure sensor, a force sensor, a light sensor, and a transmitter.

11. The system of claim 9, wherein the computing system coupled to the remote server is further configured to interactively receive a user's mobile device global positioning system sensor data coordinates and display on the user's mobile device the user's location on the golf course LIDAR topography map, and superimposing the target path of a next golf shot, identify a golf course and hole number based on the location of the user's mobile device global positioning system sensor data, and select golf course topography based on the identified hole number and the identified golf course to interactively display the location of hazards, out of bounds, rough, and a fairway relative to a target path.

12. The system of claim 9, wherein the computing system is further configured to interactively recommend golf club selection, swing characteristics, and user's swing tendencies based on previously recorded user's golf shots for tee shots, fairway grass shots, approach shots, and chip shots.

13. A system for providing golf swing guidance to a user on a golf course, the system comprising:
a database coupled to a remote server to collect, store, and maintain updated topography of golf courses based on LIDAR topography;
a club sensor configured to removably attach to one or more portions of a golf club and further configured to measure the predetermined physical movement of the golf club to collect the club sensor golf club swing data;
a processor coupled to the club sensor is configured to analyze the measured golf club swing data to interactively predict a golf ball trajectory based on practice swing data including club head speed, club path direction, club face orientation, and swing path contact position;
a remote server configured to identify a real-time location of a user by accessing the database-updated topography of golf courses based on the LIDAR topography when positioned at a golf ball and a location when positioned at a golf course using a real-time kinematics device and indicate the user's locations on mapped LIDAR topography;
a user audio device with a microphone and speaker wirelessly coupled to the remote server configured to interactively communicate with the remote server by having the audio device send voice commands as user recommendation requests via the microphone and receive feedback guidance from the remote server via the speaker; and
wherein the feedback guidance includes golf club selection, golf club swing adjustment recommendations, and golf aiming adjustment recommendations for a selected target path that are based on the real-time location, previously tracked golf playing history of the user, previously tracked golf playing history of other users, and the club sensor golf club swing data;
wherein the user audio device interactively verbalizes the golf ball aiming instructions and the required-swing characteristics based on the received data comparison;
a computing system coupled to the remote server configured to calculate a plurality of target paths to the hole location based on the sensor location, the hole location, and the course topography features using a topography physics engine, wherein the user interactively selects one of the plurality of paths to the hole based on the user's location; and a user vibration device held in a user's pocket during a practice swing, wherein short quick vibrations are made to interactively indicate a bad practice swing and extended slow vibrations indicate a good practice swing.

14. The system of claim 13, wherein the computing system is further configured to interactively recommend golf club selection, swing characteristics, and user's swing tendencies based on previously recorded user's golf shots for tee shots, fairway grass shots, approach shots, and chip shots.

15. The system of claim 13, wherein the computing system coupled to the remote server is further configured to interactively receive a user's mobile device global positioning system sensor data coordinates and display on the user's mobile device the user's location on the golf course LIDAR topography map, and superimposing the target path of a next golf shot, identify a golf course and hole number based on the location of the user's mobile device global positioning system sensor data, and select golf course topography based on the identified hole number and the identified golf course to interactively display the location of hazards, out of bounds, rough, and a fairway relative to a target path.

16. The system of claim 13, wherein the computing system is further configured to interactively transmit the selected target path to the user audio device and interactively receive a user confirmation of the selected target path.

17. The system of claim 13, wherein the computing system is further configured to calculate the required swing characteristics to achieve the desired ball trajectory on the selected target path and interactively transmit the required swing characteristic to the audio user device for verbalizing required swing characteristics to the user.

18. The system of claim 13, wherein the computing system is further configured for a cloud-based computing system.

* * * * *